United States Patent
Cavalca et al.

(12)

(10) Patent No.: US 6,300,000 B1
(45) Date of Patent: Oct. 9, 2001

(54) FUEL CELL MEMBRANE ELECTRODE ASSEMBLIES WITH IMPROVED POWER OUTPUTS AND POISON RESISTANCE

(75) Inventors: Carlos A. Cavalca, Newark, DE (US); James H. Arps, San Antonio, TX (US); Mahesh Murthy, Elkton, MD (US)

(73) Assignee: Gore Enterprise Holdings, Newark, DE (US)

( * ) Notice: Subject to any disclaimer, the term of this patent is extended or adjusted under 35 U.S.C. 154(b) by 0 days.

(21) Appl. No.: 09/335,718

(22) Filed: Jun. 18, 1999

(51) Int. Cl.[7] .............................. H01M 4/86; H01M 4/94

(52) U.S. Cl. .................................................. 429/40

(58) Field of Search .................... 429/41, 44, 30, 429/45

(56) References Cited

U.S. PATENT DOCUMENTS

| | | |
|---|---|---|
| 3,274,029 | 9/1966 | Lurie et al. . |
| 3,492,163 | 1/1970 | Hilmer . |
| 3,593,566 | 7/1971 | Loopuyt . |
| 3,615,948 | 10/1971 | Krostewitz . |
| 3,730,774 | 5/1973 | McKee et al. . |
| 4,160,856 | 7/1979 | Warszawski . |
| 4,430,391 | 2/1984 | Ovshinsky et al. . |
| 4,487,818 | 12/1984 | Ovshinsky et al. . |
| 4,547,437 | 10/1985 | Isenberg et al. . |
| 4,686,158 | 8/1987 | Nishi et al. . |
| 4,738,904 | 4/1988 | Ludwig et al. . |
| 4,826,741 | 5/1989 | Aldhart et al. . |
| 4,876,115 | 10/1989 | Raistrick . |

(List continued on next page.)

OTHER PUBLICATIONS

"Fuel Cells," *Encyclopedia of Chemical Technology*, 4th Ed., vol. 11, pp. 1098–1121.

S. Srinivasan et al.; *J. Power Sources*; 29 (1990); pp. 367–387.

*Fuel Cell Systems*, L.J.M.J. Blomwn and M.N. Mugerwa (Ed.); Plenum Press; 1993; Chapter 11.

Poirer et al.; *J. Electrochemical Society*, vol. 141, No. 2, Feb. 1994, pp. 425–430.

Ticianelli et al.; *Journal of Elecroanalytical Chemistry and Interfacial Electrochemistry*; vol. 251 No. 2, Sep. 23, 1998, pp. 275–295.

"Anodic Oxidation of Methanol at a Gold–Modified Platinum Electrocatalyst Prepared By RF Sputtering on a Glassy Carbon Support,"; *Electrochimica Acta*, vol. 36, No. 5/6, pp. 947–951 (1991).

"High performance proton exchange membrane fuel cells with sputter–deposited Pt layer electrodes"; Hirano et al.; *Electrochimica Acta*, vol. 42, No. 10, pp. 1587–1593 (1997).

"Effect of sputtered film of platinum on low platinum loading electrodes on electrode kinetics of oxygen reduction in proton exchange membrane fuel cells"; Mukerjee et al.; *Electrochimica Acta*, vol. 38, No. 12, pp. 1661–1669 (1993).

(List continued on next page.)

*Primary Examiner*—Nam Nguyen
*Assistant Examiner*—Gregg Cantelmo
(74) *Attorney, Agent, or Firm*—Morgan & Finnegan, L.L.P.

(57) ABSTRACT

An electrode-membrane combination for use in a fuel cell and providing improved power outputs and resistance to poisoning. Multiple embodiments are described which generally involve use of a vapor deposited zone or layer of one or more catalytically active metals. Vapor deposition can be carried out by, for example, sputtering or physical vapor deposition.

29 Claims, 60 Drawing Sheets

U.S. PATENT DOCUMENTS

| | | |
|---|---|---|
| 4,931,152 | 6/1990 | Naik et al. . |
| 4,937,152 | 6/1990 | Sato et al. . |
| 5,068,126 | 11/1991 | Suzuki et al. . |
| 5,151,334 | 9/1992 | Fushimi et al. . |
| 5,192,523 | 3/1993 | Wu et al. . |
| 5,208,112 | 5/1993 | Ludwig et al. . |
| 5,211,984 | 5/1993 | Wilson . |
| 5,234,777 | 8/1993 | Wilson . |
| 5,296,274 | 3/1994 | Movchan et al. . |
| 5,336,570 * | 8/1994 | Dodge, Jr. ............................ 429/31 |
| 5,338,430 | 8/1994 | Parsonage et al. . |
| 5,340,665 | 8/1994 | Khandkar . |
| 5,395,704 | 3/1995 | Barnett et al. . |
| 5,500,292 | 3/1996 | Muranaka et al. . |
| 5,509,189 | 4/1996 | Tuller et al. . |
| 5,547,551 | 8/1996 | Bahar et al. . |
| 5,599,614 | 2/1997 | Bahar et al. . |
| 5,624,718 | 4/1997 | Dearnaley . |
| 5,635,041 | 6/1997 | Bahar et al. . |
| 5,686,199 | 11/1997 | Cavalca et al. . |
| 5,707,755 * | 1/1998 | Grot ..................................... 429/44 |
| 5,738,708 * | 4/1998 | Peachey et al. ...................... 95/56 |
| 5,750,013 | 5/1998 | Lin . |
| 5,786,026 | 7/1998 | Seko et al. . |
| 5,795,669 * | 8/1998 | Wilkinson et al. ................... 429/44 |
| 5,795,672 | 8/1998 | Dearnaley . |
| 5,879,827 | 3/1999 | Debe et al. . |
| 5,879,828 | 3/1999 | Debe et al. . |
| 5,910,378 * | 6/1999 | Debe et al. .......................... 429/41 |
| 6,040,077 * | 3/2000 | Debe et al. .......................... 429/44 |
| 6,077,621 * | 6/2000 | Allen et al. .......................... 429/40 |

OTHER PUBLICATIONS

"Sputtered fuel cell electrodes"; Weber et al.; *J. Electrochem. Soc.*, Jun. 1987, pp. 1416–1419.

"Carbon Monoxide Tolerant Anodes for Proton Exchange Membrane (PEM) Fuel Cells. I. Catalyst Development Approach", Holleck et al. Engineering Conference on Energy Conversion, Colorado Springs, Co., Aug. 2–6, 1998, pp. 1–6.

* cited by examiner

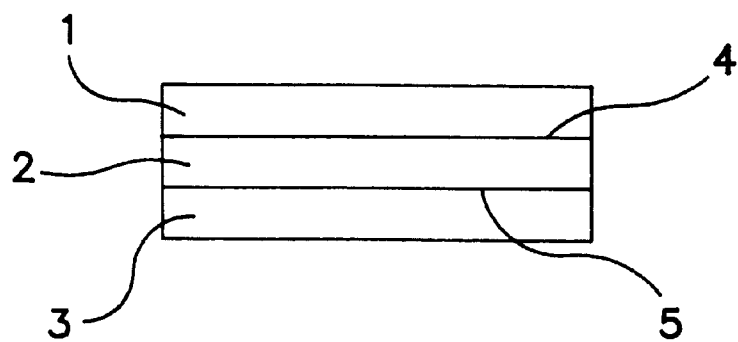
FIG. 1
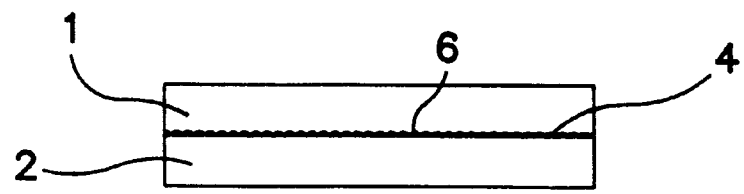
FIG. 2

FUEL CELL MEMBRANE ELECTRODE ASSEMBLIES WITH IMPROVED POWER OUTPUTS AND POISON RESISTANCE

FIELD OF THE INVENTION

This invention relates generally to fuel cell membrane electrode assemblies with improved power outputs. More particularly, these improved assemblies feature a relatively thin zone of one or more catalytically active metals at the membrane-electrode interface in addition to the catalytically active metal which also can be present in the electrode.

BACKGROUND OF THE INVENTION

Fuel cells continue to show great commercial promise throughout the world as an alternative to conventional energy sources. This commercial promise should continue to grow as energy shortages become more acute, environmental regulations become more stringent, and new fuel cell applications emerge. See, e.g.,"FUEL CELLS", *Encyclopedia of Chemical Technology*, 4th Ed., Vol. 11, pp. 1098–1121. Strikingly, numerous automotive manufacturers have announced and continue to announce plans for mass production and retail sale of fuel cell-powered cars in the near future.

Despite improvements in fuel cell technology, however, long felt needs generally exist to increase power output, reduce initial cost, improve water management, and lengthen operational lifetime. Initial cost reduction, which is particularly important, can be most easily achieved by reducing the precious metal content of the fuel cell electrode. Such reduction, however, generally results in power output loss which blocks commercialization efforts. Hence, new discoveries are needed to resolve these and other difficult compromises.

There are different types of fuel cells, but they each produce electrical energy by means of chemical reaction. One type of increasing import, the "polymer electrolyte membrane fuel cell" (PEMFC), comprises a membrane electrode assembly (MEA) typically made of an ionically conducting polymeric membrane sandwiched between two electronically conducting electrodes. The electrodes, besides being conductive, are also associated with electrocatalyst layers which provide catalysis. For commercial application, multiple MEAs can be electronically connected to form a fuel cell stack (i.e., "stacked"). Other components associated with typical PEMFCs include gas diffusion media and current collectors, the latter of which can also serve as bipolar separators and flow field elements. PEMFCs have been reviewed in the literature.

See S. Srinivasan et al.; *J. Power Sources;* 29 (1990); pp. 367–387; and *Fuel Cell Systems*, L. J. M. J. Blomen and M. N. Mugerwa (Ed.); Plenum Press; 1993; Chapter 11.

In a typical PEMFC, a fuel such as hydrogen gas is electrocatalytically oxidized at one electrode (anode). At the other electrode (cathode), an oxidizer such as oxygen gas is electrocatalytically reduced. The net reaction, when mediated by the membrane, results in generation of electromotive force and external current flow between the electrodes. Elevated temperature can accelerate this reaction, although one increasingly important advantage of the PEMFC is that lower temperatures (e.g., 80° C.) can be used. The fuel cell reactions are generally catalyzed by precious transition metals, commonly a noble metal such as platinum, which are present in both anode and cathode as an electrocatalyst layer. Because the fuel cell is often operated with use of gaseous reactants, typical electrodes are porous materials (or more generally, reactant diffusive materials) having the catalytically active metal at or within the porous surfaces. In some cases, catalyst may be thinly coated by polymer which allows gas to diffuse to the underlying catalyst. The metal can be in different morphological forms, but often it is in particulate or dispersed form and supported on carbon. Fuel cell performance can depend on the catalyst form. See Poirier et al.; *J. Electrochemical Society*, vol. 141, no. 2, February 1994, pp. 425–430.

Fuel cell systems are complex because the reaction is believed localized at a three-phase boundary between ionically conducting membrane, gas, and carbon supported catalyst. Because of this localization, addition of ionically conductive material to the electrode can result in better utilization of catalyst as well as improved interfacial contact with the membrane. However, the additional ionic conductor can introduce extra cost, especially when perfluorinated conductors are used, and can increase the complexity of electrolyte water management, all important to commercialization. Hence, discoveries are needed which improve utilization of ionic conductor.

To minimize the loading of expensive catalytic metal, one general approach has been to use smaller catalyst particles. However, long operational lifetimes are particularly difficult to achieve with lower catalyst loadings, and catalyst poisoning can occur. Also, catalyst particle size may be unstable and increase by agglomeration or sintering. Hence, discoveries are also needed to improve utilization of catalyst, and the combination of catalyst and ionic conductor.

Another generic approach which has been tried without success has been to concentrate the metal at the membrane-electrode interface. See, e.g., Ticianelli et al.; *Journal of Electroanalytical Chemistry and Interfacial Electrochemistry*; Vol. 251 No. 2, Sep. 23, 1988, pp. 275–295. For example, 500 angstrom dense layers of single metal catalyst reportedly have been sputtered onto certain gas diffusion electrodes before sandwiching the ionically conducting membrane between the electrodes. However, sputtered layers thinner than 500 angstroms were not reported, possibly because of the difficulty in making uniform thinner layers. Moreover, the concentration of catalyst approach may not be suitable for other types of electrodes and deposition techniques and may upset water balance. Further, testing often is not carried out under commercial conditions. Particularly poor performance was reported for electrodes in which all of the catalyst metal was in the form of a sputtered film. In sum, it is recognized that mere vapor depositing an allegedly thin layer of catalyst onto the electrode does not guarantee a suitable MEA for commercial applications, and in general, industry has not accepted this approach as realistic. . According to the Srinivasan article noted above, for example, sputtering may not be economically feasible compared with wet chemical deposition methods.

Additional technology is described in the patent literature including, for example, U.S. Pat. Nos. 3,274,029; 3,492,163; 3,615,948; 3,730,774; 4,160,856; 4,547,437; 4,686,158; 4,738,904; 4,826,741; 4,876,115; 4,937,152; 5,151,334; 5,208,112; 5,234,777; 5,338,430; 5,340,665; 5,500,292; 5,509,189; 5,624,718; 5,686,199; and 5,795,672. In addition, deposition technology is described in, for example, U.S. Pat. Nos. 4,931,152; 5,068,126; 5,192,523; and 5,296,274.

Although much research has focused on fuel cell electrodes, particularly significant developments relating to fuel cell membranes are described in U.S. Pat. Nos. 5,547,551; 5,599,614; and 5,635,041 (Bahar et al.). For commercial applications, membrane design should be integrated with electrode design in a systemic approach to maximize fuel cell performance. Combinations of properties, which are vital for commercialization, can be difficult to achieve without this integrated approach.

Finally, another problem which can arise and block commercialization is catalyst poisoning which is caused by impurities such as carbon monoxide (CO) in the reactants. For example, when hydrogen fuel is generated by hydrocarbon reforming, CO can be co-generated which is expensive to remove, particularly when the CO level in hydrogen is reduced to below 100 ppm. Poisoning is especially problematic in PEMFCs which have low catalyst loadings and which employ the single metal platinum. Discoveries are needed to solve poisoning problems without generating other problems and to provide suitable compromises.

Although attempts to mitigate CO poisoning have been reported, they generally have been unsuccessful and have resulted in reduced power. Some of these attempts have focused on mixing platinum with other transition metals such as ruthenium before deposition on the electrode. Deposition methods have included, for example, wet ink and vacuum methods. However, ink methods can be difficult to control precisely, and some vacuum methods can be expensive and cumbersome, particularly for thin film deposition.

Methods of using transition metal catalyst mixtures are discussed in, for example, U.S. Pat. Nos. 4,430,391; 4,487,818; 5,296,274; 5,395,704; and 5,786,026. In addition, Morita et al. describe a gold-platinum bimetallic model catalyst on smooth carbon support by RF sputtering. See "Anodic Oxidation of Methanol at a Gold-Modified Platinum Electrocatalyst Prepared By RF Sputtering on a Glassy Carbon Support,"; *Electrochimica Acta*, vol. 36, No. 5/6, pp. 947–951 (1991). However, this article reports problems in obtaining consistent results and reproducible data with bimetallic systems. In addition, this article only describes methanol oxidation which is different mechanistically from other fuel oxidations. It does not describe hydrogen oxidation and the use of reactant diffusive (or porous) electrodes. The thicknesses of the catalytic zones are not reported although thicknesses less than one micron are noted. Alloys are not described, and deposition methods other than RF sputtering are not described.

In addition, U.S. Pat. No. 5,750,013 describes a membrane electrode assembly based on a vacuum-deposited ionically conducting membrane which is positioned between vacuum-deposited alternating layers of microparticle metal layer and porous conducting layer. The entire membrane electrode assembly is prepared by vacuum deposition. However, there is no concentration of the catalytically active metal at the membrane-electrode interface. Rather, the layered structures described are not concentrated and would be expected to have relatively poor catalytic efficiency. In addition, a well-integrated three-phase boundary between the ionic conductor of the membrane, the electronic conductor of the electrode, and the catalytically active metal of the electrode is not present. Moreover, the vacuum-deposited membrane is excessively thin and would not generally be a suitable fuel cell barrier in practical applications. Finally, no experiments are reported in this patent on the performance of the membrane electrode assembly, particularly under commercially realistic conditions.

U.S. Pat. Nos. 4,430,391 and 4,487,818 (Ovshinsky et al.) describe fuel cell electrodes in which a host matrix, which comprises transition metal, is modified with at least one modifier element to improve catalytic properties. The modified catalytic layer can be deposited onto a catalyst-free gas diffusion electrode by sputtering. The minimum thickness of the catalytic layer is described as 0.5 microns (5,000 angstroms). According to these patents, the modifier element increases the amount of disorder in the host matrix which increases the number of catalytically active sites in the electrode. Although experimental data are reported in these patents, no experimental data are reported for a working membrane electrode assembly or fuel cell. Also, polymer electrolyte membrane fuel cells are not taught or suggested.

U.S. Pat. Nos. 5,879,827 and 5,879,828 describe membrane electrode assemblies which are prepared with use of vacuum deposition of metallic catalyst onto whisker-like supports held by a substrate. The supported catalyst is then transferred from the substrate to the membrane or electrode during assembly of the membrane electrode assembly. These patents, however, do not teach or suggest catalyst in a form which is not intimately joined or bonded to the whisker support, which is generally non-conductive. Also, these patents teach that use of ionically conductive polymer in the electrode is undesirable, and that maximum contact between the catalyst and the ionically conductive material is not important. Growth of the catalyst appears to be organized as opposed to random. It would desirable to prepare structures which consist essentially of elements which do not include and do not require use of whisker-like structures to support the catalyst, and which have extensive contact between catalyst and ionically conductive material. Also, random growth of catalyst structure can be important.

In general, therefore, the prior art apparently does not teach, demonstrate, or even suggest fuel cell technology which is suitable for the current or next generation commercial demands.

SUMMARY OF THE INVENTION

Despite the prejudices existing in the art, the inventors have discovered that surprisingly high improvements in power output can be achieved for low and ultra-low loading catalyst MEAs. By introducing a relatively thin zone of catalytic metal at the interface between selected electrodes and membranes, significantly more power can be produced for the same amount, or even lesser amounts, of catalyst. Moreover, by combining selected electrodes and membranes in a systems approach, superior overall fuel cell performance can be achieved. The test results, significantly, are promising even under commercially realistic conditions, and in particular, poison resistance can be improved.

In one aspect of this invention, the inventors have discovered an electrode-membrane combination comprising:

at least one reactant diffusive, electronically conductive electrode comprising at least one first catalytically active metal and at least one ionically conductive polymer; and at least one ionically conductive membrane contacting the electrode to form an electrode-membrane interfacial region, wherein the interfacial region comprises at least one zone comprising at least two different second catalytically active metals and having a zone thickness of about 3 angstroms to about 5,000 angstroms.

In another aspect of this invention, the inventors have discovered an electrode-membrane combination comprising:

at least one porous, conductive electrode comprising at least one first catalytically active metal and at least one ionically conductive polymer; and at least one ionically conductive membrane contacting the electrode to form an electrode-membrane interfacial region, wherein the interfacial region comprises at least one zone comprising at least two different second catalytically active metals and having a zone loading of about 0.001 mg metal/cm$^2$ to about 0.7 mg metal/cm$^2$.

Still further, another aspect of this invention is an electrode-membrane combination comprising:

at least one reactant diffusive, electronically conductive electrode, wherein the electrode is substantially free of first catalytically active metal; and at least one ionically conductive membrane contacting the electrode to form an electrode-membrane interfacial region, wherein the interfacial region consists essentially of at least one zone comprising at least two second catalytically active metals, different from each other, and having a zone thickness of about 3 angstroms to about 5,000 angstroms.

Another aspect of this invention involves an electrode-membrane combination comprising:

at least one reactant diffusive, electronically conductive electrode, wherein the electrode is substantially free of first catalytically active metal; and at least one ionically conductive membrane contacting the electrode to form an electrode-membrane interfacial region, wherein the interfacial region comprises at least one zone consisting essentially of at least two second catalytically active metals, different from each other, and having a zone loading of about 0.001 mg metal/cm$^2$ to about 0.7 mg metal/cm$^2$.

The present invention also involves an electrode membrane combination in which noble metal in the combination is substantially concentrated at an electrode membrane interface for fuel cell catalysis, the combination consisting essentially of (i) at least one electronically conductive electrode which allows for fuel cell reactant transport and which is surface enriched with at least one ionically conductive polymer, and (ii) at least one ionically conductive membrane which contacts the electrode at the electrode surface which is enriched with ionically conductive polymer, thereby forming an electrode membrane interfacial region, wherein a vapor deposited layer comprising at least two vapor deposited noble metals is disposed at the interfacial region.

The invention further includes, in one aspect, a membrane electrode assembly for use in a solid polymer electrolyte fuel cell which has enhanced resistance to poisoning comprising two electrodes sandwiching a layer of solid polymer electrolyte to form two membrane electrode interfacial regions, wherein the solid polymer electrolyte layer is air impermeable and has a thickness less than about 75 microns, wherein the electrode is catalyzed with a vapor deposited zone consisting essentially of a composition of at least two noble metals which is formulated to enhance poison resistance during fuel cell operation.

In still another aspect of this invention, a membrane electrode assembly is provided which is prepared by the combination of steps comprising:

providing assembly elements including (i) at least one reactant diffusive, electronically conductive electrode which comprises at least one ionically conductive polymer but which is substantially free of a first catalytically active metal, and (ii) at least one ionically conductive membrane;

depositing onto at least one of the assembly elements a zone consisting essentially of at least two second catalytically active metals having a zone thickness of about 3 angstroms to about 5,000 angstroms, wherein the zone deposition is (i) a direct deposition onto the assembly element, or (ii) an indirect deposition onto the assembly element wherein the deposited zone is first deposited onto a substrate and then transferred from the substrate onto the assembly element, and optionally, assembling the membrane electrode assembly from the assembly elements.

The advantages of this invention, in its multiple embodiments, are numerous. In addition to improved power output with better catalyst utilization and poison resistance, a further important advantage is that multiple methods can be used to prepare the structures, and that these multiple methods can be tailored to different commercial applications. More precise design and control is now possible. Good integration between the membrane and electrode, and between membrane, cathode, and anode has been achieved. Also noteworthy are that the zone of catalyst metal does not substantially upset the water balance of the fuel cell system, that the invention can be applied to different fuel cell reactants, and that process scalability has been demonstrated. Different deposition methods can be used including electron beam physical vapor deposition and multi-target sputtering. Surprisingly, mixtures of catalysts can have both improved poison resistance and improved power output compared to a single catalyst. Finally, catalyst zones consist essentially of catalytically active metals for which organized, whisker-like substrates are not needed to support the metals, and which provide for good interfacial contact between catalytically active metal and ion conductive material.

In sum, the invention responds to the market demands to be commercially realistic.

BRIEF DESCRIPTION OF THE DRAWINGS

FIG. 1 is a cross-sectional view of an MEA according to the invention comprising an ionically conducting membrane sandwiched between two electronically conducting electrodes and forming two interfacial regions.

FIG. 2 is a cross-sectional view of a half cell according to the invention including an ionically conductive membrane contacting an electronically conductive electrode to form a membrane-electrode interfacial region. A zone of catalytically active metal is also present.

DETAILED DESCRIPTION OF THE INVENTION

Figure 3:
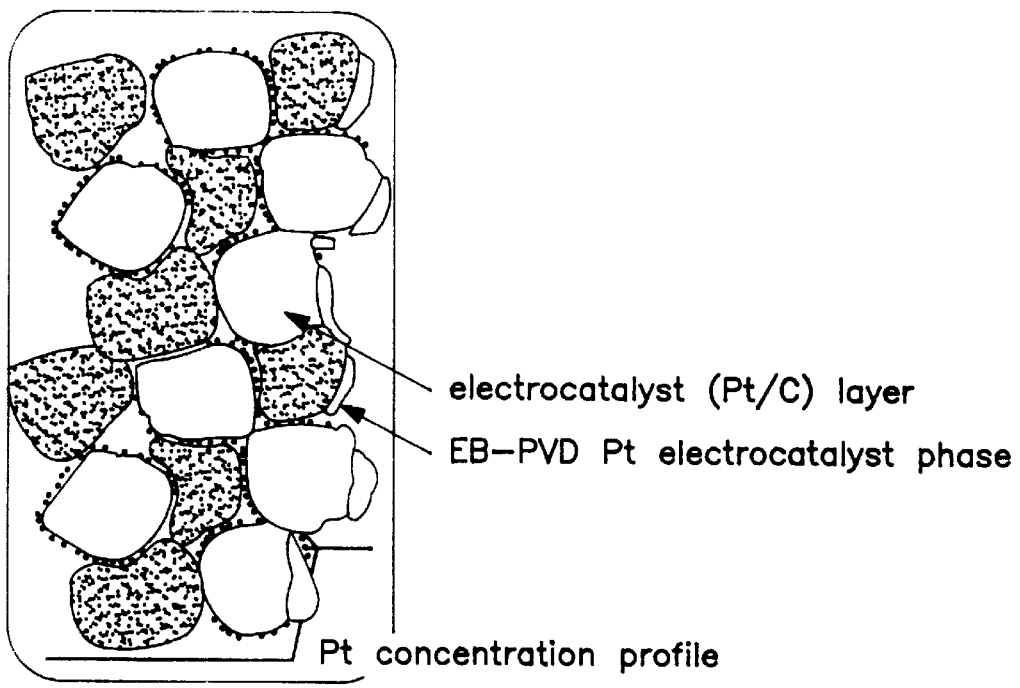
FIG. 3 is a representation of the z-gradient of catalytically active metal for one embodiment of the invention. The cross-sectional view of the electrode shows catalytically active metal vacuum deposited directly onto the electrode.

General Aspects of MEAs and Half Cells

FIG. 1 illustrates a cross-section of a planar geometry MEA according to this invention. The z-direction is shown coplanar with the page and perpendicular to the plane of the MEA. Components 1 and 3 represent electronically conductive electrodes (first and second electrodes) which each contact and together sandwich an ionically conductive polymeric membrane 2. Regions 4 and 5 represent first and second interfacial regions. The regions separate the membrane 2 from the first and second electrodes (1 and 3). The electrodes can include catalytically active metal including metal at the interfacial regions as an electrocatalyst region. The MEA comprises two half cells formed by combination of electrode 1 and membrane 2 (without electrode 3) or by combination of electrode 3 and membrane 2 (without electrode 1).

FIG. 2 illustrates a half cell according to this invention comprising the first electrode 1 and the tonically conductive membrane 2 which together contact and form interfacial region 4. The extent of the interfacial region can depend on, for example, (i) the method by which the membrane and electrode are brought into contact, (ii) the surface roughness and porosity of the membrane and electrode, and (iii) the possible use of similar materials (e.g., similar polymeric ionomers) in both electrode and membrane which merge upon assembly of electrode and membrane. Irrespective of how the half cell is formed, however, this interfacial region comprises a zone 6 of catalytically active metal(s) which optionally is the same catalytically active metal present in the electrode (first metal). However, the catalytically active metal(s) of zone 6 (second metal) can be deposited in a separate step from catalytically active metal in electrode 1. The second metal can be a different metal entirely from the first metal, or it can be the same metal but have a different structure or morphology. Mixtures of metals can be used so that, for example, the zone 6 comprises at least two different second catalytically active metals or the electrode comprises at least two different first catalytically active metals.

FIG. 3 illustrates by means of a cross-sectional view of an electrode a preferred embodiment of this invention (see Example 2 below). The electrode, which is porous and allows for reactant diffusion, comprises ionically conducting perfluorinated ionomer fused with particles of carbon supported platinum catalyst. In addition, the electrode comprises a vacuum deposited zone of platinum which helps form a z-gradient step function of catalytically active metal at the interface of the electrode and membrane. Even though the interface can have heterogeneity because of, for example, porosity and processing effects, the zone can be viewed singularly as a unitary element of the invention despite the possibility of zone interruption at particular regions in the membrane electrode assembly. Hence, for example, the zone can be characterized by a zone thickness, which is described further below.

Figure 4:
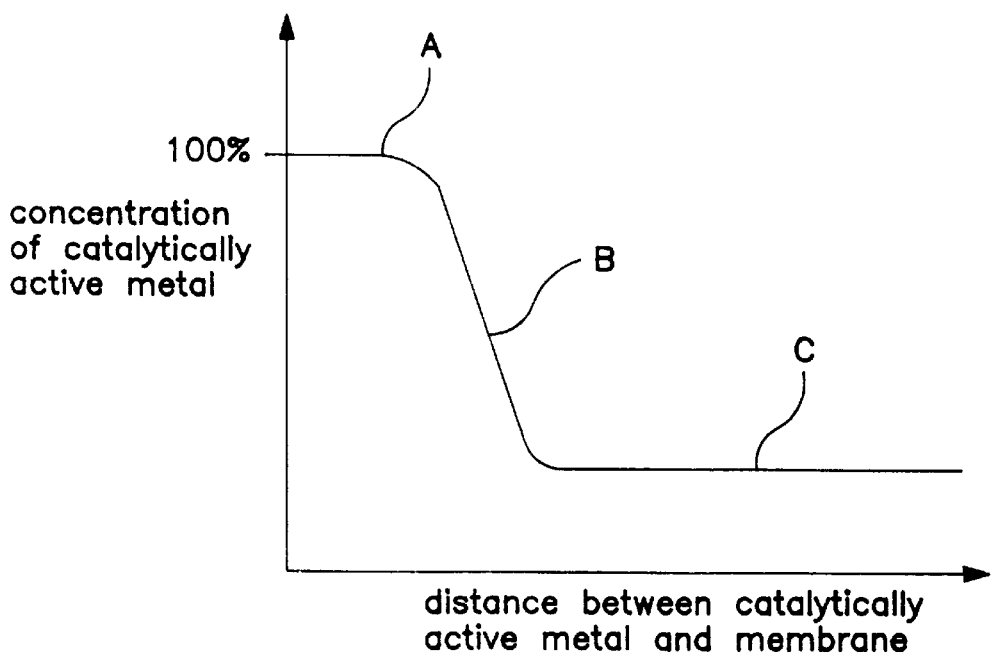
FIG. 4 further represents the general concept of the z-gradient, step function according to the invention.

FIG. 4 further represents the general z-gradient step function concept of this invention. In this representation, concentration of catalytically active metal in the electrode is generally shown as a function of distance from the membrane. The catalytically active metal can be either metal which is present originally in the electrode (i.e., first metal) or metal which is deposited separately (i.e., second metal). Initially, in region A, the catalytically active metal is entirely or substantially the second metal, and the electrode is substantially pure metal free from carbon or ionically conductive polymer. Then, a region B exists wherein the concentration of second metal drops. The slope in region B of this general representation can vary depending on, for example, surface roughness, electrode porosity, homogeneity, preparation method, and other experimental factors. The slope can include a linear or substantially linear portion. Finally, a region C exists wherein the concentration of catalytically active metal is due to the first metal originally present in the electrode before deposition of the second. If desired, region C can include a gradient in concentration of first catalytically active metal with higher concentrations toward the membrane. In practice, catalytically active metal can be distributed throughout the electrode with less than ideal uniformity.

Although the theory of the present invention is not fully understood, it is believed that an unexpected synergistic interaction can occur between the first catalytically active metal and the zone of deposited second catalytically active metal. As a result, significant power increases can be observed without substantial increase in metal loading, particularly when selected deposition methods are used.

This invention is widely applicable in fuel cell technology, particularly PEMFC technology. The fuel is preferably a gas such as hydrogen, but liquid fuels such as alcohols, including methanol, also can be used. Hydrocarbons including reformed gasoline or diesel fuel also can be used to provide fuel to the fuel cell. Air (oxygen) can be used to oxidize the fuel.

Use of Multiple Catalytically Active Metals

Both the first catalytically active metal and the second catalytically active metal can be present as mixtures of catalytically active metals without change in this general concept of a z-gradient step function shown in FIG. 4. If metal mixtures are present, then the concentrations of each metal would be added to yield the total concentration.

In particular, when poisoned fuel such as reformate fuel is used, a plurality or mixture of catalytically active metals (e.g., bimetallic catalysts) can be used to improve performance and reduce poisoning effects. The mixture can be, but need not be at least partially alloyed. In particular, carbon monoxide poisoning can be a problem even at levels as low as 5–100 ppm of carbon monoxide. For example, in this embodiment, the interfacial region can comprise at least two of the second catalytically active metals different from each other. Also, the electrode can comprise at least two of the first catalytically active metals different from each other. In this embodiment, the plurality of catalytically active metals is particularly preferred at the anode, which is exposed to fuel. The plurality of metals can include three, four, and even more different metals if desired. Good mixing of the metals, including metal alloying, can occur. For bimetallic systems, preferred combinations include Pt—Ru, Pt—Sn, Pt—Co, Pt—Cr, Pt—Mo, Pt—Al, and Pt—Ni, and the most preferred combination is Pt—Ru.

In a bimetallic system, the preferred relative amounts of the two metals can depend on the particular system. Preferably, substantially equal amounts (atomic amounts, not weight) of each metal are present in a Pt—Ru bimetallic system. In general, for a Pt—X system, wherein X is an additional catalytically active metal, the amount of X can be, for example, about 5% to about 60%, and more particularly, about 10% to about 40%, and preferably about 30% (the balance being platinum). Platinum does not need to be the element present in the largest amount, but rather, noble metals such as Pd and Rh also can be used in place of platinum as the primary metal.

Terniary catalyst systems are also possible such as, for example, Pt—Sn—Os, Pt—Ru—Cr, Pt—Ru—Mo, and combinations of these elements. The additional third catalytically active metal can help improve the catalyst activity particularly when less catalytically active metals such as, for example, Ru are present.

Multi-metallic catalyst systems according to the present invention are described further below in the description of the "SECOND EMBODIMENT".

Electrodes

The reactant diffusive, electronically conductive electrodes, including cathode and anode, can be prefabricated before they are contacted with the tonically conductive membrane or subjected to the deposition of the second catalytically active metal. In general, conventional gas diffusion electrodes are commercially available and can be used either directly or with modification. For example, low platinum loading electrodes, or catalyst free electrodes, can be obtained from E-TEK, Inc. (Natick, Mass.) or from Electrochem, Inc.

Electrodes should comprise components which provide structural integrity, effective water management, diffusivity to reactants including porosity or diffusivity to gases, electronic conductivity, catalytic activity, processability, and good interfacial contact with the membrane. The structure of the electrode is not particularly limited provided that these functional attributes are present. In general, at least one ionically conductive polymer should be present as part of the electrode to increase catalyst utilization.

The electrodes generally can be of substantially planar geometry. Planar means an article or form made so as to have length and width dimensions, or radial dimensions, much greater than the thickness dimension. Examples of such articles include polymeric films or membranes, paper sheets, and textile fabrics. Once formed, such planar articles can be used as an essentially flat article, or wound, folded, or twisted into more complex configurations.

The electrodes are at least partially porous, wherein porous means a structure of interconnected pores or voids such that continuous passages and pathways throughout a material are provided. More generally, the electrode should allow reactants to diffuse or be transported through the electrode at commercially usable rates.

Electrode preparation, electrocatalyst layers, and other aspects of fuel cell technology are described in, for example, U.S. Pat. Nos. 5,211,984 and 5,234,777 to Wilson, which are hereby incorporated by reference. For example, Wilson teaches use of catalyst-containing inks and transfer methods to fabricate electrodes and electrocatalyst layers comprising ionically conductive polymer and metal catalyst. In these patents, an uncatalyzed porous electrode is placed against a film of catalyst during fuel cell assembly to form a gas diffusion backing for the catalyst film. However, the catalyst films in Wilson, unlike those of this invention, generally have little if any porosity.

Preferred electrodes are layers formed of electrically conductive particulate materials, which may include catalyst materials, held together by a polymeric binder. If desired, hydrophobic binders such as polytetrafluoroethylene can be used. Ion exchange resin also can be used as binder.

Expanded or porous polytetrafluoroethylene can be used to support the electrocatalyst. In particular, a preferred electrode can be prepared by the following procedure ("Procedure A"):

A dispersion of 5 g of carbon black-platinum (50 wt. %) particles (from NE Chemcat Co.) in 40 g 2-methyl-1-propyl alcohol is prepared. To the dispersion is added a liquid composition of isopropyl alcohol containing 9 wt. % Nation® perfluorosulfonic acid resin (DuPont) and thoroughly mixed, with the aid of ultrasonic agitation, to form a liquid mixture, having a relative concentration of 50 wt. % ion exchange resin and 50 wt. % carbon black supported platinum. The liquid mixture is painted by brush to impregnate a porous expanded polytetrafluoroethylene electrode-support film (thickness—16 micrometers; pore volume 94%; IBP 0.12 kg/cm$^2$). Solvent is removed by air drying. The composite structure is heat treated at 120° C. for 24 hours to complete the procedure.

This procedure A also can be carried out, for example, with use of at least 25 wt. % catalyst (carbon black-platinum) with the balance being perfluorinated ionomer polymer. Preferably, the electrode in this composite structure has some porosity and is reactant diffusive.

For use as an electrode support, the porous or expanded polytetrafluoroethylene film should be thin and can have, for example, a thickness of about 3 microns to about 200 microns, and more particularly, about 3 microns to about 30 microns, and preferably about five microns to about 20 microns. This relatively thin catalyst-containing electrode can be contacted with other electrically conducting components which, for example, do not contain catalyst and provide passageway for reactants.

The pore volume of the ePTFE electrode support can be, for example, about 60% to about 95%, and preferably, about 85% to about 95%. The maximum pore size defined by an isopropanol bubble point (IBP) can be, for example, about 0.05 kg/cm$^2$ to about 0.5 kg/cm$^2$, and preferably, about 0.05 kg/cm$^2$ to about 0.3 kg/cm$^2$. The Bubble Point was measured according to the procedures of ASTM F316-86. Isopropyl alcohol was used as the wetting fluid to fill the pores of the test specimen. The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

Before deposition of the zone of second catalytically active metal, the electrode preferably has relatively low level of catalyst loading such as, for example, about 0.01 mg/cm$^2$ to about 1 mg/cm$^2$, and preferably, about 0.02 mg/cm$^2$ to about 0.5 mg/cm$^2$, and more preferably, about 0.05 mg/cm$^2$ to about 0.4 mg/cm$^2$. Preferably, it is less than about 0.3 mg/cm$^2$. Preferably, the total catalyst loading for a single MEA is less than about 0.65 mg/cm$^2$, and more preferably, less than about 0.2 mg/cm$^2$.

At least one first catalytically active metal is distributed throughout the porous surface of the electrodes. Catalytically active generally means that the metal is in some way helping to provide catalysis. The first and second catalytically active metals can be and preferably are the same metals. Both the first and second catalytically active metals can be, for example, noble metals or Group VIII metals. Particular examples include Pt, Pd, Ru, Rh, Ir, Ag, Au, Os, Re, Cu, Ni, Fe, Cr, Mo, Co, W, Mn, Al, Zn, Sn, with preferred metals being Ni, Pd, Pt, and the most preferred being Pt. If desired, a plurality of catalytically active metals (e.g., bimetallic) can also be selected from this list. Co-catalysts and promoters can also be present such as, for example, C, Ni, Al, Na, Cr, and Sn. Any conventional agents to enhance fuel cell performance can be used.

The first catalytically active metal is preferably in the form of metal loaded carbon particles. For example, the carbon particles can be loaded with metal in amounts of at least 10 wt. % metal, and preferably, at least 20 wt. % metal. Preferably, the first catalytically active metal is relatively uniformly distributed and randomly dispersed throughout the electrode. Electrodes can be, for example, formed from particles of high surface area carbon, such as Vulcan XC72 (about 200 m$^2$/g) or Black Pearls 2000 (about 1000 m$^2$/g) available from Cabot, Boston, Mass. which are loaded with particles of platinum of about 20 angstroms to about 50 angstroms in size to an electrode area loading of about 0.35 mg/cm$^2$.

In addition to supported metal catalyst, the electrode should further comprise ionically conductive polymer to improve the contact of the electrode to the membrane and increase catalyst utilization. The ionically conductive polymer of the membrane (a "first ionically conductive polymer") can be substantially the same or different than the ionically conductive polymer of the electrode (a "second ionically conductive polymer"), although they preferably are substantially the same. Substantially the same means that the two ionically conductive materials, for example, (i) can be selected to have different equivalent weights although having the same general chemical identity, (ii) can be used with different contents of fillers or additives; or (iii) can have the same general polymer backbone but different ionic groups.

The electrode can further comprise at least one hydrophobic component such as a fluorinated polymer, preferably a perfluorinated polymer such as polytetrafluoroethylene. If desired, this hydrophobic component can be concentrated at the electrode-membrane interface. Other examples include tetrafluoroethylene/(perfluoroalkyl) vinyl ether copolymer (PFA), or tetrafluoroethylene/hexafluoropropylene copolymer (FEP). This fluorinated hydrophobic component can help improve water repellency in the electrode structure.

A pore-forming agent or sacrificial filler also can be included in the electrode such as, for example, ammonium bicarbonate, sodium chloride, or calcium carbonate. This agent can be removed by, for example, heating or leaching to create voids and improve gas diffusivity. Gas diffusivity can be tailored to the application.

The electrode can further comprise at least one solvent used during electrode preparation. However, solvent may slowly evaporate from the electrode. Hence, solvent initially present may not be present at a later time. Solvents are known in the art for electrode ink preparations. Exemplary solvents include polar solvents and alcohols.

The Membrane

The ionically conductive membrane should provide, for example, strength, high ionic conductance, and good interfacial contact with the electrode. The structure of the membrane is not particularly limited provided that these functional attributes are present. Reinforced composite membranes are preferred.

The membrane is preferably made largely of one or more fluorinated polymers, and preferably, mixtures of perfluorinated polymer and fluorinated ion exchange resin. In a preferred embodiment, the membrane is prepared from porous or expanded polytetrafluoroethylene which is impregnated with ion exchange resin such as a sulfonated perfluorinated ionomer including NAFION® (EW can be, for example, 1100). Similar ionomers such as, for example, FLEMION® (Asahi Glass) can also be used. Substantially all (>90%) of the open porous volume can be impregnated so that a high Gurley number (>10,000 seconds) is provided.

Impregnated membranes are described in, for example, U.S. Pat. Nos. 5,547,551; 5,635,041; and 5,599,614 to Bahar et al., which are hereby incorporated by reference. These patents describe test procedures and characteristics of the membranes.

Membranes can be prepared with use of a microporous base material made in accordance with the teachings of U.S. Pat. No. 3,593,566 incorporated herein by reference. Base materials are available in various forms from W. L. Gore and Associates, Inc. (Elkton, Md.). Such a base material has a porosity of greater than 35%. Preferably, the porosity is between about 70% and 95%. The porous microstructure can comprise (i) nodes interconnected by fibrils, or (ii) fibrils.

Average pore size for the base material can be, for example, about 0.05 microns to about 0.4 microns. The pore size distribution value can be, for example, about 1.05 to about 1.20. Pore size measurements are made by the Coulter Porometer™, manufactured by Coulter Electronics, Inc. (Hialeah, Fla.). The Coulter Porometer is an instrument that provides automated measurement of pore size distributions in porous media using the liquid displacement method described in ASTM Standard E1298-89. The Porometer determines the pore size distribution of a sample by increasing air pressure on the sample and measuring the resulting flow. This distribution is a measure of the degree of uniformity of the membrane (i.e., a narrow distribution means there is little difference between the smallest and largest pore size). The Porometer also calculates the mean flow pore size. By definition, half of the fluid flow through the filter occurs through pores that are above or below this size.

High Gurley numbers are preferred for the membrane. The Gurley air flow test measures the time in seconds for 100 cc of air to flow through a one square inch sample at 4.88 inches of water pressure in a Gurley Densometer (ASTM D726-58). The sample is placed between the clamp plates. The cylinder is then dropped gently. The automatic timer (or stopwatch) is used to record the time (seconds) required for a specific volume recited above to be displaced by the cylinder. This time is the Gurley number. The Frazier air flow test is similar but is mostly used for much thinner or open membranes. The test reports flow in cubic feet per minute per square foot of material at 0.5 inches water pressure.

The composite membrane is preferably thin having a thickness of, for example, more than about 3 microns, but less than about 75 microns, and more preferably, less than about 50 microns, and even more preferably, less than about 30 microns. About 20 microns and less is most preferred. Membrane thickness can be determined with use of a snap gauge such as, for example, Johannes Kafer Co. Model No. F1000/302). Measurements are taken in at least four areas in each specimen.

In addition, the membranes should have high ionic conductance, preferably greater than about 8.5 mhos/cm$^2$, and more particularly, greater than about 22 mhos/cm$^2$. Ionic conductance can be tested using a Palico 9100-2 type test system. This test system consisted of a bath of 1 molar sulfuric acid maintained at a constant temperature of 250° C. Submerged in the bath were four probes used for imposing current and measuring voltage by a standard "Kelvin" four-terminal measurement technique. A device capable of holding a separator, such as the sample membrane to be tested, was located between the probes. First, a square wave current signal was introduced into the bath, without a separator in place, and the resulting square wave voltage was measured. This provided an indication of the resistance of the acid bath. The sample membrane was then placed in the membrane-holding device, and a second square wave current signal was introduced into the bath. The resulting square wave voltage was measured between the probes. This was a measurement of the resistance due to the membrane and the bath. By subtracting this number from the first, the resistance due to the membrane alone was found.

Impregnated composite membranes can be prepared by repeatedly contacting one or both sides of the base porous substrate with a solution of ionically conductive polymer. Surfactants can be used to impregnate. In each impregnation step, solvent can be removed and heating carried out to help bind or lock the ionically conductive polymer in the base substrate.

Laminated membranes can be used. For example, laminated membranes can have fewer problems with pinholes. The membranes can also include catalyst metal such as, for example, platinum, as well as metallic oxides such as silica. Particularly preferred membranes include those known as GORE-SELECT® available from W. L. Gore and Associates, Inc (Elkton, Md.).

Combining Electrode and Membrane; the Interfacial Region

An important advantage of this invention is in avoiding difficulties of combining thin membranes with an electrode by traditional methods like hot-pressing. Membrane damage can occur with hot pressing. The electrode-membrane combination should be mechanically and electrochemically compatible.

The electrode is brought into contact with the membrane to form an interfacial region. At the interfacial region, both membrane and electrode can influence activity occurring at the region. This interfacial region, like the membrane and the electrode, generally is substantially planar. At this interfacial region resides a zone, which preferably is a layer or coating, of the second catalytically active metal which unexpectedly and substantially improves the power output of the fuel cell. The interfacial region may not be perfectly homogeneous because the mating surfaces can have, for example, softness, inhomogeneity, porosity, and surface roughness. Also, ion conductive polymer can be at the surface of the electrode, before the electrode surface is contacted with the ion conductive polymer of the membrane. Merger or fusion of the two ion conductive polymers can occur. However, in general, the zone of second catalytically active metal is associated more with the electrode side of the interface than the membrane side because the zone, like the electrode, is electronically conductive. Nevertheless, it can be possible in some cases for some of the zone to be associated with the membrane as well depending on the process used to generate the interface and the zone of second catalytically active metal.

The membrane-electrode interfacial region can also be favorably influenced by impregnating the electrode with tonically conductive resin after incorporation of the zone of second catalytically active metal but before combination of the electrode with the membrane. This impregnation helps improve the three-phase contact of ion conductive material, catalyst material, and electronically conductive material.

MEAs With Increased Power Outputs

The incorporation of the zone of second catalytically active metal at the interfacial region can result in a large percent increase in current density (mA/cm$^2$), and also power output (p=I×V), at a given voltage on a polarization curve (e.g., 0.6 V) compared to a reference MEA without the zone of second catalytically active metal. This percentage increase can be as high as 20% or more, and preferably, 30%, and more preferably, 40% or more. In some cases, improvements over 90% have been observed.

Surprisingly, greater percent increases can be found for thinner zones. Hence, an important advantage of this invention is that high percent power increases can be observed with introduction of only a thin catalytic layer, and an R ratio can be defined as:

percent increase in current density/zone thickness (Å)

wherein current densities are measured at 0.6 V in the polarization curve under steady-state conditions. Cell temperature should be between about 600° C. and about 80° C., and preferably, about 650° C. For example, this R ratio is about 0.7 when a 33% percent increase is found for deposition of a 50 angstrom layer (see working examples). Similarly, this R ratio is about 0.9 when a 46% increase is found for deposition of a 50 angstrom layer. Surprisingly, R can be greater than 22 (22.6) when a 113% increase is found for a 5 angstrom coating. Hence, surprising features of this invention include R values greater than 0.5, preferably greater than 1, more preferably greater than 5, more preferably greater than 10, and even more preferably greater than 20. If desired, the R value can be less than 50, and preferably less than 30, if the system needs to be tailored to a particular application. Calculation of this R ratio assumes that some fuel cell reaction occurs in the absence of the zone of second catalytically active metal.

Zone Thickness and Loadings

The thickness of the zone of second catalytically active metal, which represents a statistically valid average thickness, can be determined by statistically sound methods known in the art. These include direct and indirect (or less direct) measurement methods. Direct methods using samples of assembled elements can be used to confirm the thicknesses as measured by indirect methods employed during production. Direct methods can involve, for example, cross sectional analysis of structures after combination of the electrode and membrane. Indirect (or less direct) methods can involve knowledge of the production method and include use of, for example, a microbalance together with use of known deposition rate and deposition time (e.g., 1 Å/sec deposition rate for 50 seconds of deposition yields approximately 50 Å average thickness). Witness slides can be used, and calibration curves can be established to help determine thickness. Other methods include scanning electron microscopy, transmission electron microscopy, atomic absorption, and gravimetric techniques. Multiple methods can be used, if desired, to confirm that the desired zone thickness is present, and to determine the effects, if any, of processing on the thickness for a given system.

In general, when the zone of second catalytically active metal comprises, or consists essentially of, only one type of metal, the zone thickness can be about 3 angstroms to about 475 angstroms, and more particularly, about 5 angstroms to about 250 angstroms, and even more particularly, about 5 angstroms to about 50 angstroms. Thicknesses much greater than about 475 angstroms, in general, can reduce layer uniformity and possibly block diffusion. However, the degree to which diffusion is blocked can depend on the structure of the zone.

In general, when the zone of second catalytically active metal comprises, or consists essentially of, at least two types of metals, the zone thickness can be relatively thicker such as, for example, about 3 angstroms to about 5,000 angstroms, and more particularly, about 50 angstroms to about 1,500 angstroms, and even more particularly, about 150 angstroms to about 500 angstroms.

Examples of loadings, or surface loadings, of the zone of at least one second catalytically active metal include about 0.0006 mg/cm$^2$ to about 0.12 mg/cm$^2$, and more particularly about 0.0007 mg/cm² to about 0.09 mg/cm², and more particularly, 0.001 mg/cm² to about 0.05 mg/cm², and more particularly, about 0.005 mg/cm² to about 0.02 mg/cm².

In general, when the zone of second catalytically active metal comprises at least two metals, then relatively larger thicknesses and higher loadings of second catalytically active metal can be needed. Ranges for thicknesses can be, for example, 3 Å to 5,000 Å, and more particularly, 50 Å to 1,500 Å, and even more particularly, 150 Å to 500 Å. Loading ranges can be, for example, about 0.001 mg/cm² to about 0.7 mg/cm², and more particularly, 0.01 mg/cm² to about 0.4 mg/cm², and even more particularly, 0.02 mg/cm² to 0.3 mg/cm².

In general, thicknesses and loadings are preferred which provide optimal combinations of properties, which can depend on the particular application.

Vacuum Deposition Methods

Typical vacuum deposition methods include chemical vapor deposition, physical vapor or thermal deposition, cathodic arc deposition, ion sputtering, and ion beam assisted deposition (IBAD). A low vacuum/convection-based method which requires less vacuum is jet vapor deposition (JVD). Because the materials are deposited in vacuum (typically less than 13.3 mPa, or $1\times10^{-4}$ torr), contamination of the films can be minimized while maintaining good control over film thickness and uniformity. Deposition over large areas can be achieved via reel-to-reel or web coating processes. The present invention makes use of these and other vacuum deposition techniques, particularly magnetron sputtering and physical vapor deposition.

Most preferably, electron beam—physical vapor deposition (EB-PVD) is used. Deposition rates can range, for example, from 0.1 Å/sec to 10 Å/sec. If necessary, heating of the substrate can be limited.

In addition, deposition methods such as, for example, combustion chemical vapor deposition (CCVD) can be used which do not require a vacuum. Wet chemical deposition methods can be used but are not preferred.

The structure or morphology of the deposited zone of the at least one second catalytically active metal can depend on, for example, the substrate, the deposition method, and the loading of the second catalytically active metal. The structure can be analyzed by, for example, field-emission scanning electron microscopy (FE-SEM). This analysis shows that relatively uniform zones of the second catalytically active metal are formed. This substantial uniformity is present irrespective of the type of film morphology present.

In general, sputter deposition can provide more dense zones than thermal evaporation methods such as EB-PVD. In general, the EB-PVD zones can exhibit a greater degree of surface texture. Although the theory and detailed structure of the present invention are not fully understood, the excellent power improvements found herein may be due to the relatively open surface texture. This openness may provide, for example, better reactant transport and more surface area for reaction.

At relatively thin zone thicknesses of, for example, five angstroms, the FE-SEM analysis of the electrode can reveal small but measurable increases in field brightness compared to the reference electrode without a deposited zone. Surprisingly, relatively uniform deposition was observed. At thicker thicknesses of, for example, 50 angstroms, the FE-SEM analysis can reveal substantially spherical nodules of deposited metal approximately 25 nm to about 100 nm, and in particular, about 30 nm to about 70 nm, and more particularly, about 50 nm in diameter. At even greater thicknesses of, for example, 500 angstroms, the FE-SEM analysis can reveal, in addition to the substantially spherical nodules, rod-shaped structures in which the rods have diameters of about 20 nm to about 100 nm, and more particularly, about 20 nm to about 60 nm, and even more particularly, about 40 nm. The rod length can vary. Whisker or hair-like morphology can be produced.

Description of a Second Embodiment: Reduced Poisoning

In the embodiments of the present invention described above, both first and second catalytically active metals were described as part of the membrane electrode combination. In these embodiments, the one or more second catalytically active metals are deposited, preferably by vapor deposition, as a metallic zone at the membrane-electrode interfacial region. This zone is distinct from the one or more first catalytically active metals, which are part of the electrode.

These embodiments collectively are called for purposes of this application "THE FIRST EMBODIMENTS" which encompass embodiments wherein not all of the electrode catalytically active metal is in the zone of second catalyst.

In alternative embodiments, however, which are now described, the electrode of the membrane-electrode combination is substantially free of first catalytically active metal, and the zone of second catalytically active metal includes at least two different catalytically active metals which helps improve resistance to poisoning. Hence, the primary, and preferably essentially all, catalytic activity is from the zone. These alternative embodiments, wherein the electrode is substantially free of first catalytically active metal, are called collectively for purposes herein "THE SECOND EMBODIMENT" and are described further hereinbelow.

In the second embodiment, preferably, the amount of first catalytically active metal is minimized so that the electrode is substantially free of first catalytically active metal, and preferably, totally free. More specifically, catalytic loading for the first catalytically active metal can be less than about 0.1 mg/cm², and preferably less than about 0.01 mg/cm, and more preferably, less than about 0.001 mg/cm² in the second embodiment. This minimization in the amount of first catalytically active metal can be particularly desirable when only one first catalytically active metal is present (e.g., only platinum is present). In this case, if the amount of first catalytically active metal is not minimized, then expensive metal can be wasted because of poisoning.

In the second embodiment, an essentially uncatalyzed, electronically conductive gas diffusion electrode can be used as a substrate for deposition of the zone of at least two second catalytically active metals. The uncatalyzed electrode can comprise, for example, electronically conductive carbon particulate and a hydrophobic binder for the particulate. The hydrophobic binder can be, for example, a fluorinated polymer, and preferably, a perfluorinated polymer, such as, for example, polytetrafluoroethylene. An example of an uncatalyzed gas diffusion electrode can be found in the uncatalyzed gas diffusion electrodes or media of the ELAT™ series (available from E-TEK, Inc., Natick, Mass.) Thickness of the electrode before deposition of the second catalytically active metal can be, for example, about one micron (0.001 mm) to about 1,000 microns (1 mm), and more particularly, about 250 microns (0.250 mm) to about 750 microns (0.750 microns). Combinations of relatively thin electrode elements can be used to form thicker electrode structures. As noted above, fibrillated or expanded polytetrafluoroethylene can be used to fabricate electrodes.

In the second embodiment, the thickness of the zone comprising at least two second catalytically active metals can be, for example, between about 3 angstroms and about 5,000 angstroms, and more particularly, between about 50 angstroms and about 1,500 angstroms, and even more particularly, between about 150 angstroms and about 500 angstroms. For a cathode, the zone thickness should be at least 500 angstroms, whereas for an anode, the zone thickness can be less than 500 angstroms.

In the second embodiment, zone loading can be, for example, about 0.001 mg/cm$^2$ to about 0.7 mg/cm$^2$, and more particularly, 0.01 mg/cm$^2$ to 0.4 mg/cm$^2$, and even more particularly, 0.02 mg/cm$^2$ to 0.3 mg/cm$^2$.

The zone can comprise at least two catalytically active metals which can be at least in part alloyed with each other, and more particularly, substantially alloyed with each other. Multiple alloy phases can be present, as well as mixtures of alloyed and unalloyed phases. Alloying can be detected, for example, by x-ray diffraction (XRD) analysis of the metals. In addition, it can be detected by x-ray photoelectron spectroscopic (XPS) analysis, although in general the XPS method is less preferred for detection of alloying because it reflects surface analysis, whereas the XRD method reflects bulk analysis. XRD can also be advantageously used to detect crystallinity in the zone of second catalytically active metal. Multiple analytical methods can be used to probe the structure of the deposited zone (e.g., bulk versus surface structure).

Deposition methods are noted above in the description of the first embodiment and include sputtering and thermal evaporation. In a multi-metallic physical vapor deposition, such as electron beam physical vapor deposition, separate metal sources of about 99.9 wt. % platinum and about 99.9 wt. % ruthenium are evaporated. Preferably, for a bimetallic mixture of these metals, the atomic ratio of each metal is about 1:1. Simultaneous or sequential physical vapor deposition methods can be used. In simultaneous deposition, two different sources are used and simultaneously evaporated together, and the vapor composition is controlled by each source's relative evaporation rate. In sequential deposition, each metal is separately evaporated from its source in a toggle-like manner and deposited onto the chosen substrate in alternate thin layers. Alloying of the metals can be encouraged when the layers are thin enough. In addition, ion bombardment treatment such as, for example, ion beam assisted deposition (IBAD) can be used to encourage alloying. In general, simultaneous deposition is preferred.

In another embodiment, sputtering processes such as, for example, multi-target dc sputtering can be used to deposit the zone of second catalytically active metal. The zone can comprise, for example, ternary platinum alloys.

Improvements in membrane electrode assembly performance, despite the presence of impurities like CO, can be detected by, for example, (i) the shifting of the onset of substantial electrode polarization to higher current densities; and (ii) the reduction of the potential at which the fuel mixture can be oxidized at high rates. Comparative poison resistance testing can be carried out by comparing performance between samples in which the only difference is the composition of the zone of deposited metal. This concludes the specific description of the second embodiment in this section, although further description, including performance description, is given in the Examples section.

MEA and Fuel Cell Assembly Methods

Several methods can be used to assemble the half cell or MEA which incorporates the zone. In describing these methods, assembly elements include the electrode and the membrane. The zone can be deposited on assembly elements either directly or indirectly. In direct deposition, the zone is deposited directly on the electrode, the membrane, or both as part of MEA assembly. In indirect deposition, however, the zone is initially deposited onto a substrate, not an assembly element, and then the zone is transferred from the substrate to the assembly element, preferably the membrane. The substrate is not particularly limited but can be, for example, low surface energy support such as skived polytetrafluoroethylene which allows for ready transfer and preservation of the zone.

Additional components and conventional methods can be used to assemble fuel cells and stacks. For example, gas diffusion media include, for example, ELAT™ gas diffusion media available from E-TEK, Inc. (Natick, Mass.) as well as CARBEL® CL gas diffusion media available from W. L. Gore and Associates, Inc. (Elkton, Md.). Gas diffusion media can be catalyzed, if desired, with one or more metals such as, for example, noble metals including platinum to improve performance. Catalyzation of gas diffusion media, for example, can activate heterogeneous catalysis and improve reactions such as, for example, (i) water-gas shift reaction of carbon monoxide with water to form carbon dioxide and hydrogen, and (ii) preferential oxidation reaction of carbon monoxide with oxygen to form carbon dioxide. Also, the catalyst can provide absorption sites to capture carbon monoxide coming from poisoned fuels such as reformate. The gas diffusion media can be catalyzed by vapor deposition methods such as, for example, physical vapor deposition. In addition, fuel cell gaskets can be used made of, for example, GORE-TEX®, also available from W. L. Gore and Associates, Inc. The present invention is not particularly limited by these additional components and methods.

MEAs known as PRIMEA® (including, for example, the 5000 and 5510 series) are also available from W. L. Gore and Associates, Inc. (Elkton, Md.).

Representative Applications and Performance

The invention is versatile and can be used in a variety of applications including: (i) transportation vehicles such as cars, trucks, and buses which have requirements including high power density and low cost; (ii) stationary power applications, wherein high efficiency and long life are required; and (iii) portable power applications such as portable television, fans, and other consumer products. Methods to use fuel cells in these applications are known.

Surprisingly, MEAs according to this invention can provide catalyst mass activities greater than 2,500 mA/mg of catalytically active metal, and preferably, greater than 5,000 mA/mg of catalytically active metal. At this catalyst mass activity level, commercialization becomes feasible, particularly when poison resistance is also present. The zone of second catalytically active metal does not modify important commercial considerations such as the existing water balance. Hence, MEAs according to the present invention can be operated under the same temperature and humidification conditions.

Finally, additional fuel cell technology is described in, for example, the references cited in the background as well as the following references, which are hereby incorporated by reference: (i) "High performance proton exchange membrane fuel cells with sputter-deposited Pt layer electrodes"; Hirano et al.; *Electrochimica Acta*, vol. 42, No. 10, pp. 1587–1593 (1997); (ii) "Effect of sputtered film of platinum on low platinum loading electrodes on electrode kinetics of oxygen reduction in proton exchange membrane fuel cells"; Mukerjee et al.; *Electrochimica Acta*, vol. 38, No. 12, pp. 1661–1669 (1993); (iii) "Sputtered fuel cell electrodes"; Weber et al.; *J. Electrochem. Soc.*, June 1987, pp. 1416–1419; and (iv) "Anodic oxidation of methanol at a gold modified platinum electrocatalyst prepared by RF sputtering on a glassy carbon support"; *Electrochimica Acta*, Vol. 36, No. 5/6, pp. 947–951, 1991.

The invention is further described by means of the following non-limiting examples.

EXAMPLES

General Procedures

In each example, unless otherwise noted, the ionically conductive membrane (proton exchange membrane, PEM) was approximately 20 microns thick. The membrane was a fully impregnated membrane of high Gurley number (>10,000 seconds) and high ionic conductance prepared by impregnating expanded polytetrafluoroethylene with a perfluorinated sulfonic acid resin (FLEMION®, EW 950) as described in U.S. Pat. Nos. 5,547,551; 5,635,041; and 5,599,614 to Bahar et al. The membrane is called GORE-SELECT® and is available from W. L. Gore and Associates, Inc. (Elkton, Md.). These patents are hereby incorporated by reference in their entirety.

The electrode comprising the first catalytically active metal, unless otherwise noted, was prepared as described above for Procedure A to generate a target metal loading. The electrode comprises Pt supported on carbon, ionically conductive polymer, and solvent. The electrodes had platinum loadings which ranged from 0.05 mg Pt/cm$^2$ to 0.4 mg Pt/cm$^2$.

In Examples 2 and 4 below, a zone of second catalytically active metal was coated or deposited onto a substrate, either electrode or membrane, by electron beam physical vapor deposition (EB-PVD). In this procedure, a substrate, typically 6 in.×6 in., was mounted onto a 4-point holder carrousel in a vacuum chamber, where each holder was mounted on a rotating axis, each of which could rotate about the main axis of the carrousel. A platinum target was prepared by melting 99.95% purity platinum coins in a 2 in.×2 in. crucible in the vacuum chamber (1.5 m diameter, 2 m long), followed by recooling. The crucible was also located in the vacuum chamber. The chamber was then evacuated to less than $10^{-4}$ torr (e.g., $5 \times 10^{-5}$ torr) using a diffusion pump. The platinum target was then evaporated using an electron beam for heating, and platinum was condensed onto the substrate. Arial uniformity of the deposited coating was ensured by rotating the sample about both rotational axes of the holder during deposition. The amount of platinum zone deposited was measured using a vibrating crystal microbalance, calibration curves, and deposition rates and times. Zone thickness and loading amounts were calculated.

In Examples 1–3 and 5 below, I-V measurements were obtained after the MEA had reached steady state.

In each Example, the area of the cathode and anode contacting the membrane were substantially the same. In practicing this invention, however, these areas do not need to be the same.

Unless otherwise noted, MEA testing was carried out with: 25 cm$^2$ electrode active area; ELAT® gas diffusion media (available from E-TEK, Inc., Natick, Mass.); clamping at 200 lb in/bolt torque; and GLOBE TECH® computer controlled fuel cell test station. The gas diffusion media was believed to comprise approximately 70% graphite cloth and 30% polytetrafluoroethylene. Clamping assured compression of the MEA to the flow field and diffusers.

Catalyst and electrode layers were supported on polytetrafluoroethylene backings and were transferred from the backing to the membrane by decal methods with hot pressing. Unless otherwise noted, hot pressing was carried out for 3 minutes at 160° C. with a 15 ton load. The backing was subsequently peeled off, leaving the coated layer(s) bonded to one side of the membrane and positioned centrally.

Reference MEAs, unless otherwise noted, were substantially the same as the MEA according to the invention except that no z-gradient zone was present in the reference MEA.

Example 1

Example 1 illustrates the indirect method wherein the zone of second catalytically active metal is first deposited onto a substrate before transfer from the substrate to the membrane or electrode.

A 50 Å platinum coating zone (0.01 mg/cm$^2$) was deposited at 1 Å/sec onto a skived PTFE substrate backing by EB-PVD. The catalyst zone was then transferred onto the membrane by the decal method leaving the 50 Å catalyst zone bonded to one side of the membrane and positioned centrally. The area of the membrane demarcated by the transferred catalyst is the active area. A catalyzed electrode (0.3 mg Pt/cm$^2$) was attached to each side of the catalyzed membrane also using the decal method, so as to overlay the active area. Therefore, one side of the MEA had a z-gradient zone of platinum at the membrane/electrode interface.

The prepared MEAs with 25 cm$^2$ active areas were each loaded between gaskets in a 25 cm$^2$ active area fuel cell test fixture or cell. The electrode containing the z-gradient zone was placed towards the cathode where it would be in contact with the oxidant (air). The test fixture was then attached to the fuel cell test station for acquisition of data.

MEA performance was evaluated with the cell pressure at 0 psig and at 15 psig. For the 0 psig cell pressure runs, the cell was operated at 60° C., with hydrogen and air humidified to dew points of 20° C. and 55° C. respectively. For the 15 psig cell pressure runs, the cell was operated at 75° C., with hydrogen and air both supplied at 15 psig and humidified to dew points of 30° C. and 70° C. Hydrogen and air flow rates were set to 2 and 3.5 times the stoichiometric value theoretically needed to produce a given cell current output.

Figure 5:
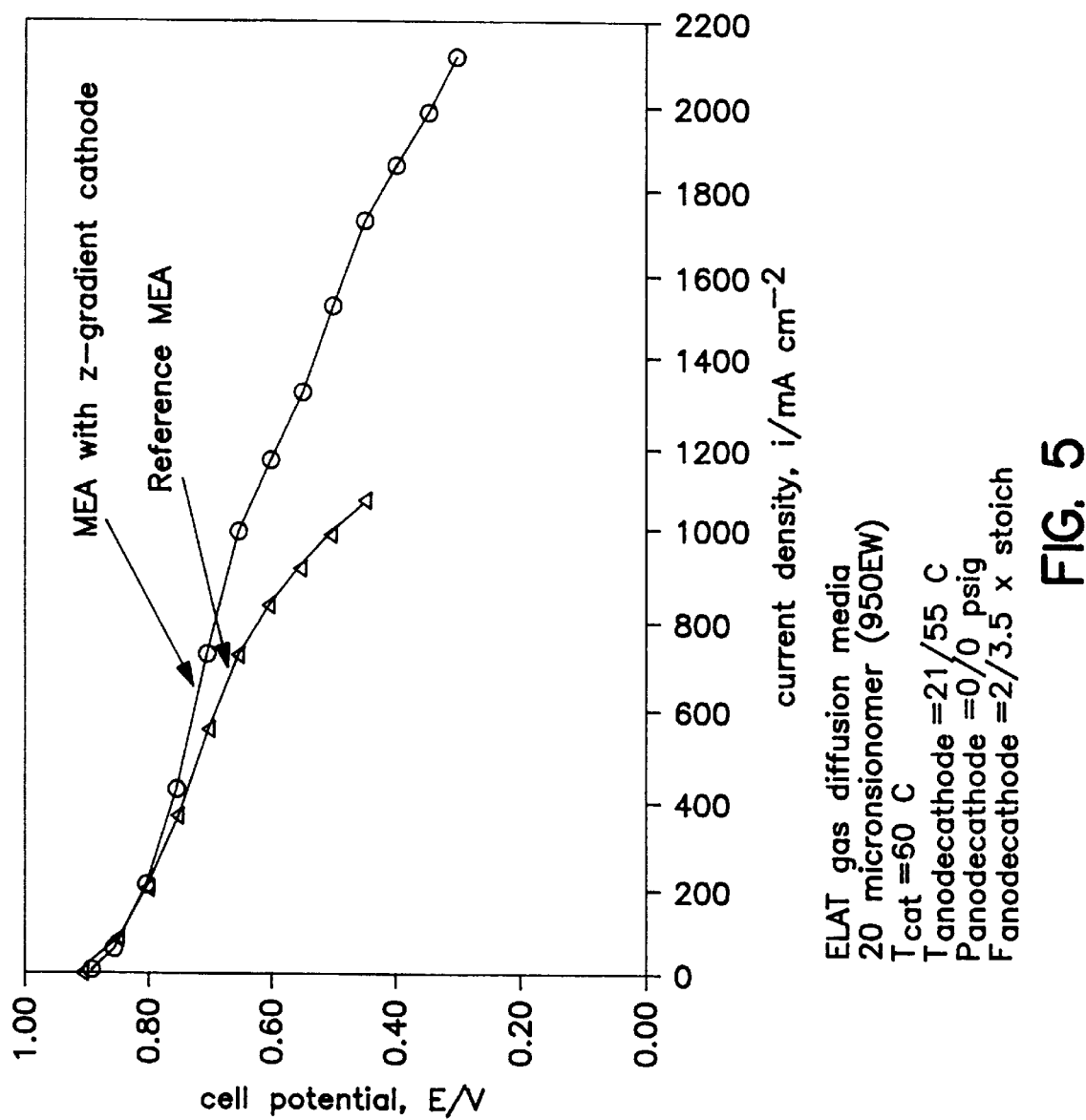
FIG. 5 shows current-voltage (I-V) analysis (or polarization curve) of an MEA with a z-gradient cathode (Example 1) compared to a reference MEA without a z-gradient cathode.

FIG. 5 shows the fuel cell output voltage at various current outputs for the MEA at 0 psig. Superior performance was observed in the MEA according to the invention compared to a reference MEA which was substantially the same except it did not contain the z-gradient catalyst layer. For example, at 0.6 V, the MEA according to the invention produced almost 1200 mA/cm$^2$ versus only about 820 mA/cm$^2$ for the reference (a 46% increase).

Figure 6:
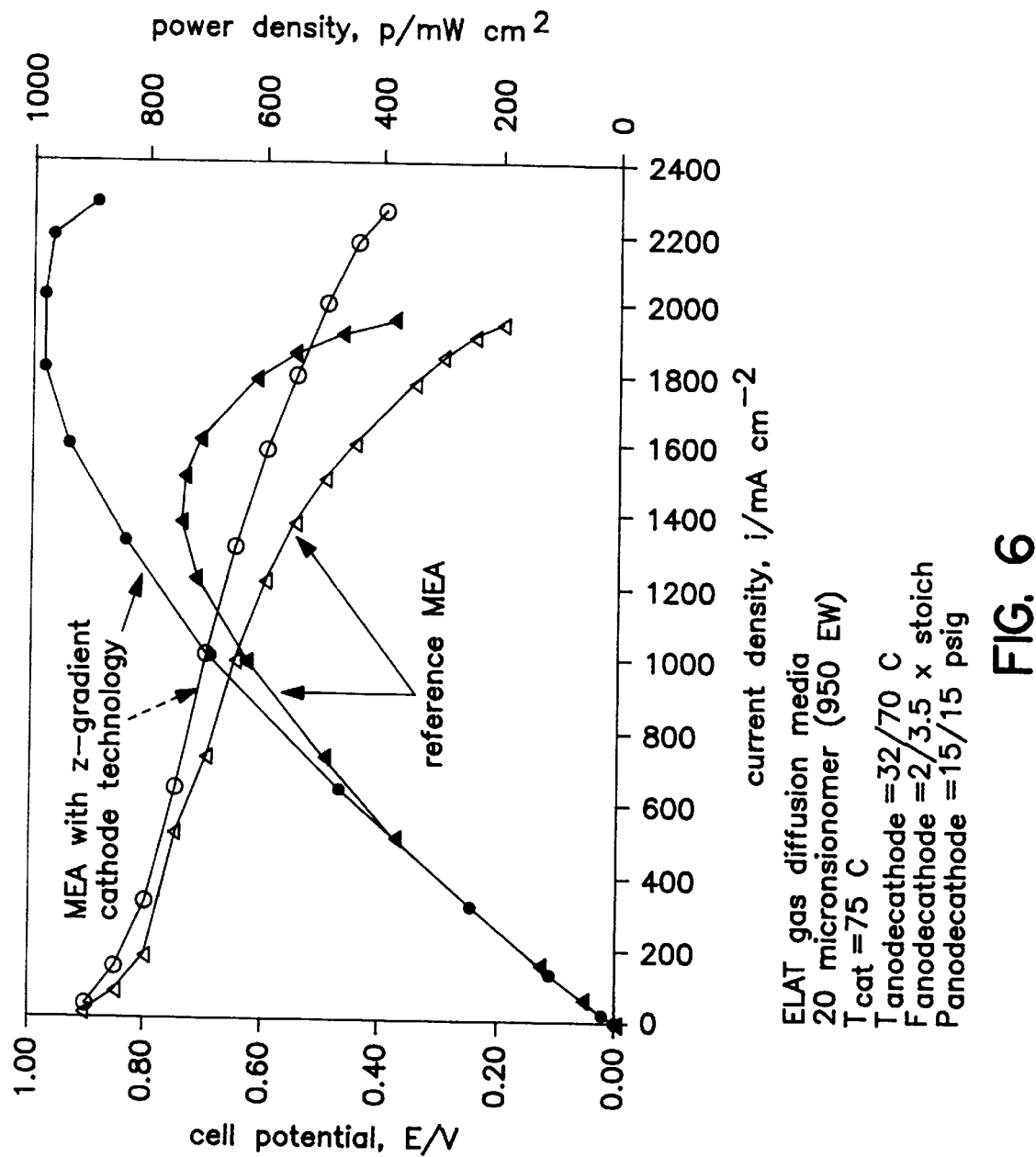
FIG. 6 is another I-V analysis of an MEA with a z-gradient cathode (Example 1) compared against a reference MEA.

Similarly, FIG. 6 shows data for the 15 psig cell. Again, the polarization analysis showed improved performance over the entire range of current densities. At 0.6 V, for example, the MEA containing z-gradient cathode produced almost 1600 mA/cm$^2$ versus only 1200 mA/cm$^2$ for the reference MEA (33% increase) which was substantially the same but did not contain the z-gradient cathode. Power density is also plotted in FIG. 6 (p=I×V), and improved power density was also evident.

Figure 7:
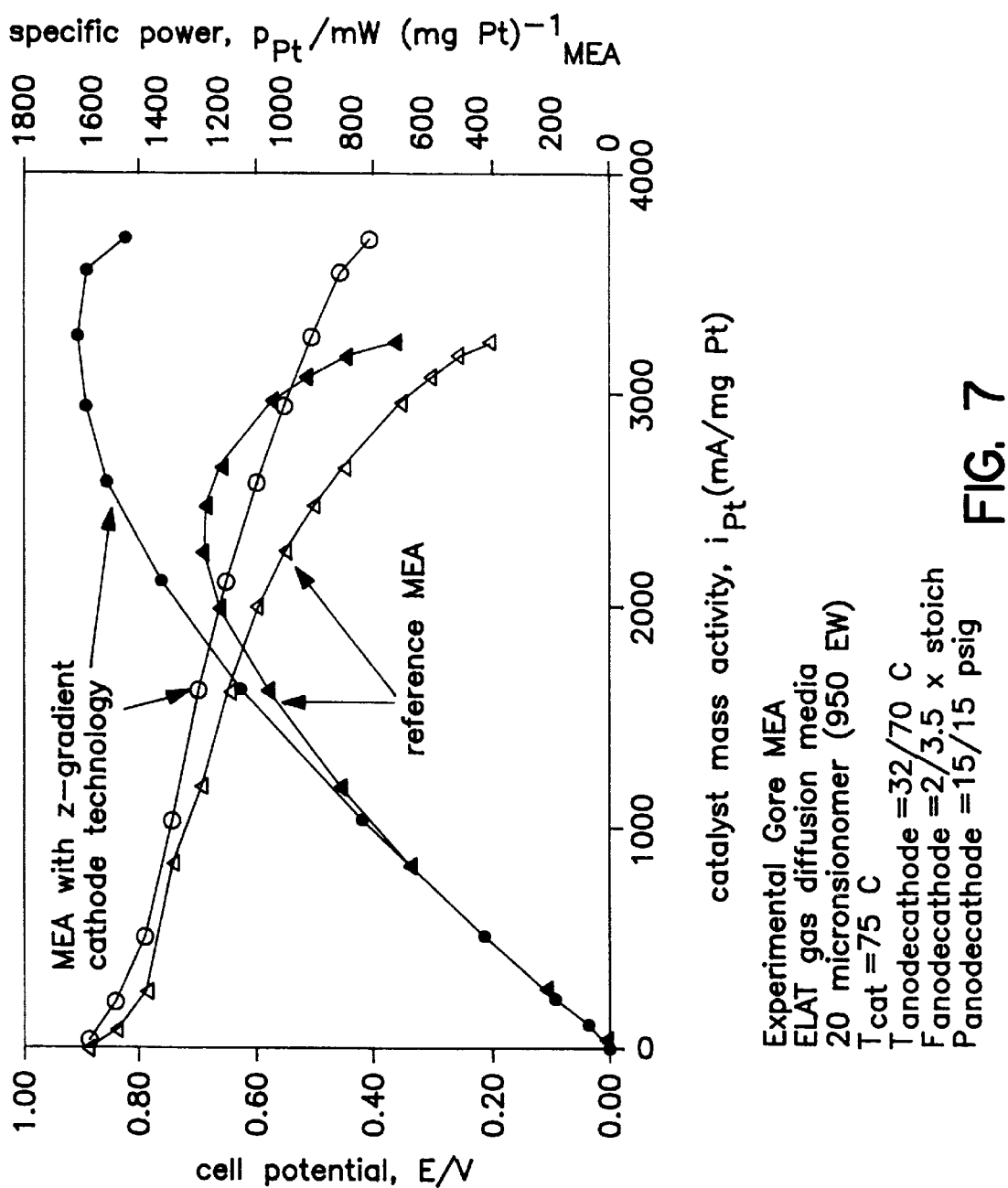
FIG. 7 includes normalized I-V analysis of an MEA with a z-gradient cathode (Example 1) compared against a reference MEA.

FIG. 7 shows an electrocatalyst mass activity analysis for the 15 psig cell. The mass activity is the amount of current generated (or alternatively power generated) per unit mass of catalyst metal in the active area. Hence, mass activity units are mA/mg Pt for current generation (and mW/mg Pt for power generation). At 0.6 V, the MEA with z-gradient cathode surprisingly produced over 2,500 mA/mg Pt compared to only 2,000 mA/mg Pt (i.e., a 25% increase) for the reference MEA which was substantially similar but did not contain the z-gradient cathode.

Figure 8:
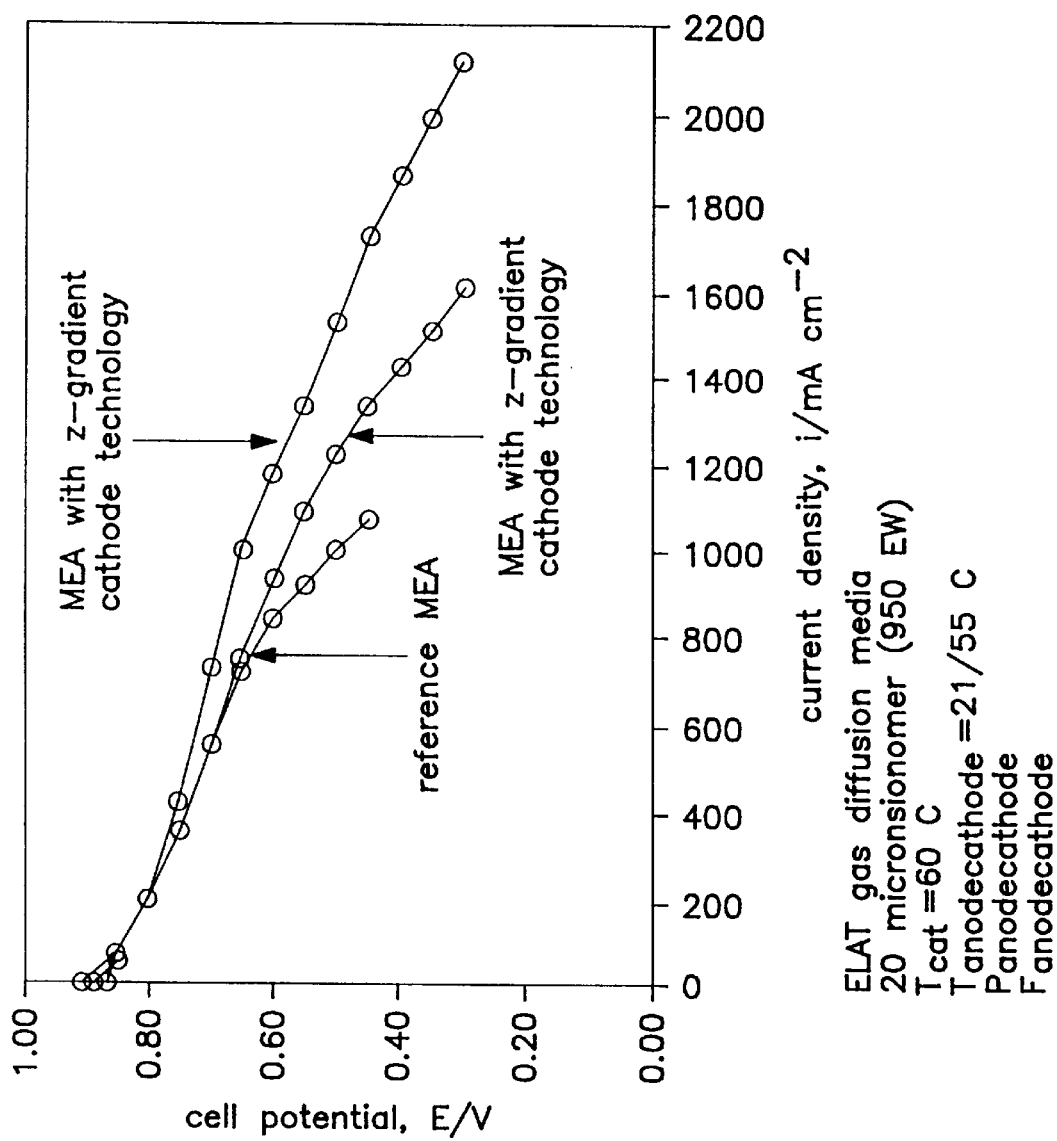
FIG. 8 shows I-V analyses of both an MEA with a z-gradient cathode and an MEA with a z-gradient anode (Example 1) each compared against a reference MEA.

FIG. 8 shows data for an MEA at 0 psig where the z-gradient catalyst zone was part of the anode rather than cathode. Surprisingly, the polarization analysis revealed an improvement in performance with a z-gradient anode (12% increase at 0.6 V), although the improvement was not as large as for the MEA with a z-gradient cathode.

Example 2

In this Example, direct deposition of the zone on the electrode was carried out at two zone thicknesses. Deposition was carried out by EB-PVD. The catalyzed electrodes having the z-gradient deposited thereon had a loading of 0.1 mg Pt/cm$^2$ before deposition. For one sample, the deposition rate was 0.2–0.3 Å/sec to achieve a 50 Å zone (0.01 mg Pt/cm$^2$). A second electrode was coated at a rate of 0.1 Å/sec to achieve a 5 Å zone (0.001 mg Pt/cm$^2$). An electrode (anode) containing 0.05 mg/cm$^2$ of platinum was used for both samples.

MEA performance was again evaluated with the cell pressure at 0 psig and at 15 psig. For all runs, the cell was operated at 650° C., with hydrogen and air both supplied at 0 psig, and humidified to dew points of 60° C. Hydrogen and air flow rates were set to 1.2 and 3.5 times the stoichiometric value theoretically needed to produce a given cell current output respectively.

Figure 9:
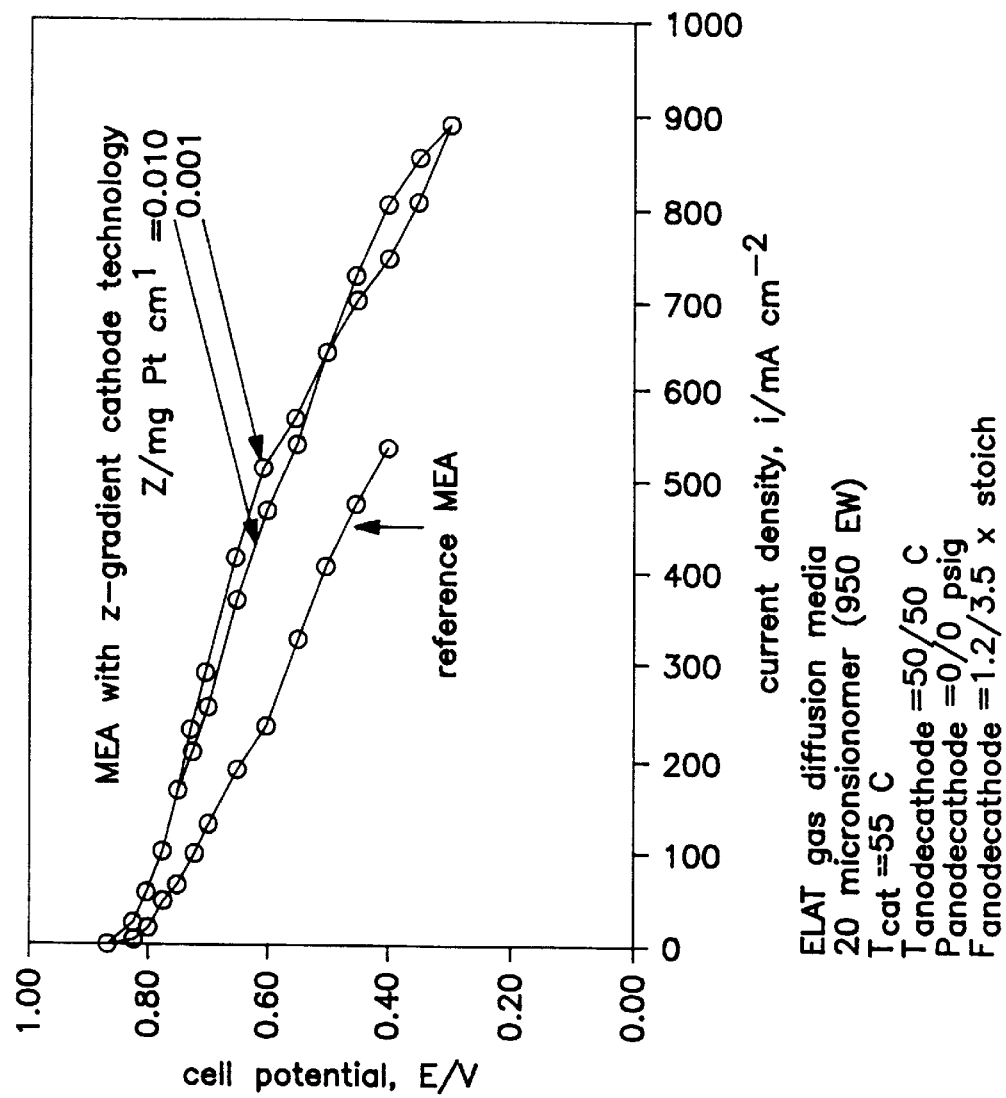
FIG. 9 shows analyses of an MEA with a z-gradient cathode at two different loadings (Example 2) compared against a reference MEA.

FIG. 9 shows the improved power output at 0 psig. Improvements in current density were observed at 0.6 V from 240 mA/cm$^2$ for the reference MEA: (i) to 460 mA/cm$^2$ for the 50 Å deposition (92% increase), and (ii) to 510 mA/cm$^2$ for a 5 Å deposition (113% increase). Surprisingly, the lower loading (thinner deposition) provided a greater percentage increase at this voltage.

Figure 10:
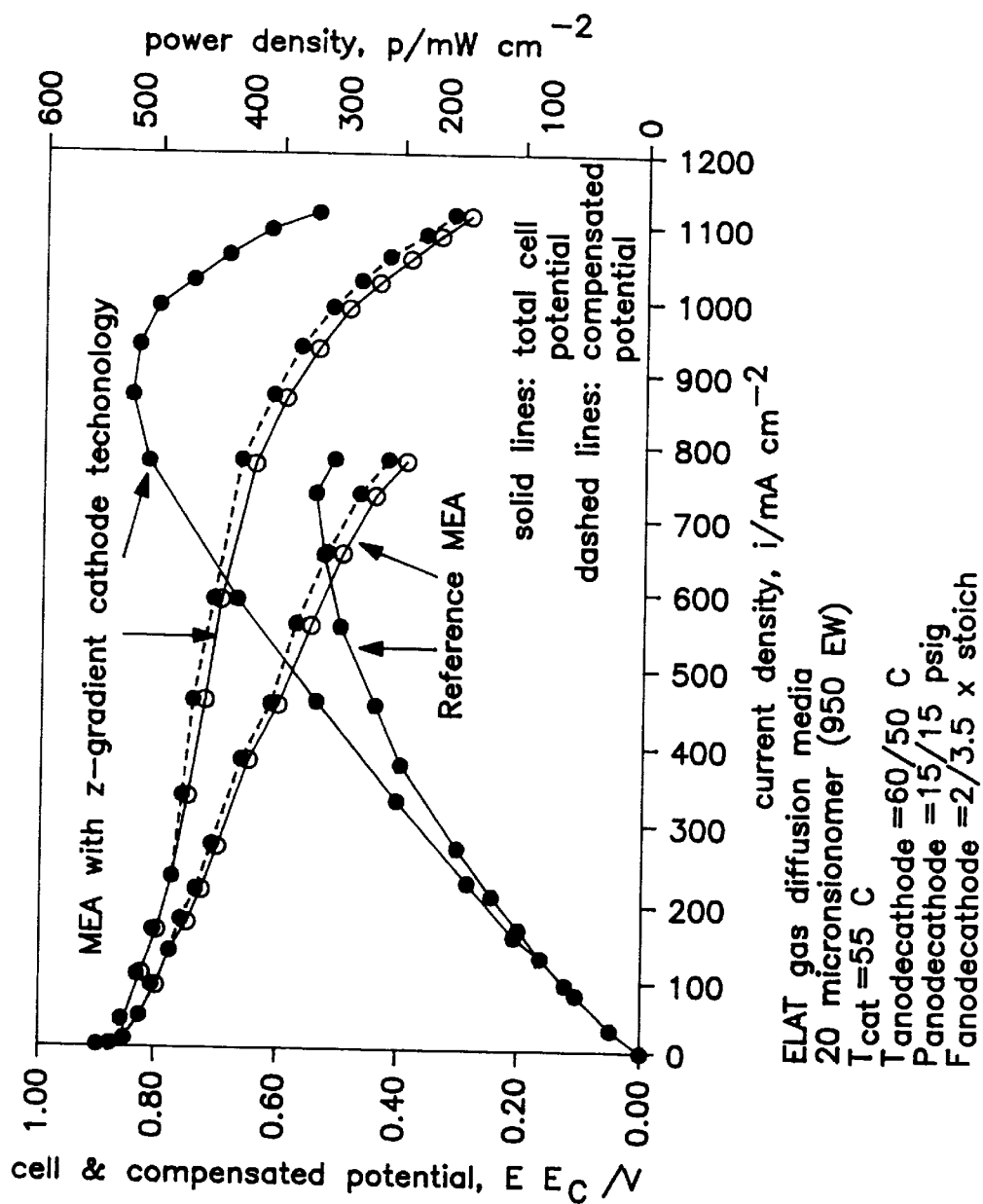
FIG. 10 shows I-V analysis of an MEA with a z-gradient cathode (Example 2) compared against a reference MEA. A compensated potential analysis is also provided.

FIG. 10 shows fuel cell performance at 15 psig cell pressure, in terms of both current density and power density, for the 5 Å sample. The data indicated an increase in current density at 0.6 V from 440 to 860 mA/cm$^2$ (95% increase), with a substantial increase in peak power density.

FIG. 10 also shows polarization performance as compensated cell potential versus current density at 15 psig. When the polarization curve is expressed in terms of compensated potential, the electrocatalytic performance of the z-gradient cathode is shown independent of the effects of other MEA components. By comparison of compensated potentials, FIG. 10 showed that improved MEA performance was due to improved cathode performance (resulting from z-gradient layer), and not from some other spurious secondary effects.

Figure 11:
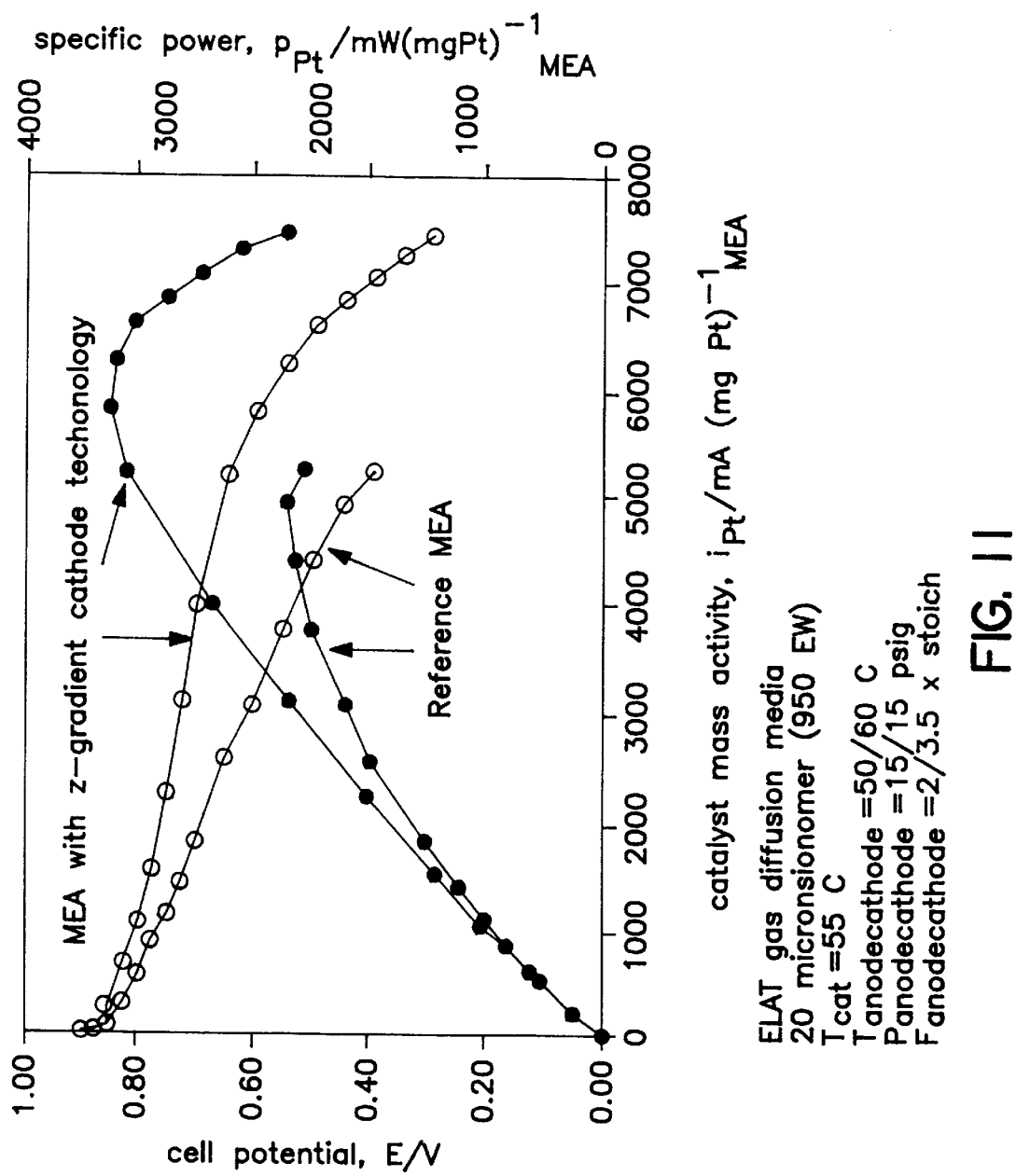
FIG. 11 is a normalized I-V analysis of an MEA with a z-gradient cathode (Example 2) compared against a reference MEA.

FIG. 11 shows the corresponding improvement in electrocatalyst mass activity and specific power at 15 psig.

The observed enhancement in electrocatalyst utilization was proportional to the enhancement in current/power density.

Surprisingly, the percent increases in current found at 0.6 V were significantly higher in Example 2 compared to Example 1. In addition, the MEAs of Example 2 had less precious metal than the MEAs of Example 1.

Example 3

This example illustrates DC magnetron sputtering compared to EB-PVD. An electrode (0.4 mg Pt/cm$^2$) on a skived PTFE backing was coated by D.C. magnetron sputtering. A 0.127 mm thickness, 99.9% purity platinum foil served as target, and the vacuum chamber base pressure was maintained at 8×10$^{-4}$ torr. More specifically, a vacuum less than 10$^{-4}$ torr was established, and then high purity argon was bled in so that the pressure rose to 8×10$^{-4}$ torr. Platinum deposition rate was about 1 Å/sec continuous to achieve a platinum loading of 0.01 mg/cm$^2$ (50 Å). This sputtered electrode was used as cathode. An unsputtered electrode (0.4 mg Pt/cm$^2$) served as anode.

MEA performance was evaluated with the cell pressure at 0 psig and at 15 psig. For the 0 psig cell pressure runs, the cell was operated at 70° C., with hydrogen and air both supplied at 0 psig, and humidified to dew points of 55° C. and 70° C. respectively. The 15 psig runs were performed at a cell temperature of 80° C., with hydrogen and air both supplied at 15 psig, and humidified to dew points of 60° C. and 75° C. respectively. For all runs, hydrogen and air flow rates were set to 2 and 3.5 times the stoichiometric values respectively.

Figure 12:
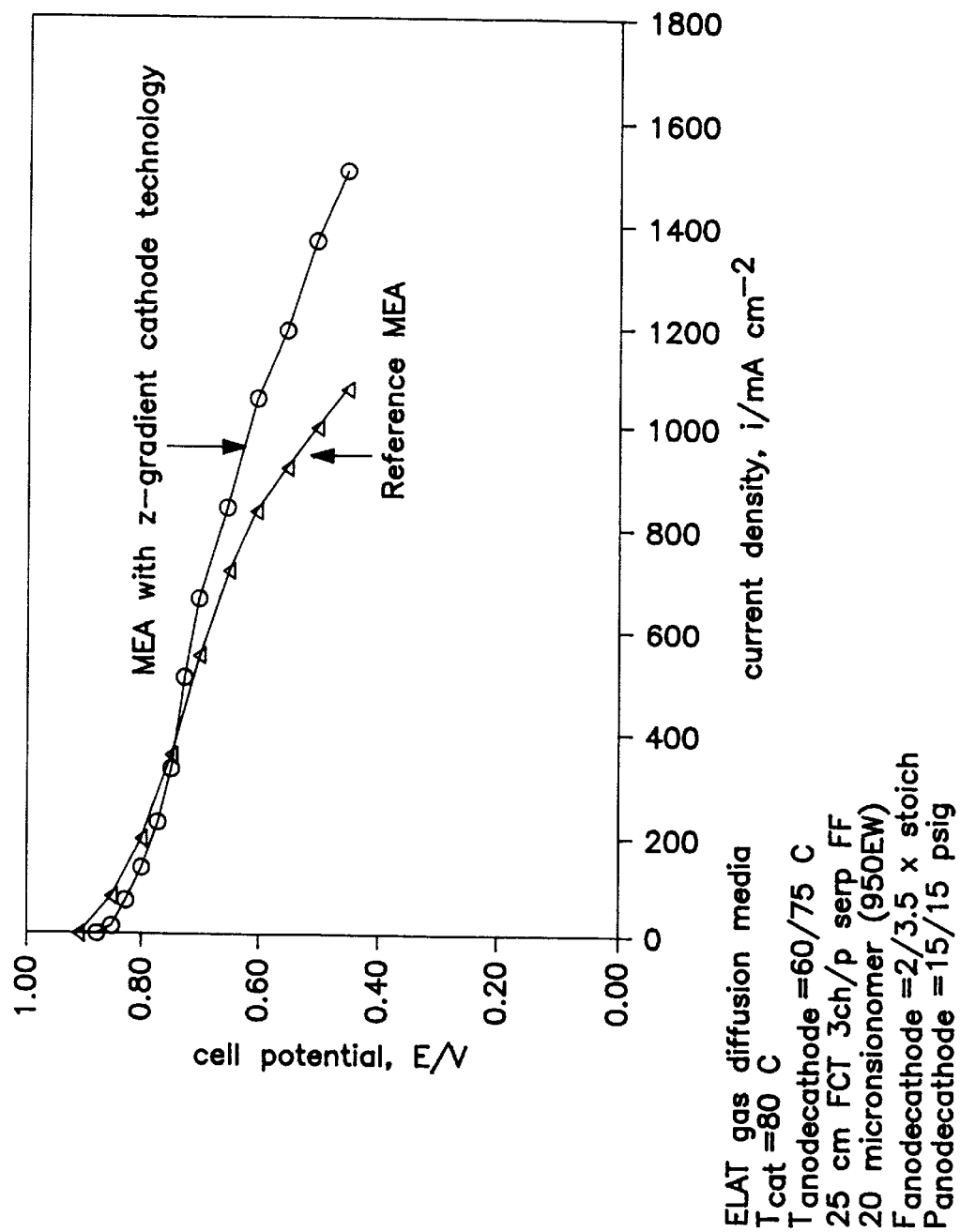
FIG. 12 is an I-V analysis of an MEA with a z-gradient cathode (Example 3) compared against a reference MEA.
Figure 13:
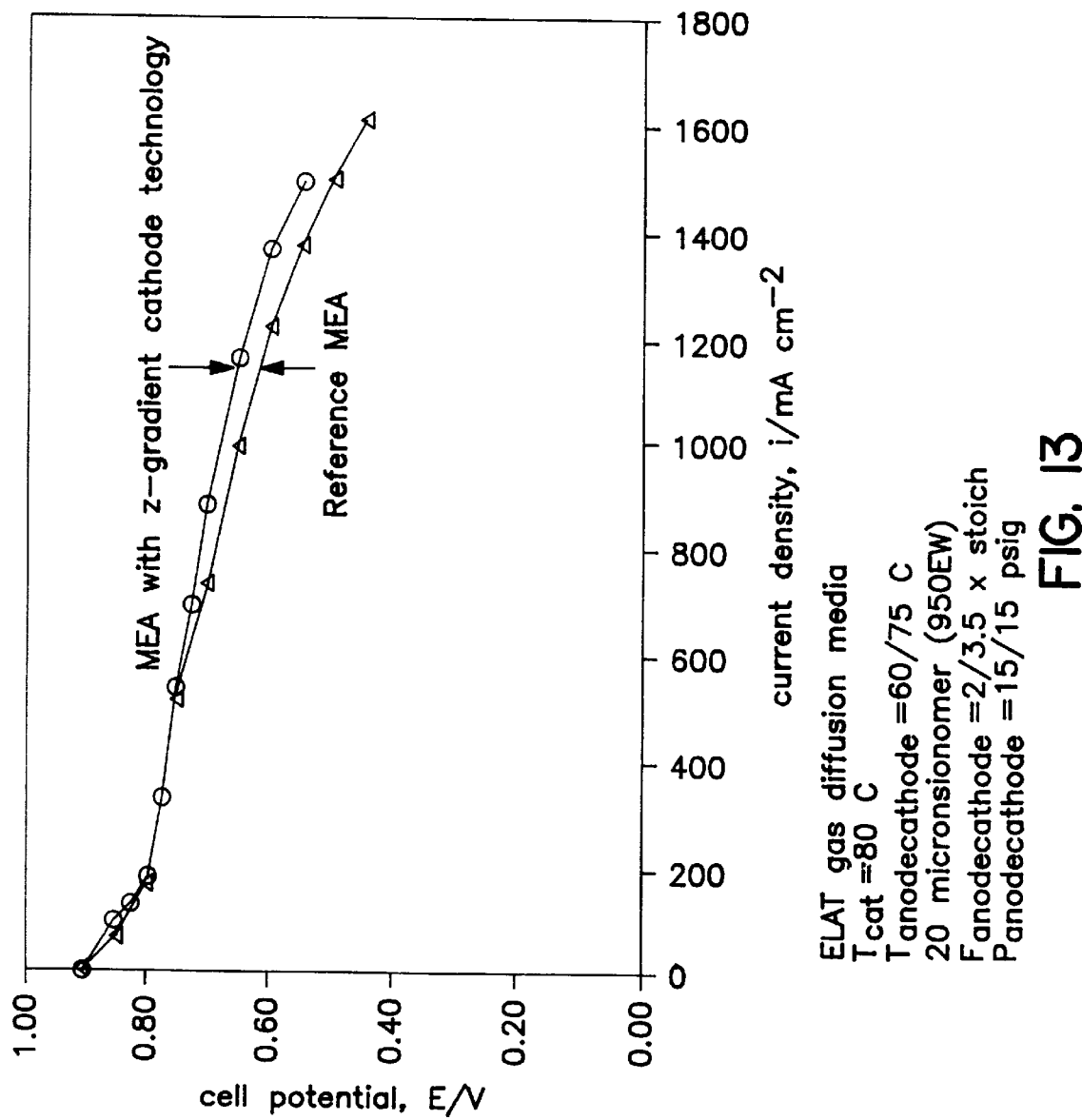
FIG. 13 is an I-V analysis of an MEA with a z-gradient cathode (Example 3) compared against a reference MEA.

FIG. 12 shows that for 0 psig at 0.6 V there is an improvement in current density from 820 mA/cm$^2$ for the reference MEA to 1050 mA/cm$^2$ (28% increase) for the sputtered z-gradient MEA. FIG. 13 shows fuel cell performance at 15 psig cell pressure. There is an improvement in current density from 1200 mA/cm$^2$ (reference MEA) to 1360 mA/cm$^2$ for the sputtered cathode (13% increase). Hence, the percent increases in Example 3 were not as great as observed in Example 2.

Example 4

Membranes were coated with platinum using EB-PVD and DC magnetron sputtering. Loadings for different samples were 0.001, 0.01, 0.05, and 0.1 mg Pt/cm$^2$. One side of the membrane was coated. MEAs were prepared from the coated membranes.

Example 5

A zone of second catalytically active metal (50 Å) was deposited onto the membrane by the indirect transfer method. The Pt/skived PTFE was hot pressed against the membrane to bond the Pt evaporated layer to the membrane by the decal method. The skived PTFE layer was peeled off, thus leaving a zone of 50 Å Pt layer bonded to the membrane. Catalyzed electrodes (0.3 mg Pt/cm$^2$) were then attached by hot pressing to form a first MEA.

A second MEA was prepared in which the cathodic active phase was just the electrode structure formed by a thin 50 Å Pt layer bonded to the membrane. The anode had a loading of 0.2 mg Pt/cm$^2$.

Polarization performance was evaluated at 0 psig cell pressure. The atmospheric pressure run, having both anode and cathode at 0/0 psig respectively, was performed at 60° C. cell temperature with hydrogen and air reactants saturated in humidification bottles to ca. 100% relative humidity. The anode, hydrogen, and cathode, air, reactants were then saturated at 20/60° C., respectively. The reactant flow was set to 2/3.5 times the stoichiometric value, for hydrogen and air respectively, and the stoichiometric flow was maintained throughout the polarization curve.

Figure 14:
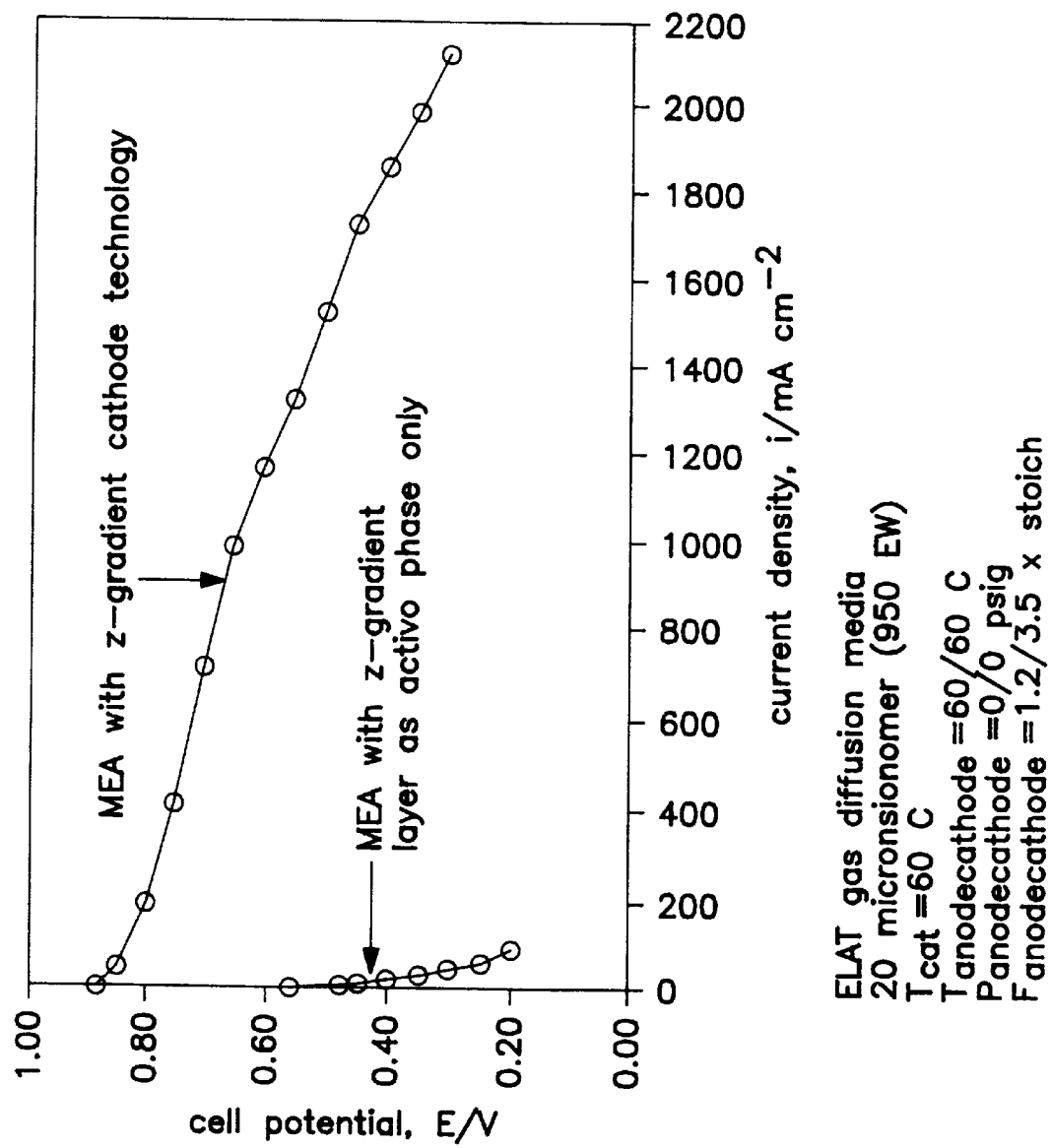
FIG. 14 is an I-V analysis of an MEA with a z-gradient cathode (Example 5) compared against a reference MEA.

FIG. 14 shows the performance of the first and second MEAs. The difference in performance observed between the two MEAs indicates that the 50 Å layer presents low activity in itself at this low loading, but its presence at the interface between the electrocatalyst layer and membrane produces a power improvement and improves the electrode current density profile.

FE-SEM Analysis

Figure 15:
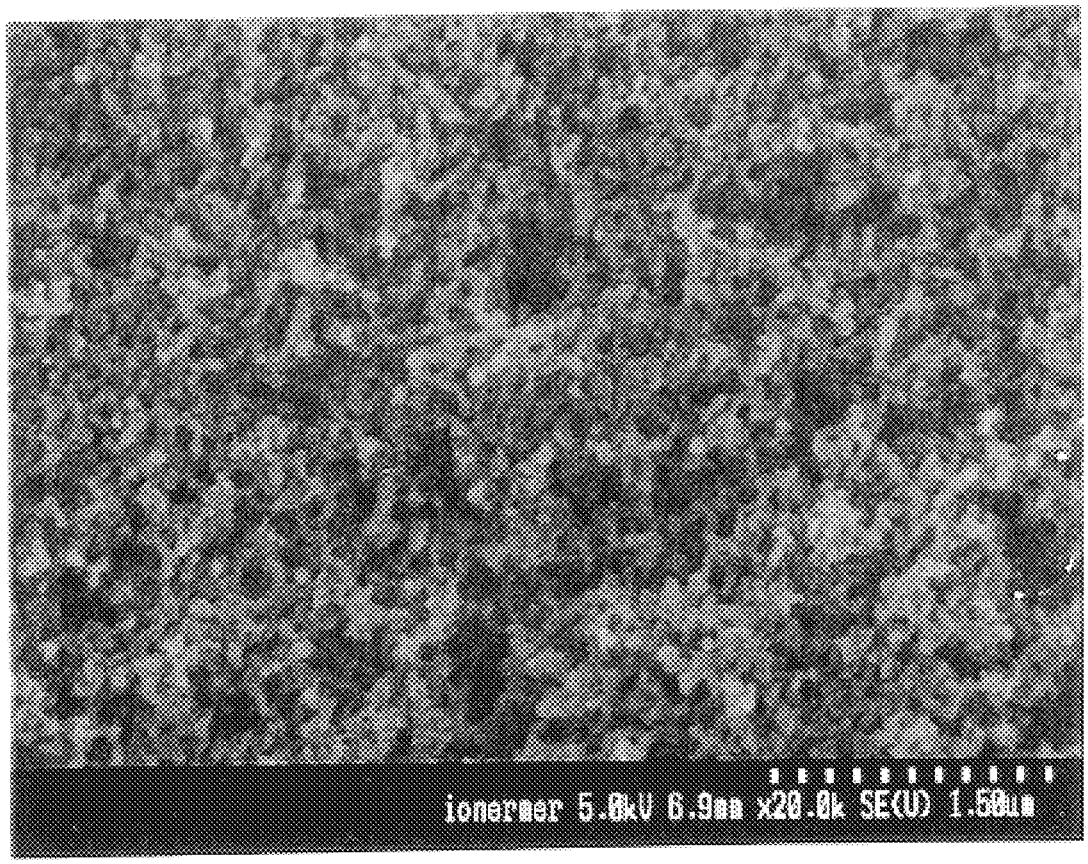
FIG. 15 is a field-emission scanning electron microscope (FE-SEM) analysis of a reference electrode material having catalyst but no vacuum-deposited z-gradient zone.
Figure 16:
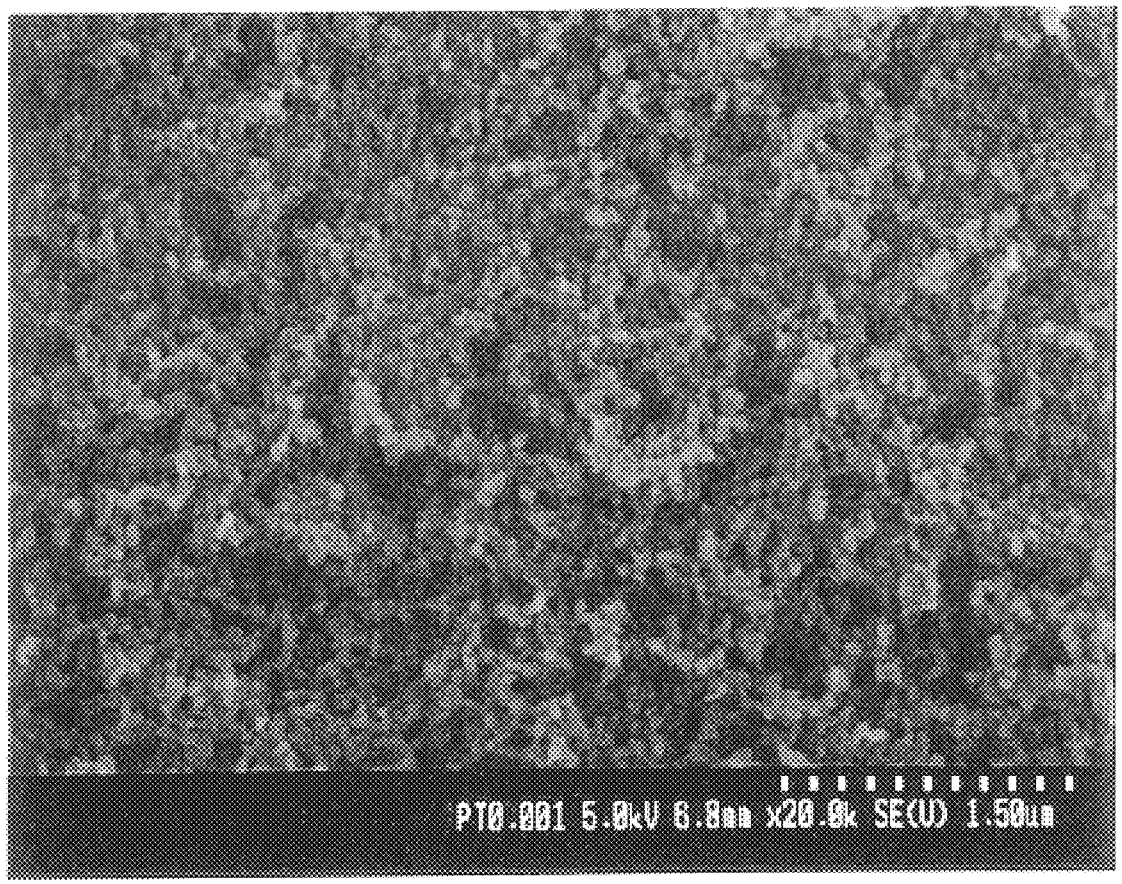
FIG. 16 is an FE-SEM analysis of an electrode having both catalyst and a 5 angstrom (0.001 mg Pt/cm$^2$) loading of the z-gradient zone.
Figure 17:
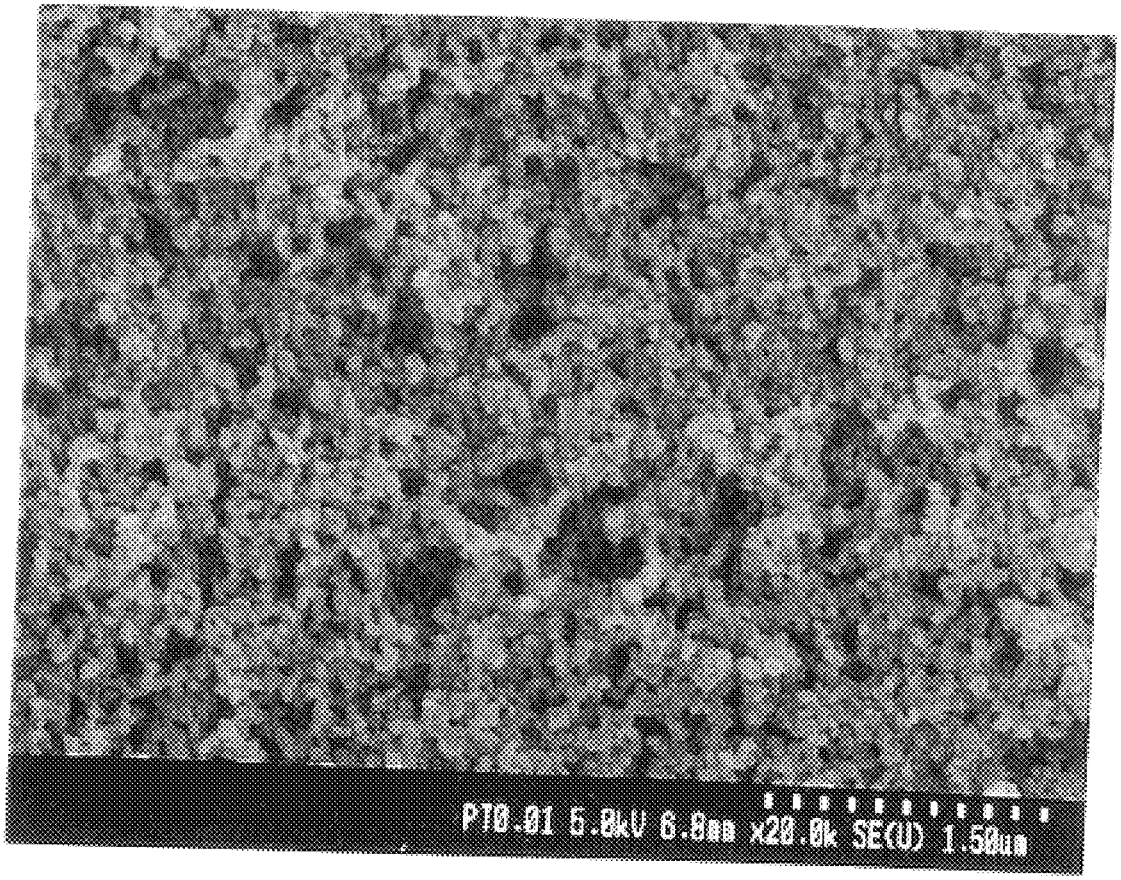
FIG. 17 is an FE-SEM analysis of an electrode having both catalyst and a 50 angstrom (0.01 mg Pt/cm$^2$) loading of the z-gradient zone.
Figure 18:
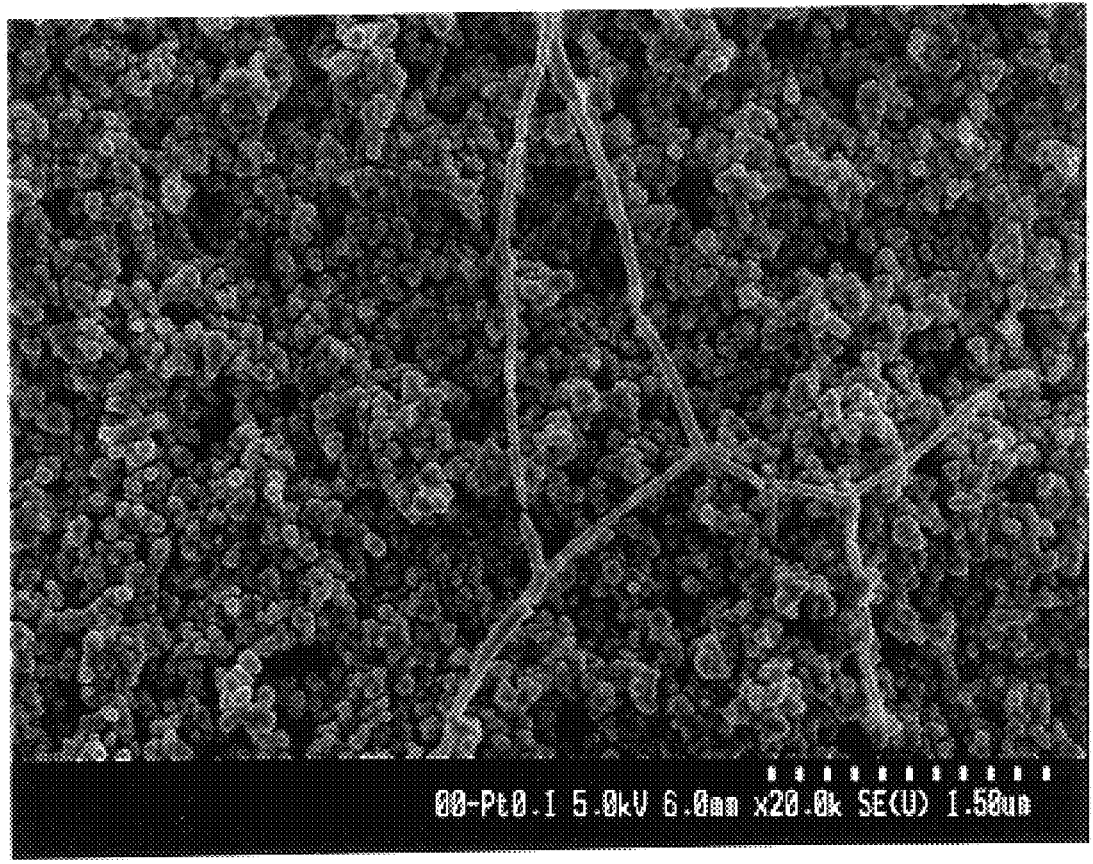
FIG. 18 is an FE-SEM analysis of a 500 angstrom (0.1 mg Pt/cm$^2$) loading of the z-gradient zone.

FE-SEM analyses were carried out for one comparative sample of an electrode with no zone present (FIG. 15) and for 3 samples with different zone thicknesses deposited onto the electrode (FIGS. 16–18). For FIGS. 15–18, the magnification was 20kx and the electron beam energy was 2 keV. The analyses showed relatively uniform zone deposition with FIGS. 15–18 being representative. In general, the microstructure was represented by a combined spherical nodular and whisker morphology, with the latter evidenced at loadings of about 0.1 mg/cm$^2$ (500 A) (FIG. 18).

FIG. 15 was taken from a sample of the cathode used in Example 2 with 0.1 mg/cm$^2$ Pt loading but without deposition of the second catalytically active metal. FIG. 15 demonstrates the electrode porosity, which allows for reactant diffusion, before deposition of the second catalytically active metal.

FIG. 16 was taken from a sample of the Example 2 cathode with a 0.1 mg/cm$^2$ Pt loading but with a 5 A zone deposition (0.001 mg/cm$^2$) by EB-PVD. A small but measurable increase in field brightness was evident in FIG. 16 compared with the FIG. 15 control. The increased brightness was uniform across the Figure which suggested an evenly deposited platinum zone. The electrode remained porous and open to reactant diffusion despite the deposition.

FIG. 17 was taken from a sample of the Example 2 cathode with a 0.1 mg/cm$^2$ Pt loading but with a 50 A zone deposition (0.01 mg/cm$^2$) by EB-PVD. A further increase in field brightness was observed compared with FIG. 16. Spherical platinum nodules were present with diameter widths between about 30 and about 70 nm, and generally about 50 nm. The electrode remained porous and open to reactant diffusion despite the deposition.

FIG. 18 was taken from a sample of the electrode similar to that of Example 2 but with no Pt loading before the deposition. The electrode was then provided with a 500 A Pt zone by EB-PVD. Again, spherical platinum nodules were present with diameter widths between about 25 nm and about 100 nm, and more particularly, about 30 nm and about 70 nm, and generally about 50 nm. In addition, however, rod-shaped structures were also present. The width diameter of these rods was about 20 nm to about 60 nm, and generally, about 40 nm. The electrode remained porous and open to reactant diffusion despite the deposition.

Data Summary

Data from Examples 1–5 are summarized below:

| Example number | Zone thickness (A) | Pressure (psig) | Percent increase in current at 0.6 V compared to reference MEA |
|---|---|---|---|
| 1 | 50 | 0 | 46 |
| 1 | 50 | 15 | 33 |
| 2 | 50 | 0 | 92 |
| 2 | 5 | 0 | 113 |
| 2 | 5 | 15 | 95 |
| 3 | 50 | 0 | 28 |
| 3 | 50 | 15 | 13 |

Examples 1–5 represent the first embodiment of this invention rather than the second embodiment. In these examples, electrodes are employed which have catalytically active metal distinct from the deposited zone. Examples 6 and 7 further illustrate the first embodiment of this invention but with use of a bimetallic zone.

Example 6

A catalyzed electrode (carbon supported on platinum, loading 0.4 mg Pt/cm$^2$) was used, available from W. L. Gore & Assoc. under the PRIMEA 5510 name. The electrode included carbon supported Pt, ionomer, and solvent and was disposed on a substrate support and subjected to vacuum deposition by sequential Pt/Ru EB-PVD. The loading of the bimetallic zone was 0.3 mg PtRu/cm$^2$ (approximately 50% atomic ratio of Pt and Ru), and the deposited zone thickness was 1,500 Å. Each of the sequentially evaporated layers of platinum and ruthenium were approximately 250 Å (equivalent loading per layer: 0.05 mg metal/cm$^2$) were deposited at a rate of 1 Å/sec as measured with a vibrating crystal microbalance.

Figure 19:
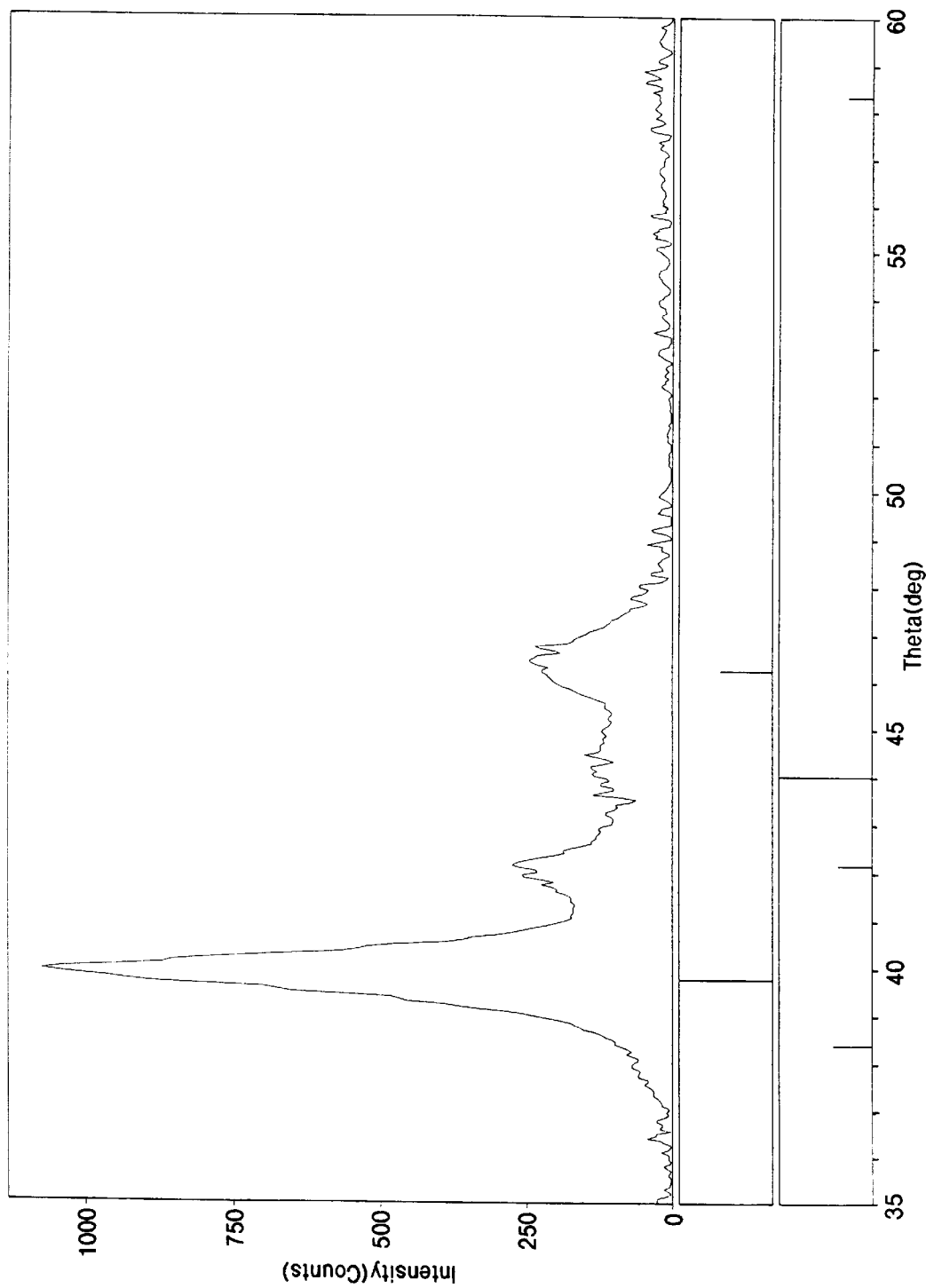
FIG. 19 is XRD analysis of a sample according to the invention (Example 6) in which sequential EB-PVD was used to prepare the sample.

XRD analysis of the sequentially evaporated deposited zone is shown in FIG. 19. Matching analyses with diffraction pattern databases were generally consistent with the presence of unalloyed Pt and Ru phases.

Figure 20:
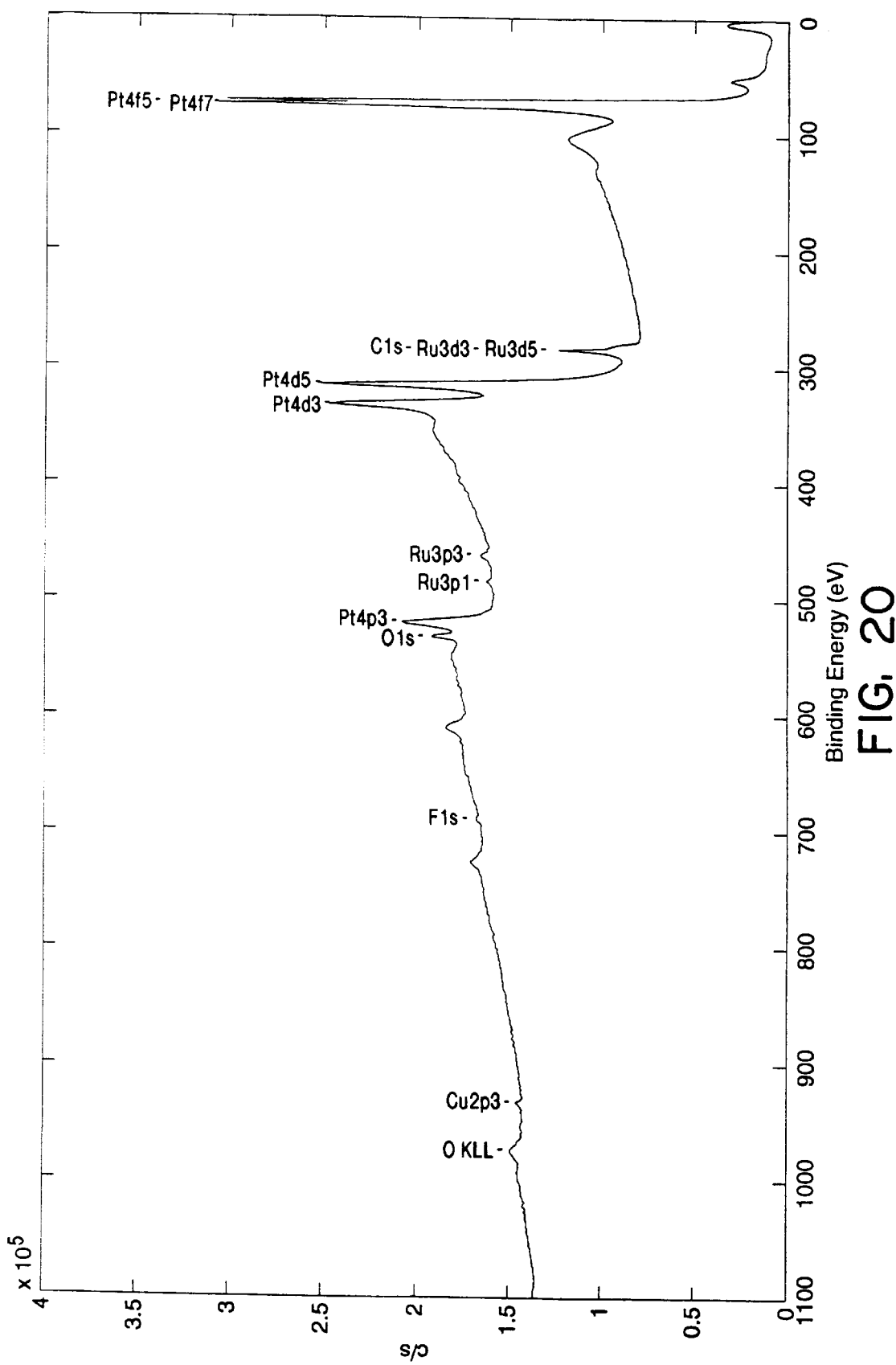
FIG. 20 is wide scan XPS analysis of a sample according to the invention (Example 6) in which sequential EB-PVD was used to prepare the sample.
Figure 21:
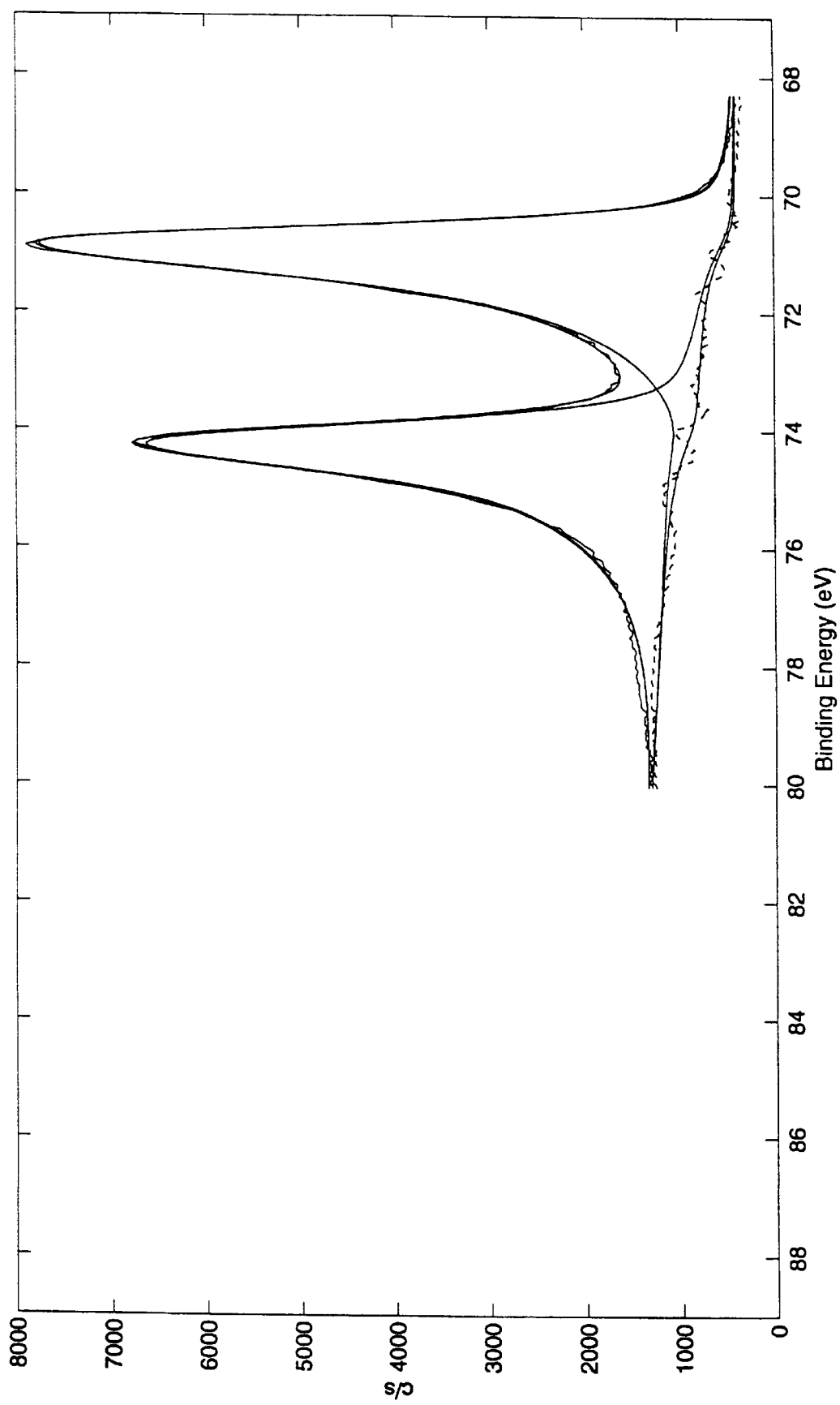
FIG. 21 is high resolution XPS analysis (platinum region) of a sample according to the invention (Example 6) in which sequential EB-PVD was used to prepare the sample.
Figure 22:
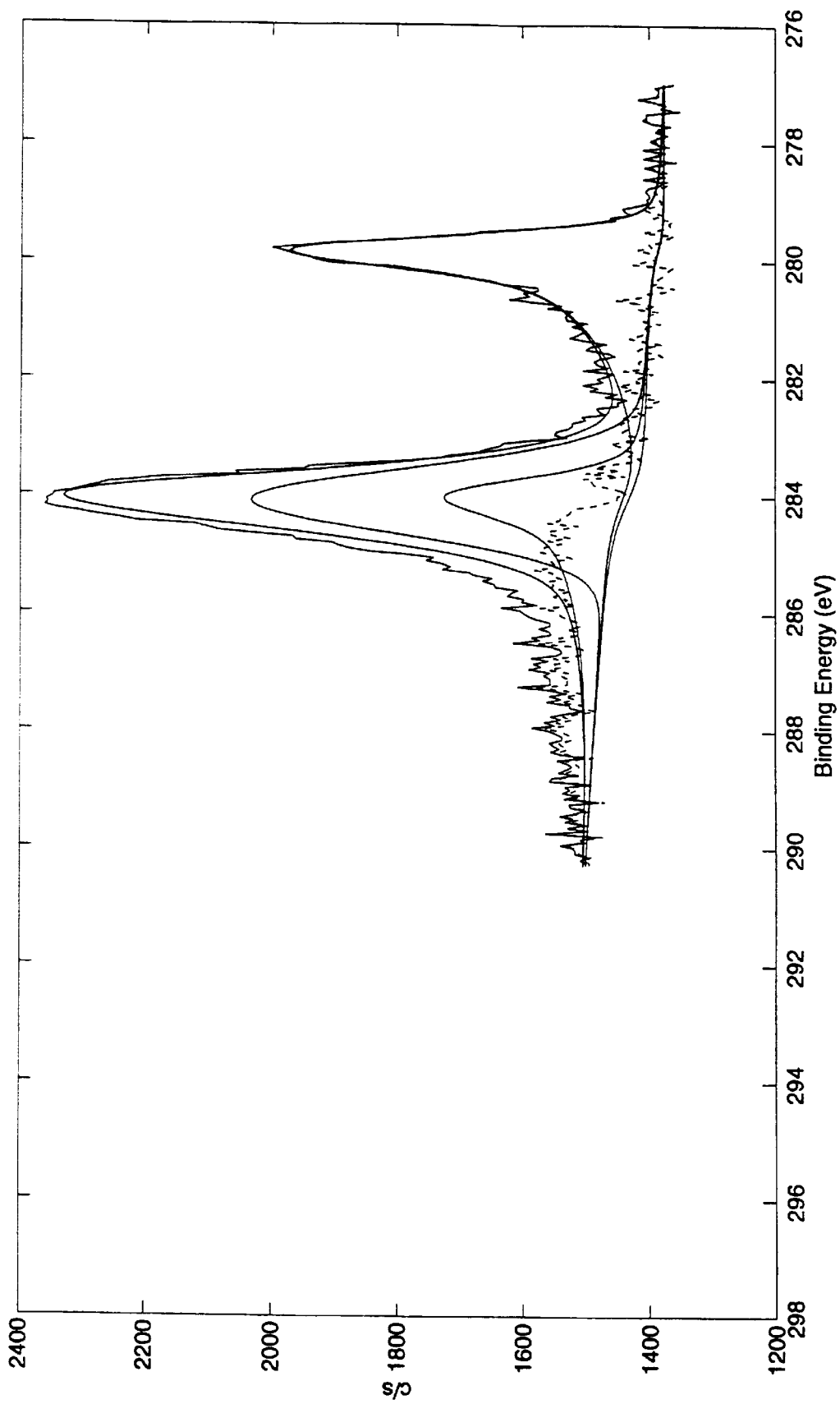
FIG. 22 is high resolution XPS analysis (ruthenium region) of a sample according to the invention (Example 6) in which sequential EB-PVD was used to prepare the sample.

XPS analysis was also carried out in which three spots per sample were analyzed to verify uniformity. The wide scan survey XPS spectrum is shown in FIG. 20; the higher resolution XPS spectrum for the platinum region (Pt 4f transition) is shown in FIG. 21; and the higher resolution XPS spectrum for the ruthenium region (Ru 3d transition) is shown in FIG. 22. Analysis of the wide scan spectrum (FIG. 20) confirmed that the main components of the deposited zone were Pt and Ru, with minor components being C, O, F, and traces of Cu. Analysis of the higher resolution XPS spectra (FIGS. 21 and 22), however, were consistent with the presence of at least some alloying between Pt and Ru. The measured binding energy for the Pt transition (71.7 eV) was significantly shifted from the expected value of 71.0–71.1 based on the literature. In addition, the measured binding energy for the Ru transition (280.7 eV) was significantly shifted from the expected value based on the literature for metallic Ru (279.9–280.2 eV). The data were also consistent with the presence of oxides of Ru.

Example 7

A catalyzed electrode as in Example 6 was subjected to deposition by sequential PtRu EB-PVD with use of IBAD (ion beam assisted deposition) to help mix the evaporated layers. The loading of the evaporated bimetallic zone was 0.1 mg PtRu/cm$^2$, (50% a/a), with a total zone thickness of 500 Å. The thickness of each of the 10 layers within the zone was 50 Å and the loading per layer was 0.01 mg metal/cm$^2$). An Ar$^+$ beam was used, and the Ar$^+$ gun was operated at 2 keV, 40 W, and 8 mA beam current. The deposition rate was 1 Å/sec as measured with a vibrating crystal microbalance.

Figure 23:
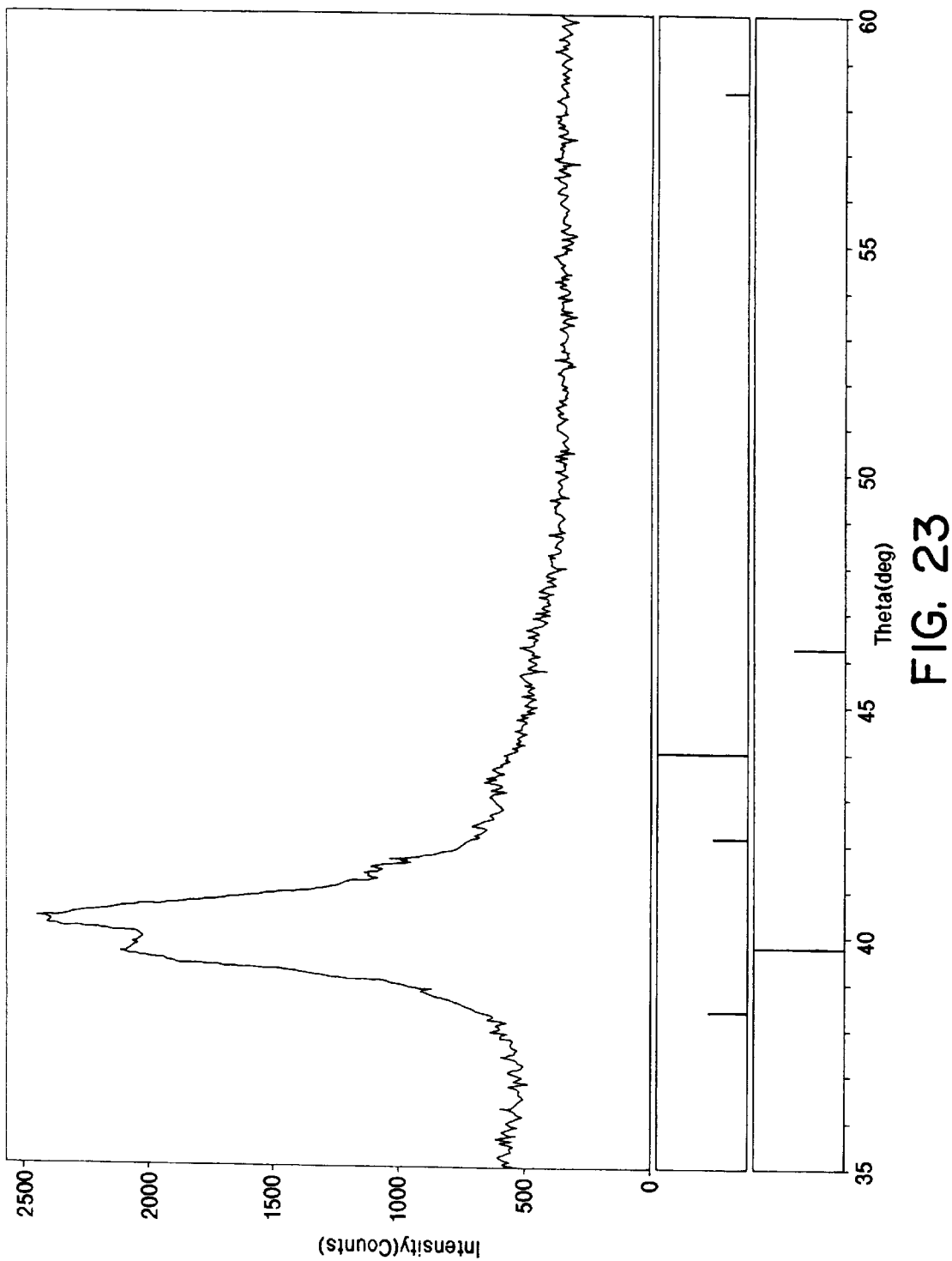
FIG. 23 is XRD analysis of a sample according to the invention (Example 7) in which sequential EB-PVD with use of IBAD was used to prepare the sample.

The XRD analysis for this sequentially evaporated, ion beam treated electrocatalyst layer is shown in FIG. 23.

Hence, Examples 1–7 represent the first embodiment of the present invention. The following additional Examples 8–14 represent the second embodiment of the present invention. In these additional Examples, deposition of bimetallic zones was carried out on uncatalyzed rather than catalyzed electrode substrates. In Examples 8–11, sputtering was employed, whereas in Examples 12–14, physical vapor deposition was employed.

Example 8

ELAT™ gas diffusion media (uncatalyzed) was obtained from E-TEK. The thickness was approximately one-half mm. ELAT™ gas diffusion media (an uncatalyzed electrode) and 6 mil skived PTFE sheets were placed into a vacuum chamber (1.5 m diameter, 2 m long) which was pumped down to ca.<$10^{-4}$ torr using a diffusion pump. The mountings and the carousel rotated during the deposition process, which helped assure catalyst uniformity.

Figure 24:
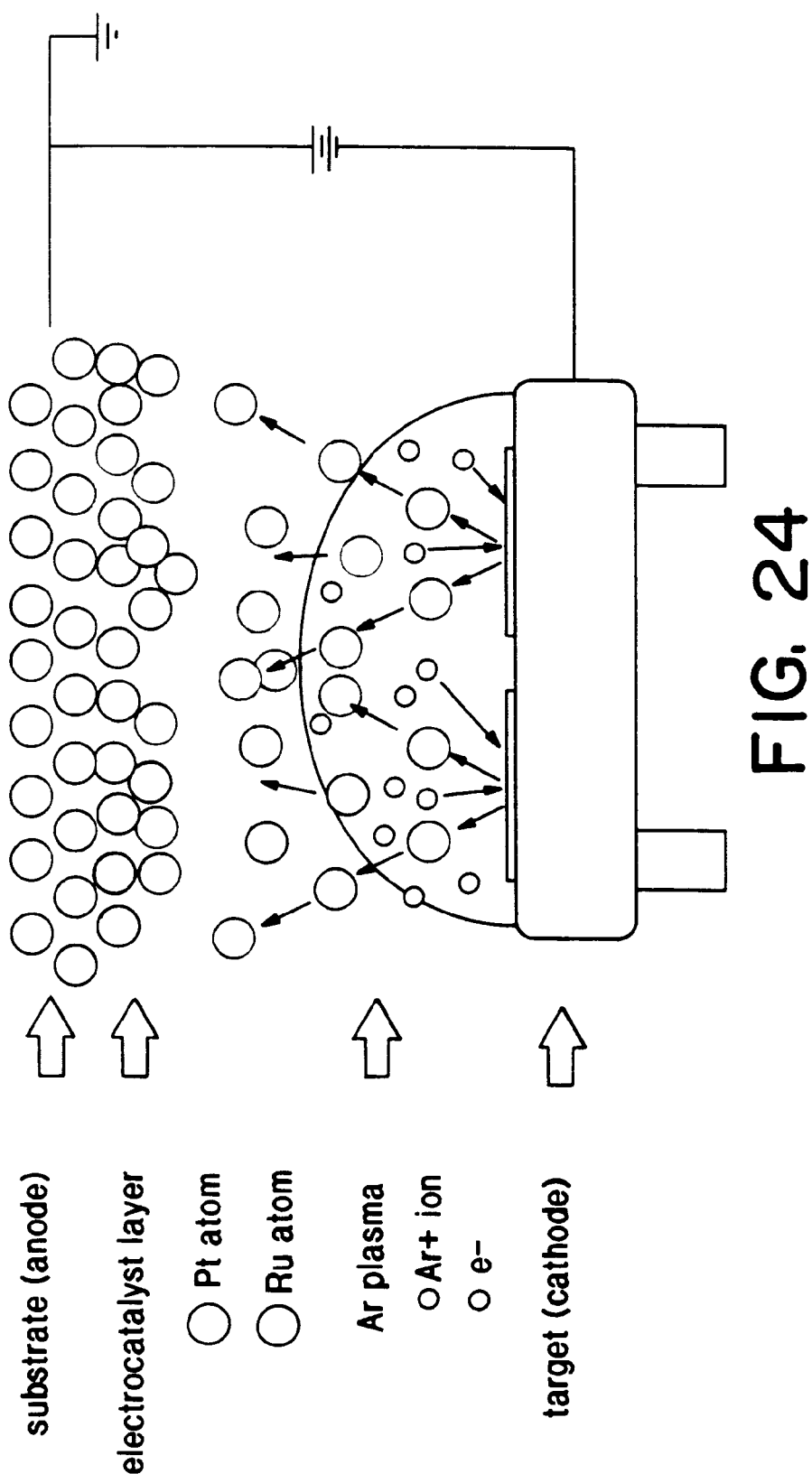
FIG. 24 illustrates the experimental set-up for multiple target sputtering according to the invention (Example 8).

DC magnetron sputtering was used as the deposition method. The magnetron unit consisted of a 6" diameter magnetron sputter source which was loaded with two catalyst target materials (sources): a Pt foil target (0.127 mm thickness, 99.9% pure) and a Ru foil target (0.127 mm thickness, 99.9% pure), which are available from Alfa or Goodfellow. FIG. 24 shows the experimental setup used for the sputtering runs. Dual (multiple) target sputtering was used to vaporize the two metals simultaneously, i.e., the two targets were mounted (spot-welded) on the same magnetron unit. To achieve the desired atomic ratio of the catalyst metals on the substrate, calibration runs were carried out. The relative surface areas of target materials were varied, and the compositions of the deposited phases were analyzed as a function of relative surface area.

In this Example, three different Pt—Ru catalyst loadings were prepared using dual target magnetron sputtering: 0.1, 0.3, and 0.6 mg PtRu/cm$^2$ at a nominal composition of 50 atomic percent Pt and Ru (i.e., one atom of Pt per atom of Ru). Typical conditions were base pressure=$8 \times 10^{-4}$ torr, and deposition rate=1–10 Å/sec. Glass witness slides accompanied all runs. The Pt/Ru catalyst was sputtered in and deposited on (i) the "active" side of the ELAT substrate, wherein the active side is the side that normally is placed against a catalyst layer during normal fuel cell mounting, and (ii) on one side of the skived PTFE material. The double rotation of the substrates while vacuum catalyzation took place helped assure coating uniformity. The deposition rate was on average 6 Å/sec as measured with a vibrating crystal microbalance, with a magnetron power ranging from 250–500 W, 490–570 V dc bias and 450–900 mA Ar$^+$ flux. The effective zone thicknesses were 500, 1,500, and 3,000 Å for the 0.1, 0.3 and 0.6 mg PtRu/cm$^2$ zone loadings, respectively.

EDAX Analysis

Figure 25:
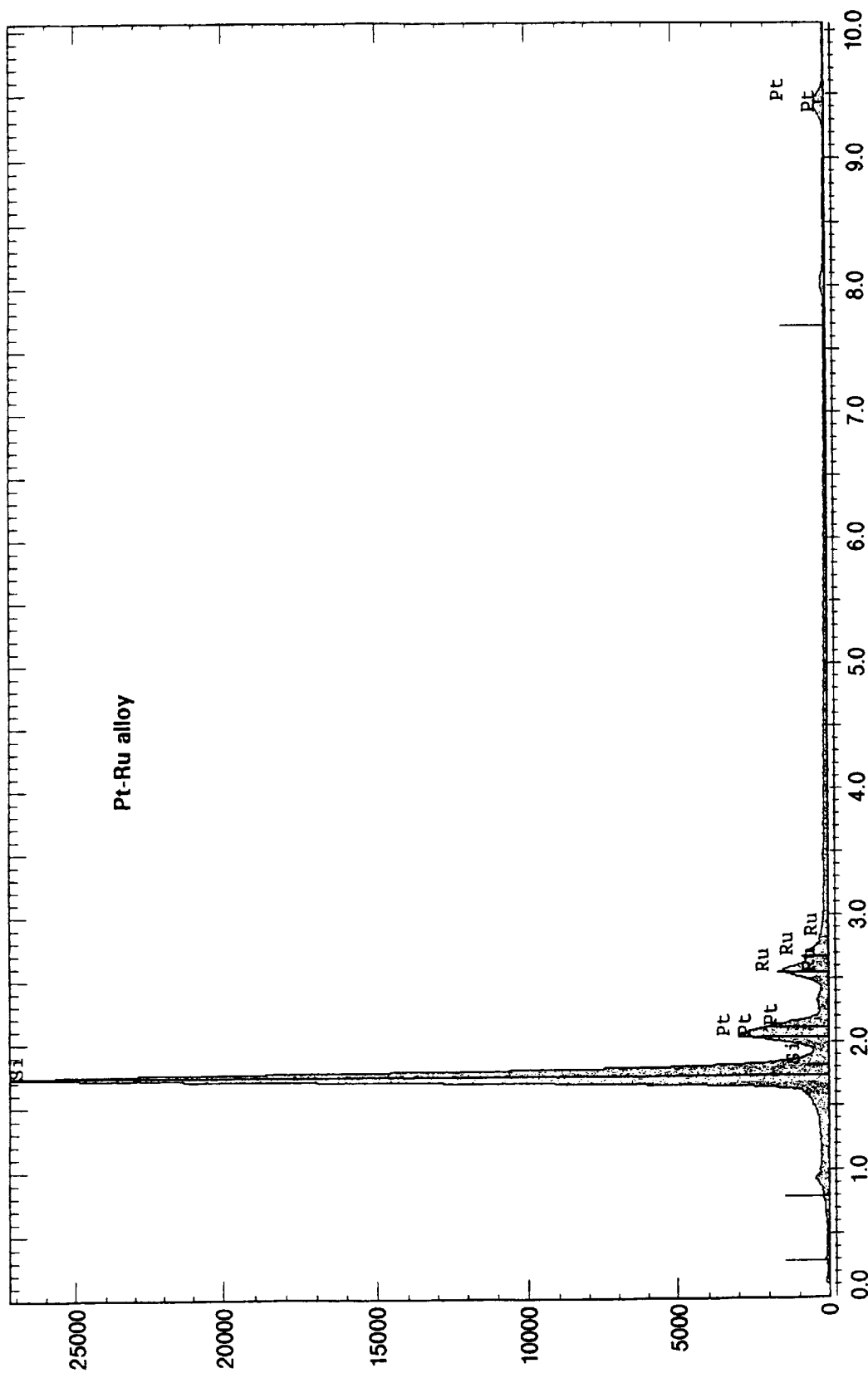
FIG. 25 is EDAX analysis of a sample according to the invention (Example 8) in which sputtering was used to prepare the sample.

The sample with zone loading of 0.3 mg PtRu/cm$^2$ (1,500 Å zone thickness), and the respective glass witness slides, were analyzed to determine composition and structure of the deposited zone. The scan (FIG. 25) showed that within the resolution of the spectrometer only Pt and Ru elements were present at a ratio of Pt/Ru=53.73%/46.27%, i.e., less than 10% difference with the target ratio.

XRD Analysis

Figure 26:
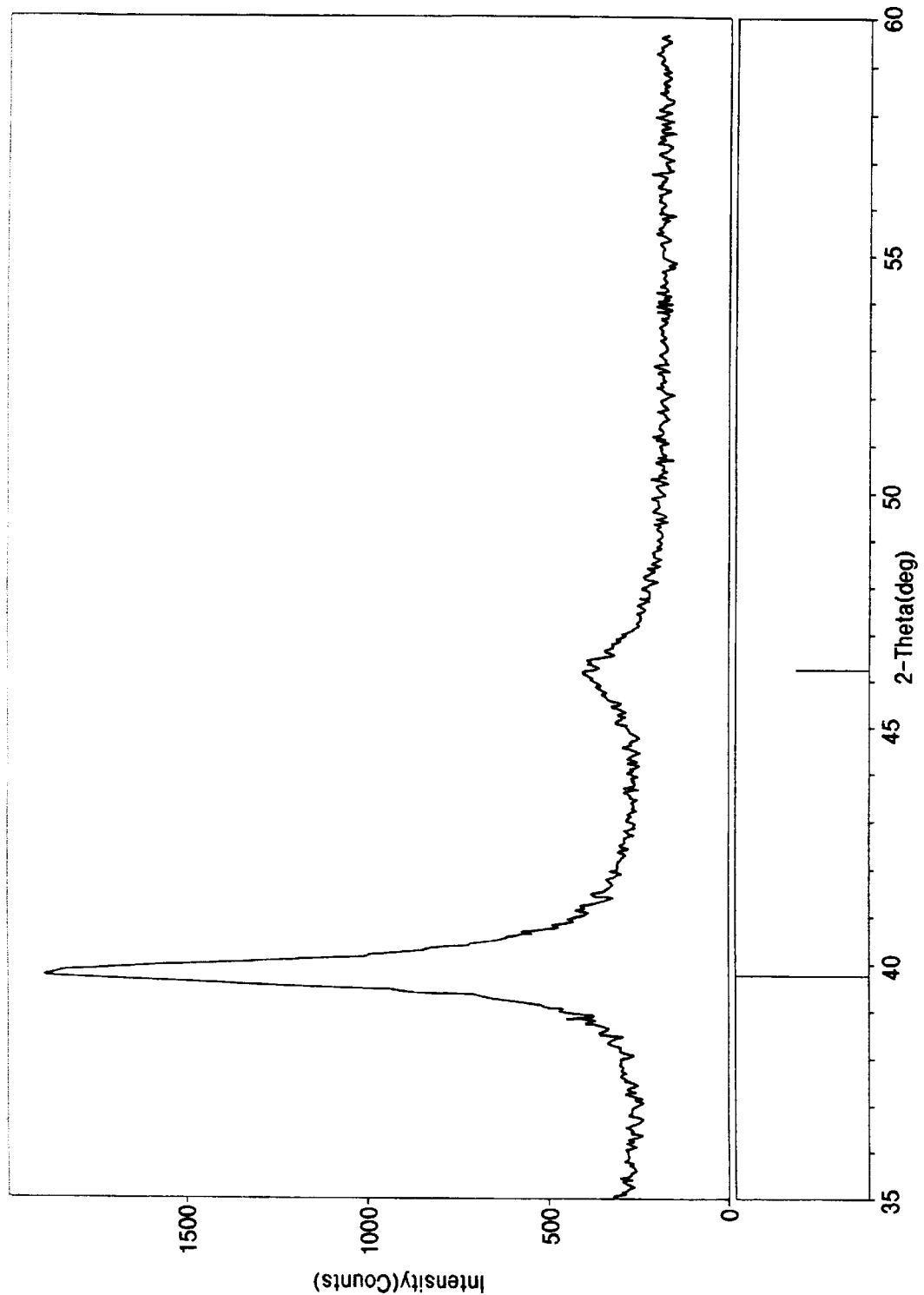
FIG. 26 is XRD analysis of a sample according to the invention (Example 8) in which sputtering was used to prepare the sample.

X-ray diffraction (XRD) analysis was carried out with a Siemens diffractometer using a Cu Kα source. FIG. 26 shows the XRD spectrum. For comparison, the diffraction lines of Pt (fcc) (from literature, JCPDS 04-0802) is also compared beneath. The PtRu sputtered electrocatalyst layer exhibited the characteristic diffraction peaks of the Pt fcc structure. However, the diffraction lines of the bimetallic sample were shifted to lower values with respect to the same reflection of Pt in the JCPDS database. The shift in the bimetallic sample is −0.22 degrees compared with a pure Pt sample. This evidence is consistent with the presence of a PtRu alloy in the sputtered zone. This alloying is reflected as a change in the lattice parameter of the fcc lattice compared to the lattice parameter of pure Pt. In addition, no reflection lines that account for tetragonal RuO$_2$ (JCPDS 21-1172) or Ru (hcp) (JCPDS 6-663) phases were found.

XPS Analysis

Figure 27:
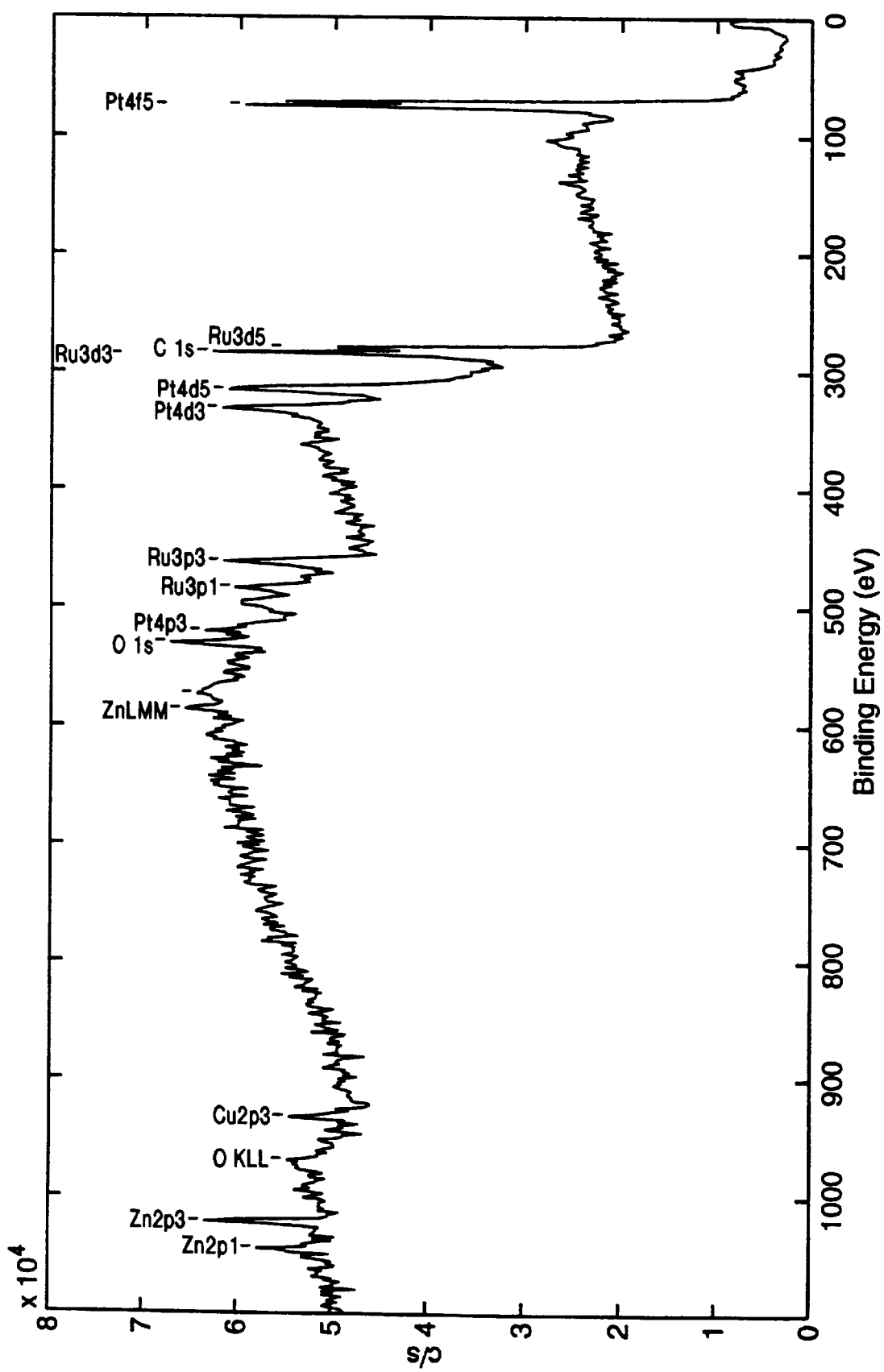
FIGS. 27 and 28 are wide scan XPS analyses of samples according to the invention (Example 8) in which sputtering was used to prepare the sample.
Figure 28:
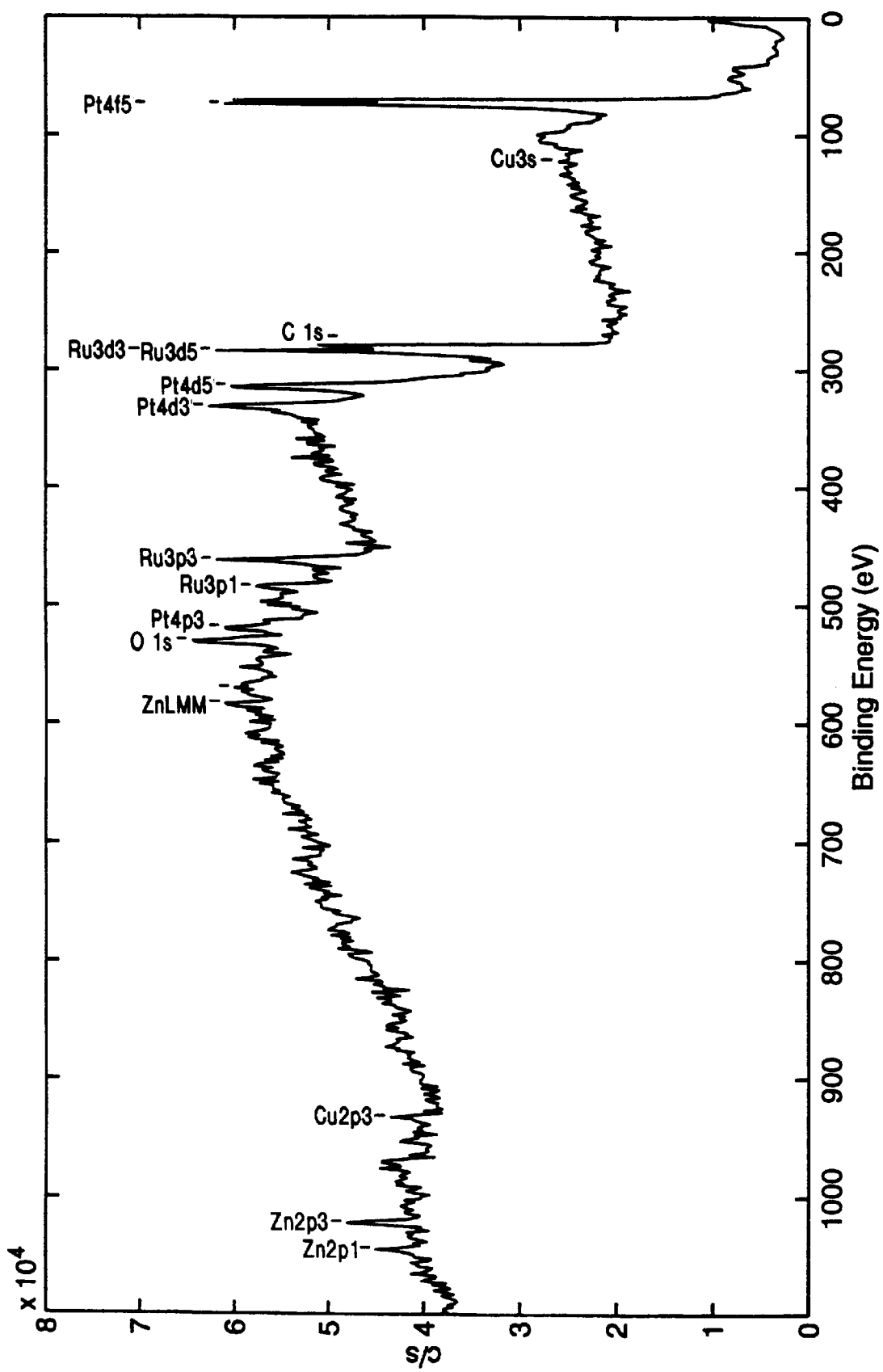
Figure 29:
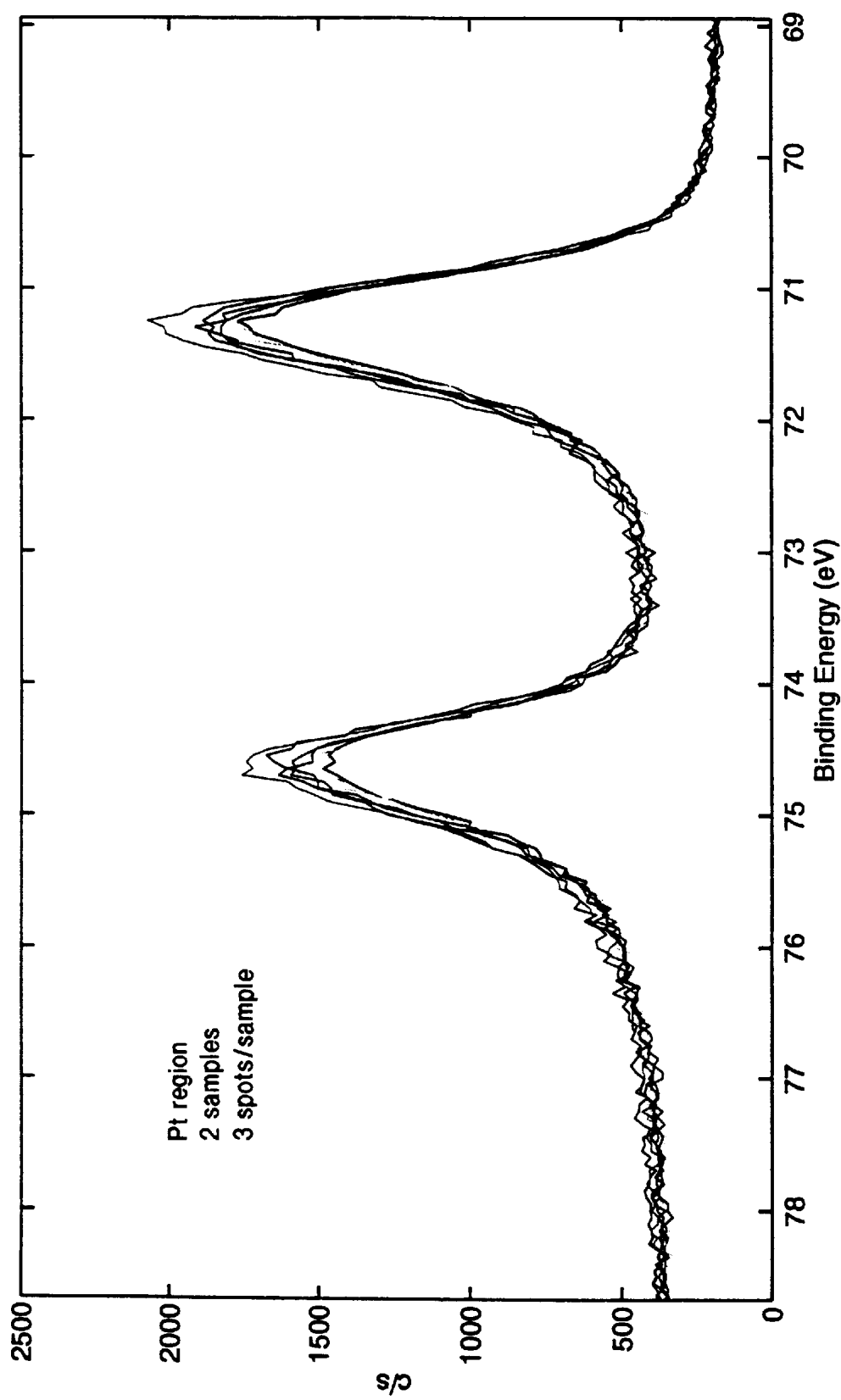
FIGS. 29 and 30 are XPS analyses (platinum region) of samples according to the invention (Example 8) in which sputtering was used to prepare the sample.
Figure 30:
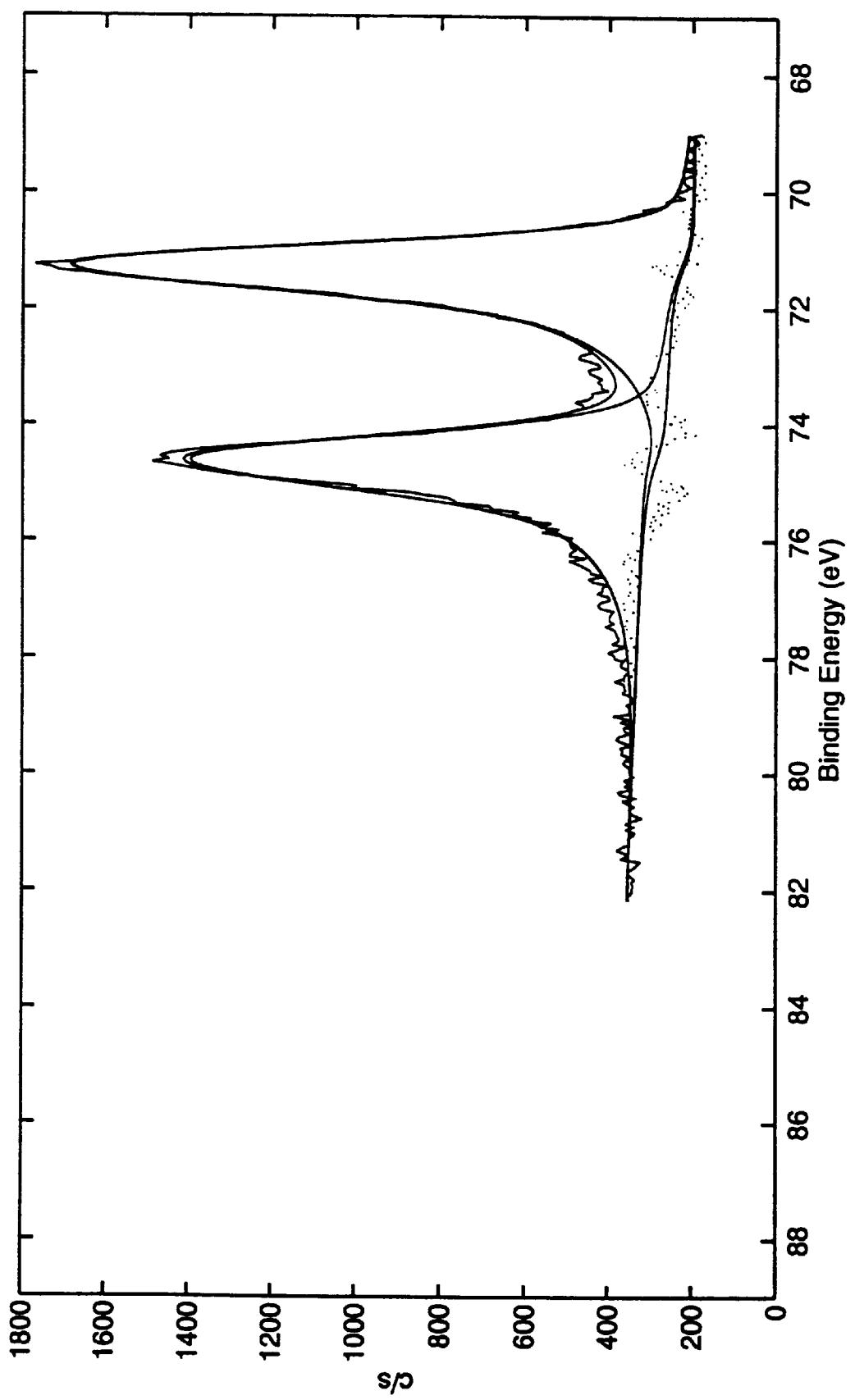
Figure 31:
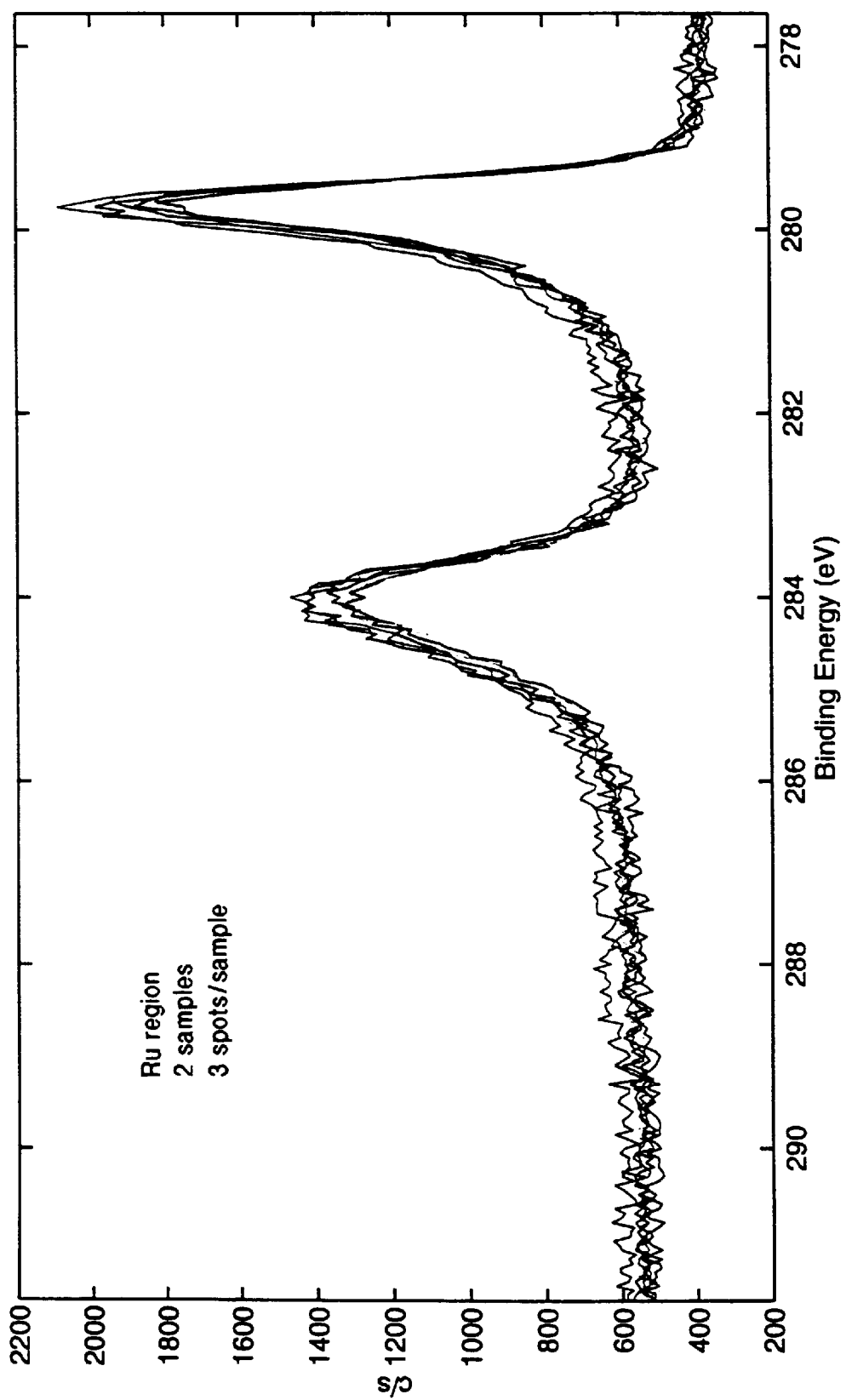
FIGS. 31 and 32 are XPS analyses (ruthenium region) of samples according to the invention (Example 8) in which sputtering was used to prepare the sample.
Figure 32:
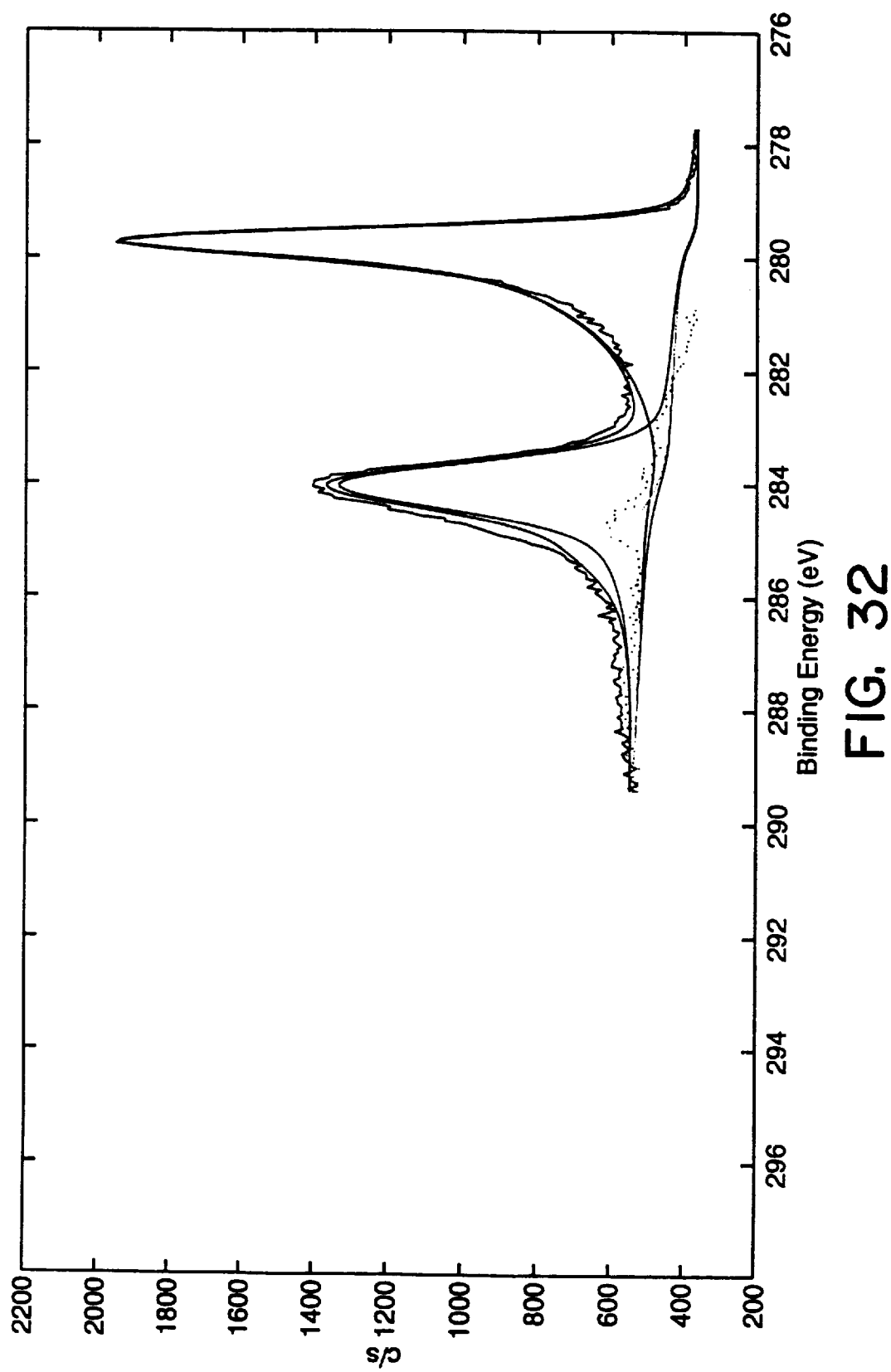

The x-ray photoelectron spectroscopic (XPS) measurements were performed using a Physical Electronics Quantum 2000 scanning ESCA spectrometer. Samples of the 0.3 mg PtRu/cm$^2$ (50% a/a Pt/Ru nominal target ratio) dual target sputtered electrode and of the sputtered skived PTFE were analyzed. Three spots per sample were measured to verify uniformity. FIGS. 27 and 28 show XPS wide-scan spectra for the sputtered gas diffusion media and the PTFE electrode element, respectively. The wide scan XPS analysis confirmed that the main components for the electrocatalyst layer are Pt and Ru, with traces of Zn and Cu also being present. Carbon also was present. The Pt/Ru atomic ratio for the alloy could be verified by examining the ratio of the areas of the Pt 4f and Ru 3p3 transitions, which (averaged for the three sampling spots) are Pt/Ru is approximately equal to Pt4f(area)/Ru3p3(area)=14.17/16.03 (i.e., 0.88) for the sputtered ELAT material and 15.25/14.00 (i.e., 1.09) for the sputtered PTFE substrate. Both ratios are within acceptable error from the target 1/1 ratio. Analysis of the binding energies (BE) of Pt and Ru transitions indicated that Pt and Ru in the sputtered layer were present in the metallic state with no evidence of presence of Pt or Ru oxides. Due to the difference in electronegativities between Pt and Ru (Pt smaller than Ru) a charge transfer between both elements in the lattice is expected, thus polarizing the Pt—Ru bond. This charge transfer is then expected to yield a BE shift. It was found that the Pt $4f_{7/2}$ transition for the PtRu sputtered phase presented a BE=71.7 e V, while the BE for elemental Pt found in literature is 71.1–71.2 e V (71.07 e V (2 values), 71.2 e V (13 values), 71.0 e V). This represents a chemical shift of 0.5–0.6 e V. This shift in BE then suggests alloying between Pt and Ru in the sputtered phase. The same analysis was performed for the Ru $3d_{5/2}$ transition (BE=280.1 e V) but no observable shift was detected from the expected literature value (279.94, 280.2 (7 values), 280.0 and 280.1 (2 values) e V). Both Pt and Ru transitions were referenced to the carbon (reference) transition at BE=285.00 e V. FIGS. 29 and 30 show the XPS spectra for the Pt region (Pt 4f transition) and its deconvoluted spectrum, respectively, for 2 samples (3 spots/sample), for the PtRu sputtered gas diffusion media electrode. FIGS. 31 and 32 show the XPS spectrum for the Ru region (Ru 3d transition) and its deconvoluted spectrum, respectively.

Polarization Performance

MEA Preparation

The sputtered Pt Ru/ELAT gas diffusion media electrode was first pretreated with a solution of 4.5% (w/w) mixture of Flemion (950 EW) proton conducting polymer in isopropanol. The solution was brushed on the catalyzed side of the gas diffusion electrode and dried at ca. 80° C. using a heat gun until substantially all solvent was evaporated. The pretreated electrode was then hot pressed to a GORE-SELECT® proton conducting membrane (25 μm membrane thickness, 950 EW ionomer impregnated) as the anode half-cell. A standard GORE reference electrode (0.3 mg Pt cm$^{-2}$ loading) was used as cathode.

To provide a reference point for the comparison of the MEA performance with use of the bimetallic Pt—Ru electrocatalyst zone, MEAs containing Pt sputtered anodes (loading=0.1 mg Pt/cm$^2$) were also prepared. These anodes were prepared using the same magnetron sputtering unit and at the same vaporization conditions as the bimetallic dual target sputtered anodes. The MEAs using these reference anodes (which were ionomer pretreated) were also prepared by hot pressing this electrode to a GORE-SELECT® proton conducting membrane (25 μm, 950 EW) as the anode half-cell. A standard reference electrode (0.1 mg Pt/cm$^2$ loading; available from W. L. Gore & Associates under the PRIMEA 5510 name) was used as cathode.

MEA Testing

The MEA, with an electrode active area of 25 cm², was mounted in a standard Fuel Cell Technologies fuel cell fixture using ELAT as diffusor in the cathode (reference) side. The fixture was then clamped down to ca. 200 lb in/bolt torque using standard gasket material and then connected to a GLOBETECH fuel cell test plant using a Scribner and Assoc. electronic load for conditioning and testing. Hydrogen/air characterization was done first at 60° C. cell temperature, with anode and cathode saturated at 60° C./60° C., respectively, via sparger bottles at atmospheric pressure. The characterization was then done at 80° C. cell temperature, with anode and cathode saturated at 90° C./75° C., respectively, at a cell back pressure of 30/30 psig for anode and cathode respectively. In both cases, stoichiometric-based flow of 1.2/3.5 was used. Polarization performance was obtained at steady state after proper conditioning of the MEA and after at least 1 day on stream. Conditioning of the MEA was achieved by cycling the cell potential between 0.6 V and ca. 0.4 V and OCV. The polarization curve was obtained by varying the cell potential in 50 mV steps and recording the steady state current density at load based flow (i.e., reactant flow rate proportional to total cell amperage). Reformate characterization was done at the higher temperature/pressure testing condition using two types of $CO/H_2$ mixtures: 5 ppm and 50 ppm CO. The testing strategy involved first the characterization of the MEA in $H_2$/air feeds upon achieving steady state power output. Then the 5 ppm CO fuel was injected, and the MEA was allowed to stabilize overnight (at least 10 hrs.) at 0.6 V with this anode feed. Then, after steady-state saturation for the anode with the poisoned feed was achieved, the polarization curve was taken. Afterwards, the 50 ppm $CO/H_2$ fuel was injected, and the MEA was again allowed to stabilize overnight at 0.6 V. The steady-state polarization curve was taken after that period of time.

Figure 33:
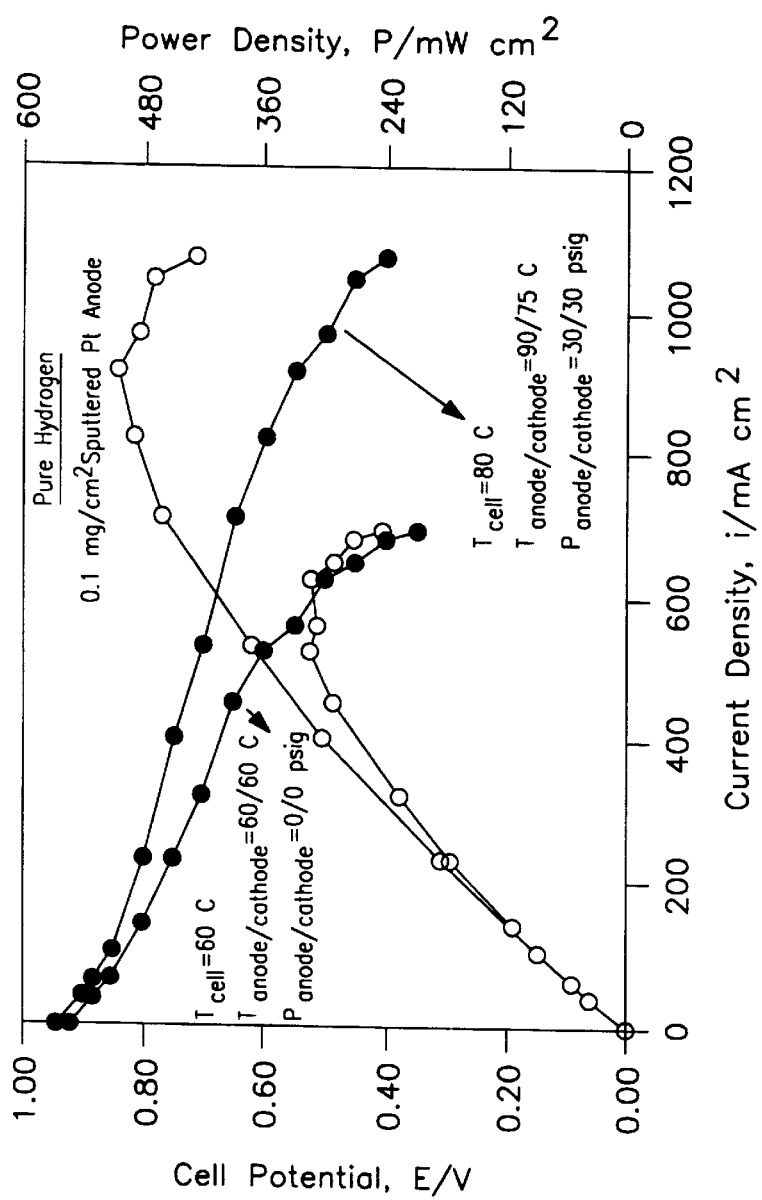
FIGS. 33 and 34 show polarization performance for membrane electrode assemblies described in Example 8 which comprise a deposited zone of platinum for reference.
Figure 34:
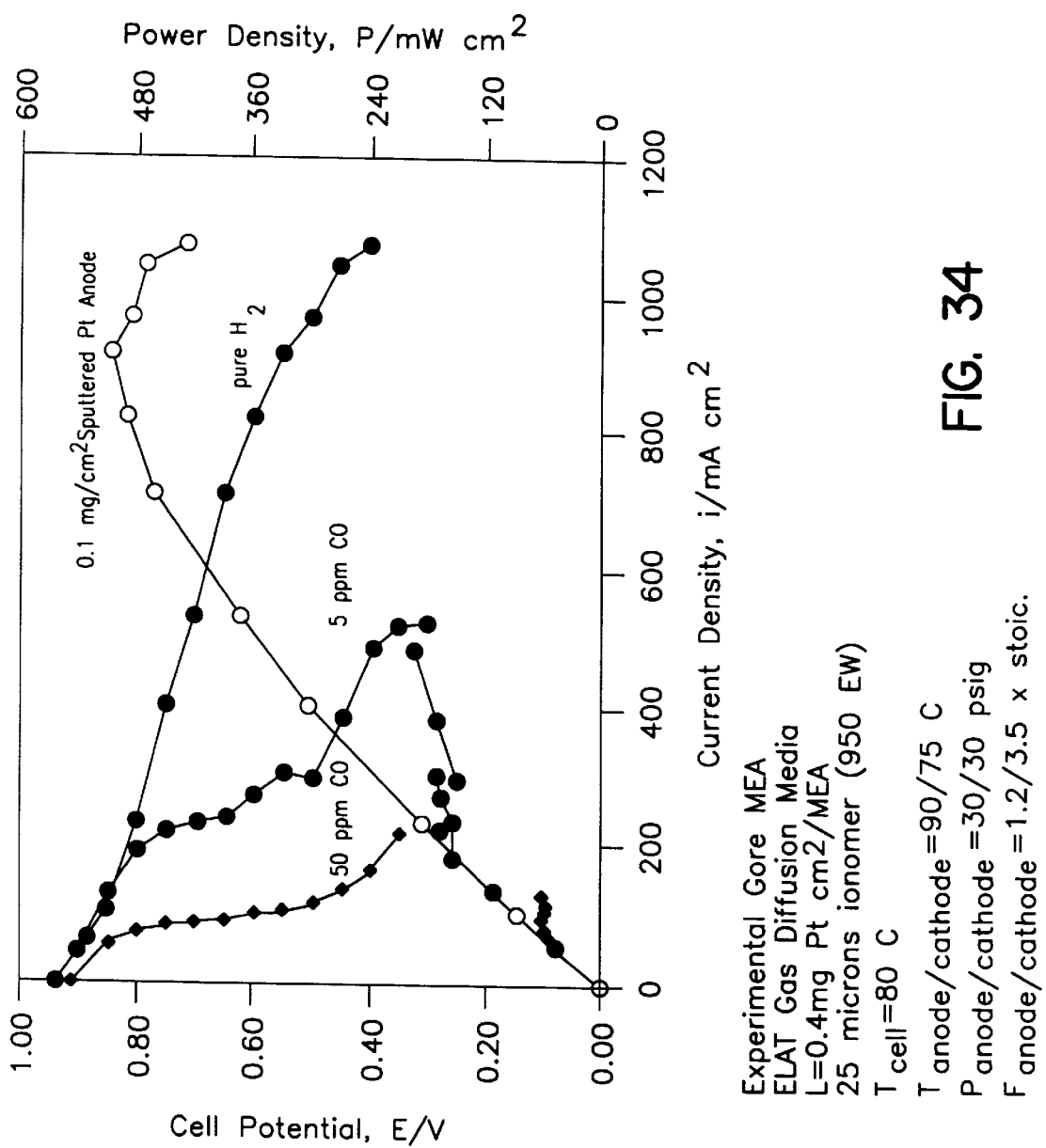
Figure 35:
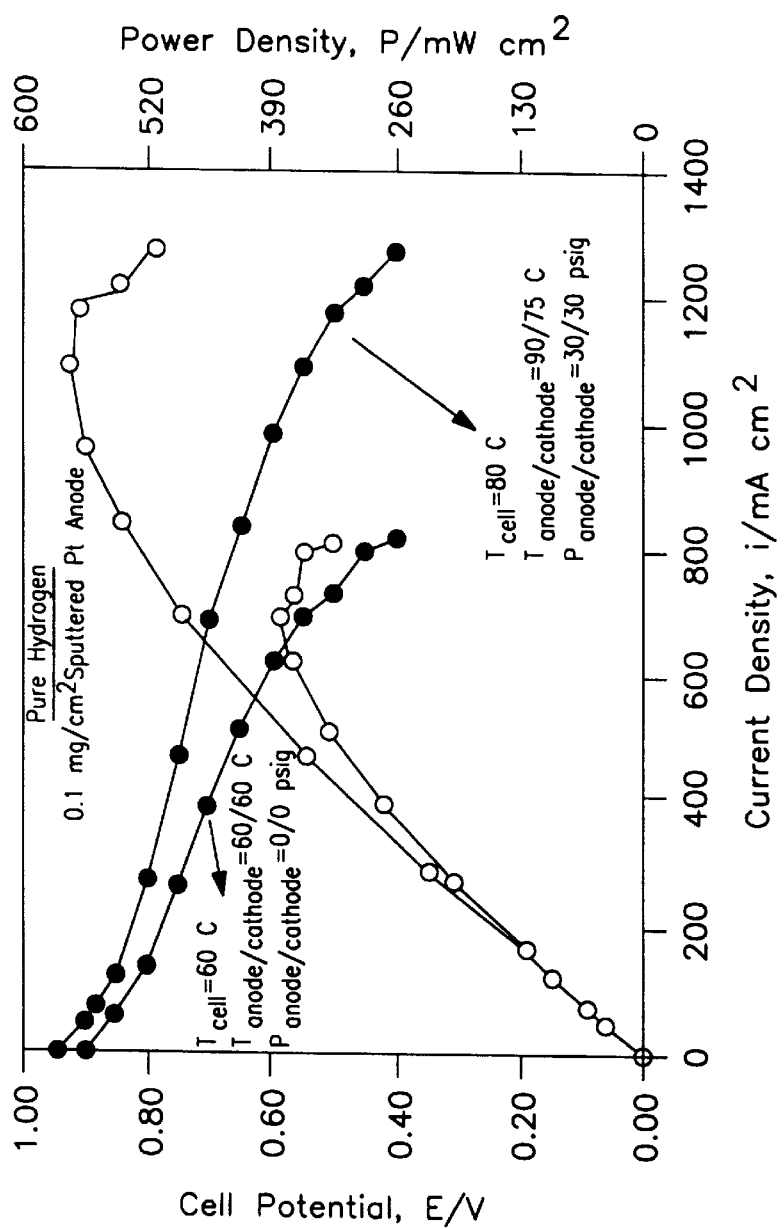
FIGS. 35 and 36 show polarization performances for membrane electrode assemblies with bimetallic deposited layer according to the invention (Example 8).
Figure 36:
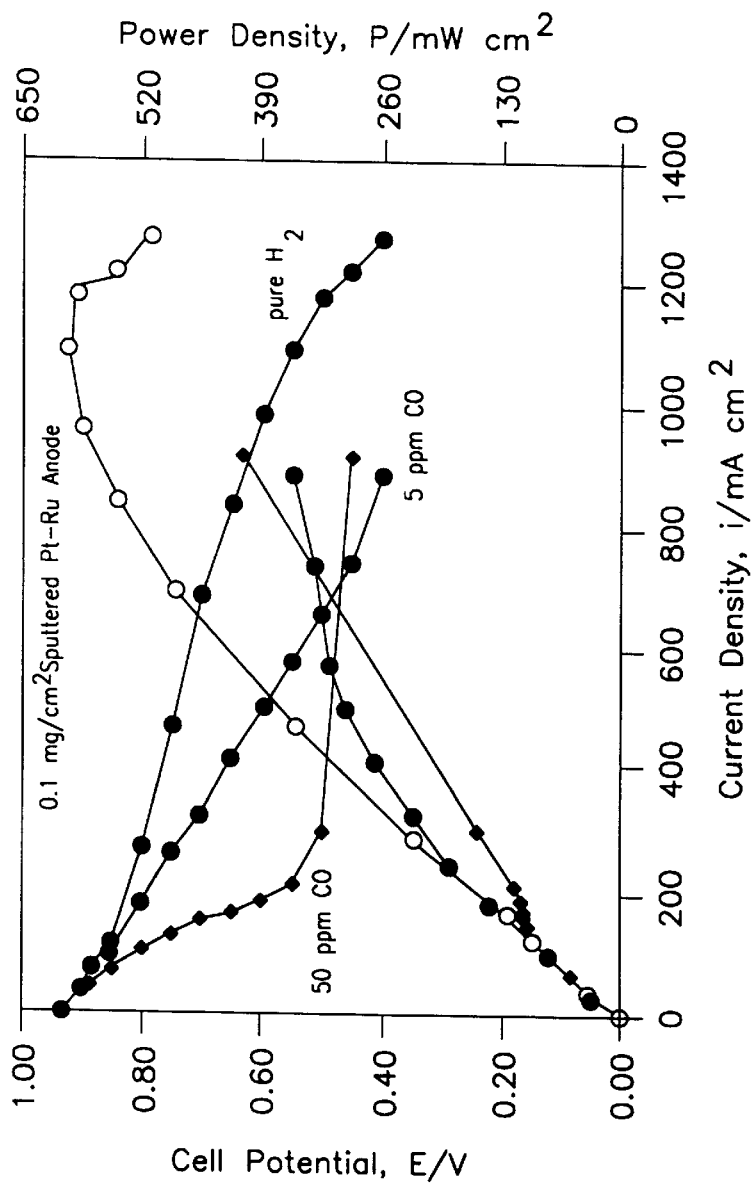

FIGS. 33 and 34 show polarization performance (cell potential and power density vs. current density) for the Pt sputtered anode in pure $H_2$ and in $H_2/CO$ anode feeds, respectively. FIGS. 35 and 36 show the corresponding evaluation, but for the MEA with the PtRu sputtered anode, for pure $H_2$ and for $H_2/CO$ anode feeds, respectively. Table 1 summarizes the performance, expressed as current density at 0.6 V in $H_2$ and $H_2/CO$ mixtures (5 and 50 ppm CO concentration). The results indicated that surprisingly the implementation of the PtRu bimetallic sputtered anodes in pure $H_2$ anode feed produced an improvement of ca. 20% in current density/power output when compared to a sputtered Pt (single metal) electrode. In the presence of 5 ppm $CO/H_2$ anode feed, the bimetallic sputtered anode yielded 84% improved power output at 0.6 V, and at the 50 ppm level the improvement was ca. 82%, all compared to the sputtered Pt (reference) electrode (see Table 1).

To further characterize the poison resistance of the anode taking also in consideration the performance in clean ($H_2$-only) reactant feeds, a poison resistance-related lambda parameter ($\Lambda$), defined as $(\Lambda)=(i_{H2}-i_{CO/H2})/i_{H2}$ at a fixed voltage reference (e.g., 0.6 V) can be used. In this equation, an electrode with 100% poison resistance (i.e., $i_{H2} \approx i_{CO/H2}$) will yield $\Lambda \rightarrow 0$. An electrode that is then totally poisoned and "shuts down" in poisoned feeds, i.e., $i_{CO/H2} \rightarrow 0$, will yield $\Lambda \approx 1$. An electrocatalyst with improved poison resistance will yield smaller $\Lambda$s. Table 1 depicts the results for this lambda parameter. The data demonstrate that while the Pt sputtered anode suffers a 67% drop in performance at 5 ppm CO level and 88% at 50 ppm level CO, compared to the performance with pure hydrogen feed, the PtRu sputtered anode decays only 49% (i.e., 18% less) at 5 ppm CO, and 82% (6% less) at 50 ppm CO, in relation to the performance of the bimetallic anode in pure hydrogen.

Poison resistance lambda parameters are noted further below. The MEAs of the present invention, when subjected to CO/hydrogen feeds, are able to provide excellent lambda parameters of:

when subjected to hydrogen feed with 5 ppm CO, 0.65 or less, and more preferably, 0.50 or less, and more preferably, 0.25 or less; and/or when subjected to hydrogen feed with 50 ppm CO, 0.85 or less, and more preferably, 0.60 or less.

Current densities for the present invention are also noted herein. The MEAs of the present invention, when subjected to CO/hydrogen feeds, are able to provide current densities at 0.6 V of at least:

350 mA/cm², and preferably, 450 mA/cm², and more preferably, at least 500 mA/cm², when subjected to hydrogen feed with 5 ppm CO; and/or 150 mA/cm², and preferably, 175 mA/cm², and more preferably, 200 mA/cm², when subjected to hydrogen feed with 50 ppm CO.

Example 9

Electrode Element Preparation

Electrode elements including ELAT gas diffusion media and 6 mil skived PTFE sheets were placed into a vacuum chamber (1.5 m diameter, 2 m long) which can be pumped down to ca. <$10^{-4}$ torr using a diffusion pump. The 6"×6" gas diffusion media substrates were mounted in a 4 point-holder carrousel. Each of the mountings and the carousel rotated, thus helping to assure uniform coating. DC magnetron sputtering was used. Bimetallic electrocatalyst zone comprising Pt and tin (Sn) were prepared using dual target sputtering.

The unit consisted of a 6" diameter magnetron, which was loaded with two catalyst-material targets. The specifications of the targets were: Pt foil (50 mm×50 mm, 0.127 mm thickness, 99.9% pure, from Alfa) and Sn foil (0.1 mm thickness, Puratronic, 99.998% pure).

Calibration runs helped establish the relative amount of target material used to provide the desired composition. The subsequent composition of the deposited zone was analyzed for calibration purposes. This calibration step was necessary because each metal had a different sputtering yield, a property that is intrinsic to the element being sputtered, and the target area surface area ratio does not necessarily directly correlate with the vaporized phase composition ratio.

Three different PtSn catalyst compositions, with different Pt/Sn atomic ratios, were prepared using dual target magnetron sputtering: Pt layers with 40, 20, and 15% Sn were produced with loadings of ca. 0.3 mg PtSn/cm². Typical conditions were base pressure=$8\times10^{-4}$ torr, and deposition rate=1–10 A/sec. Glass witness slides were used with all runs. The Pt and Sn were sputtered and deposited on the active side of the ELAT electrode, wherein the active side is the side that normally is placed against a catalyst layer during normal fuel cell mounting, as well as onto one side of the skived PTFE material. Double rotation of the substrates while vacuum catalyzation took place helped assure coating uniformity. The electrocatalyst layer was then coated at a deposition rate averaging 6 A/sec as measured with a vibrating crystal microbalance to the specified target loading, with a magnetron power ranging of 250–500 W, 490–570 V dc bias and 450–900 mA Ar$^+$ flux.

Electrode Element Characterization
EDAX Analysis

Figure 37:
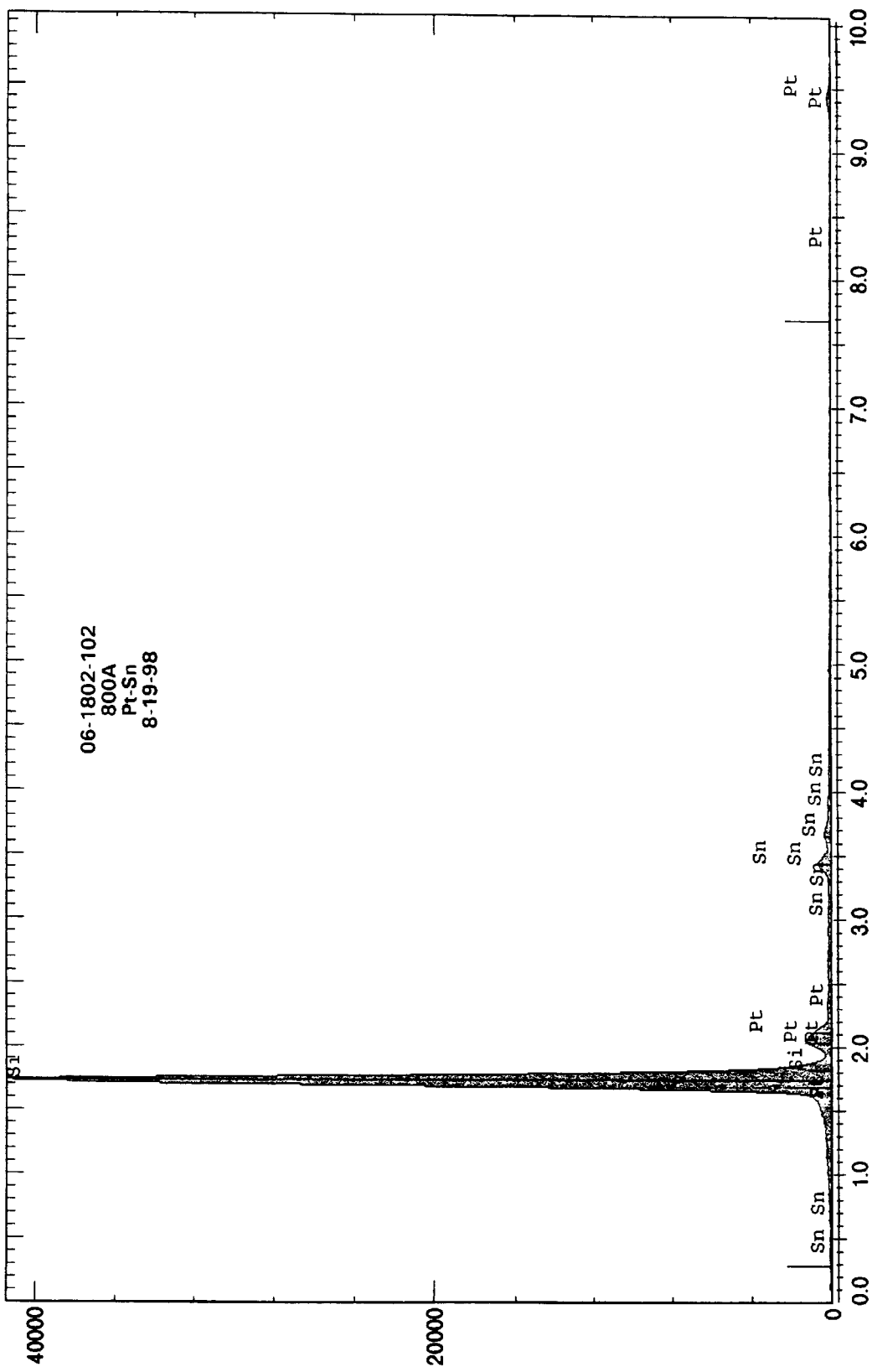
FIGS. 37, 38, and 39 are EDAX analyses for samples according to the invention prepared by sputtering (Example 9).
Figure 38:
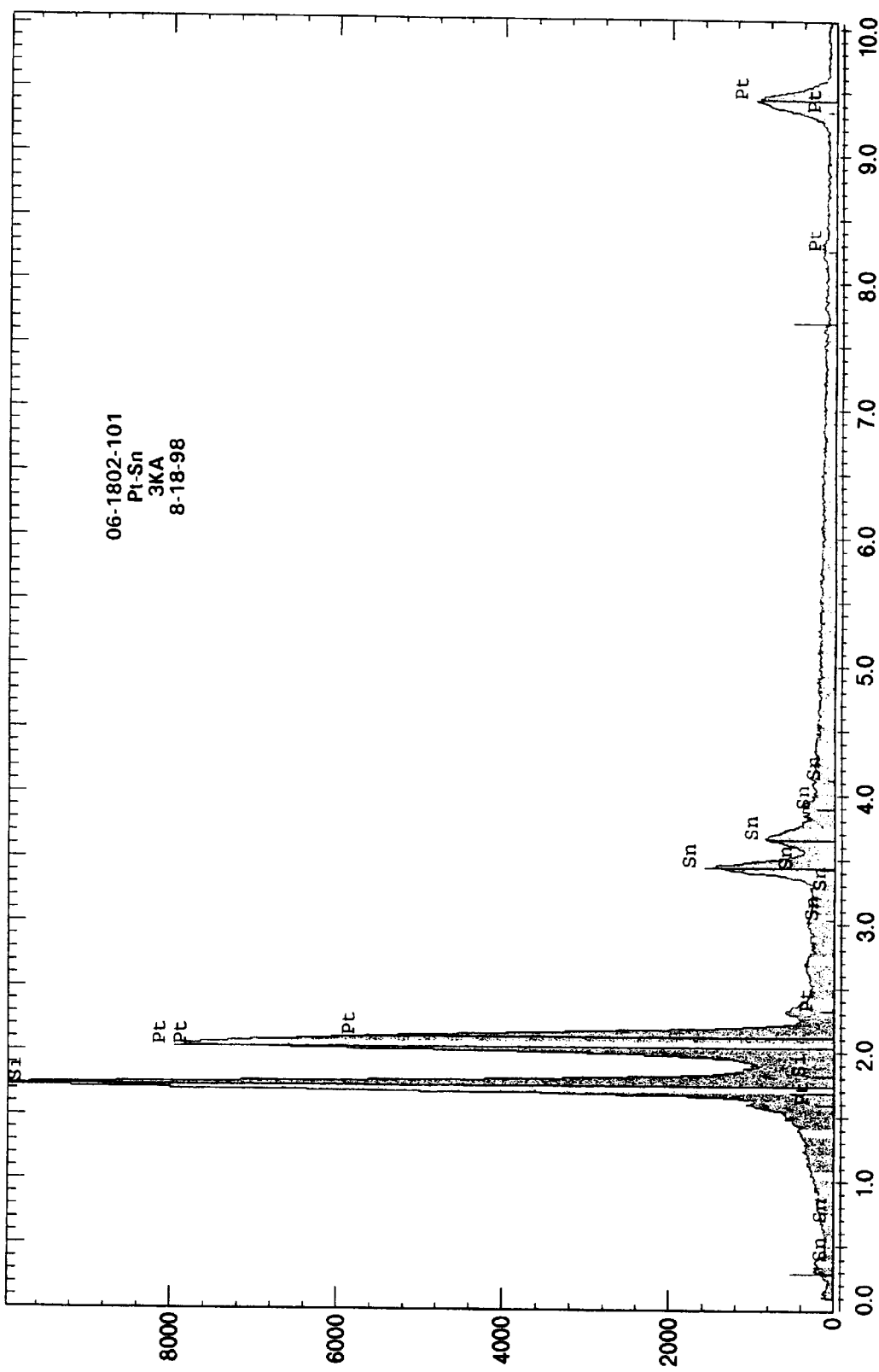
Figure 39:
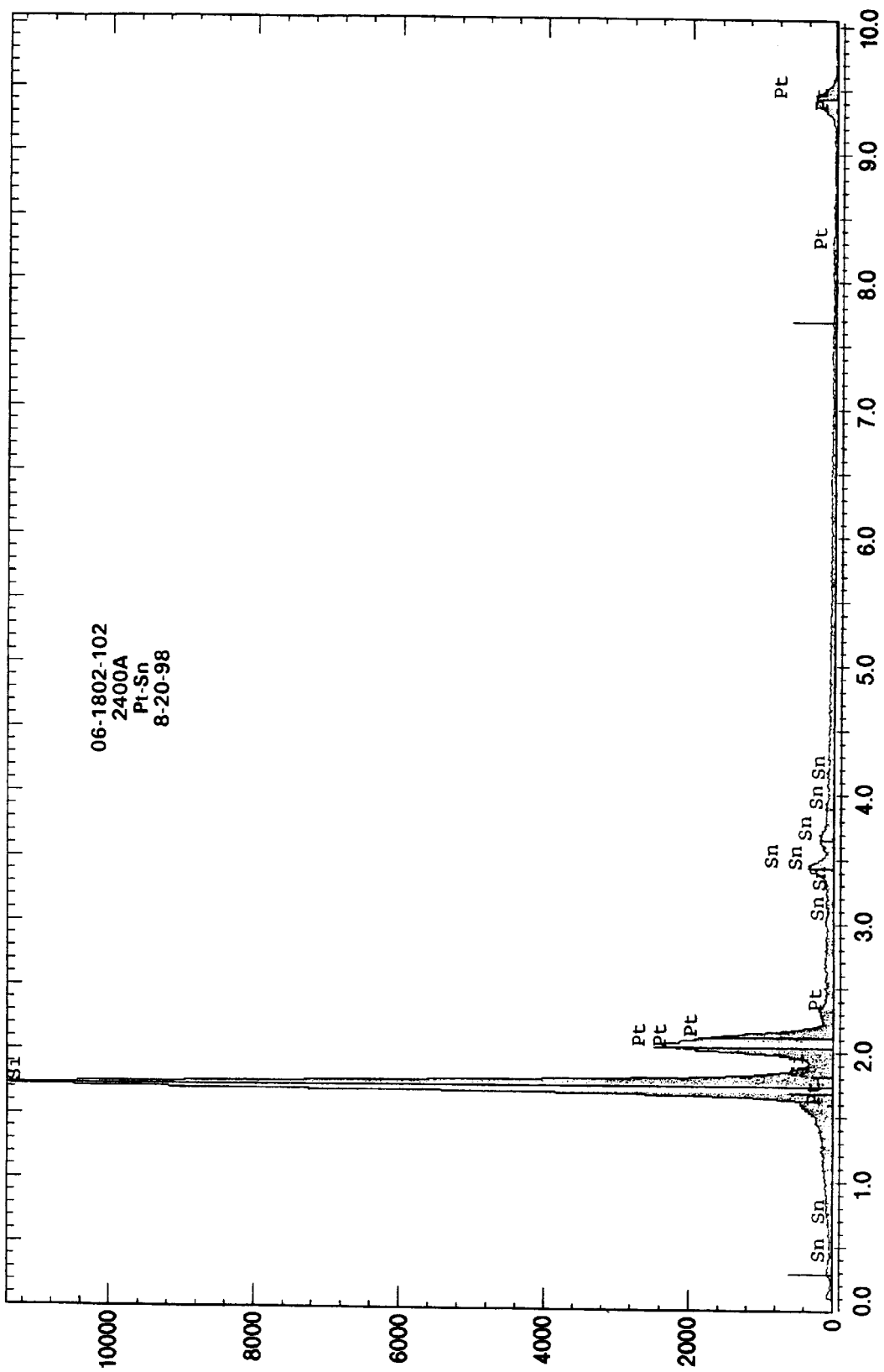

The PtSn deposited zones were prepared by dual target sputtering and were analyzed to determine composition and structure of the deposition. FIGS. 37, 38, and 39 show Energy Dispersive X-Ray (EDAX) spectra of the 0.3 mg/cm$^2$ loading PtSn deposition for, respectively, the desired amounts of Sn: 40%, 20%, and 15% Sn (atomic percent). The scans showed (within the sensitivity of the spectrometer) that only these two elements (Pt and Sn) were present and that the elements were present at an approximate ratio of Pt/Sn=62%/38%, 78%/22% and 84%/16% for the 40, 20 and 15% Sn targeted atomic ratios.

XRD Analysis

Figure 40:
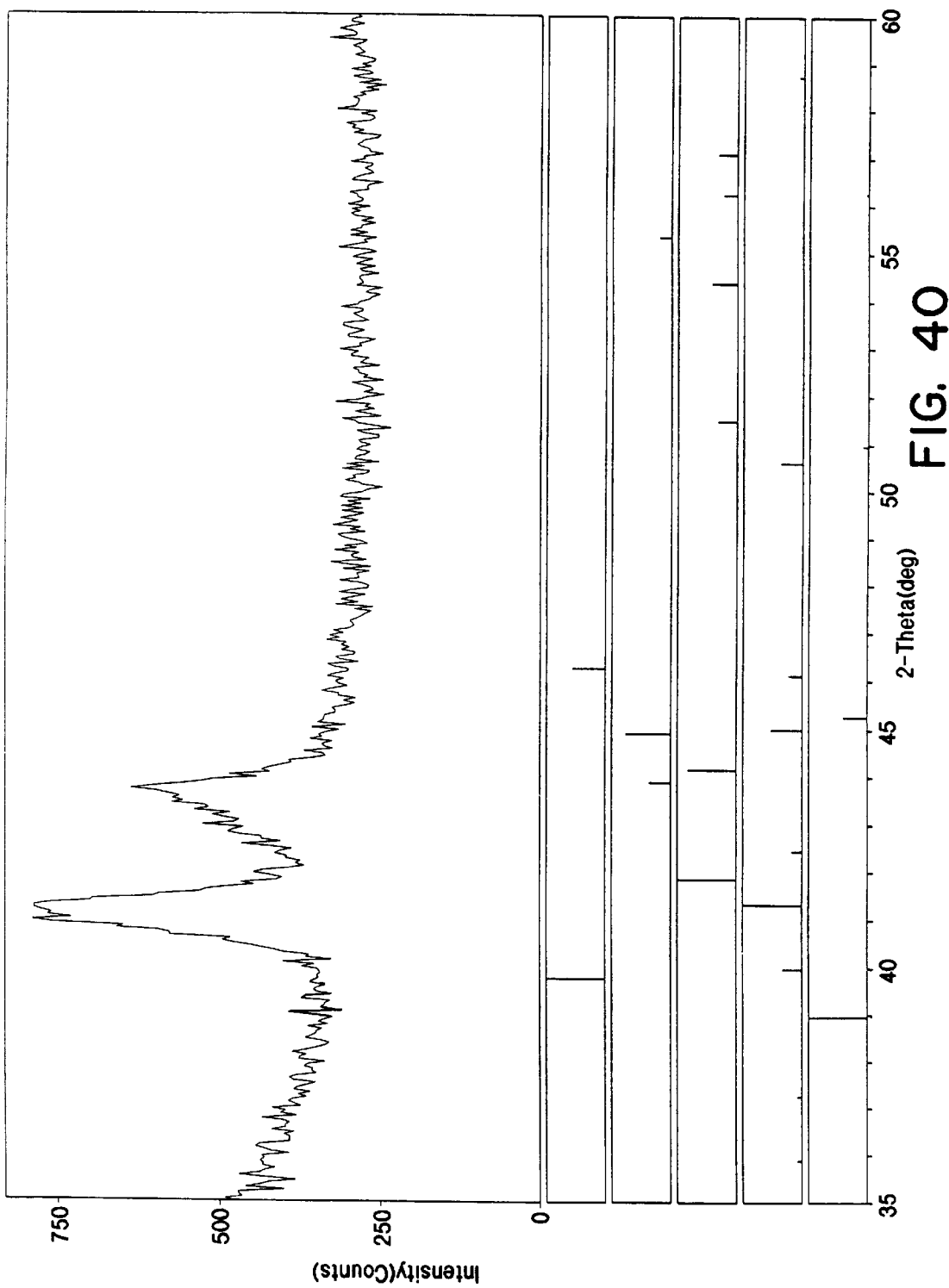
FIGS. 40, 41, and 42 are XRD analyses for samples according to the invention prepared by sputtering (Example 9).
Figure 41:
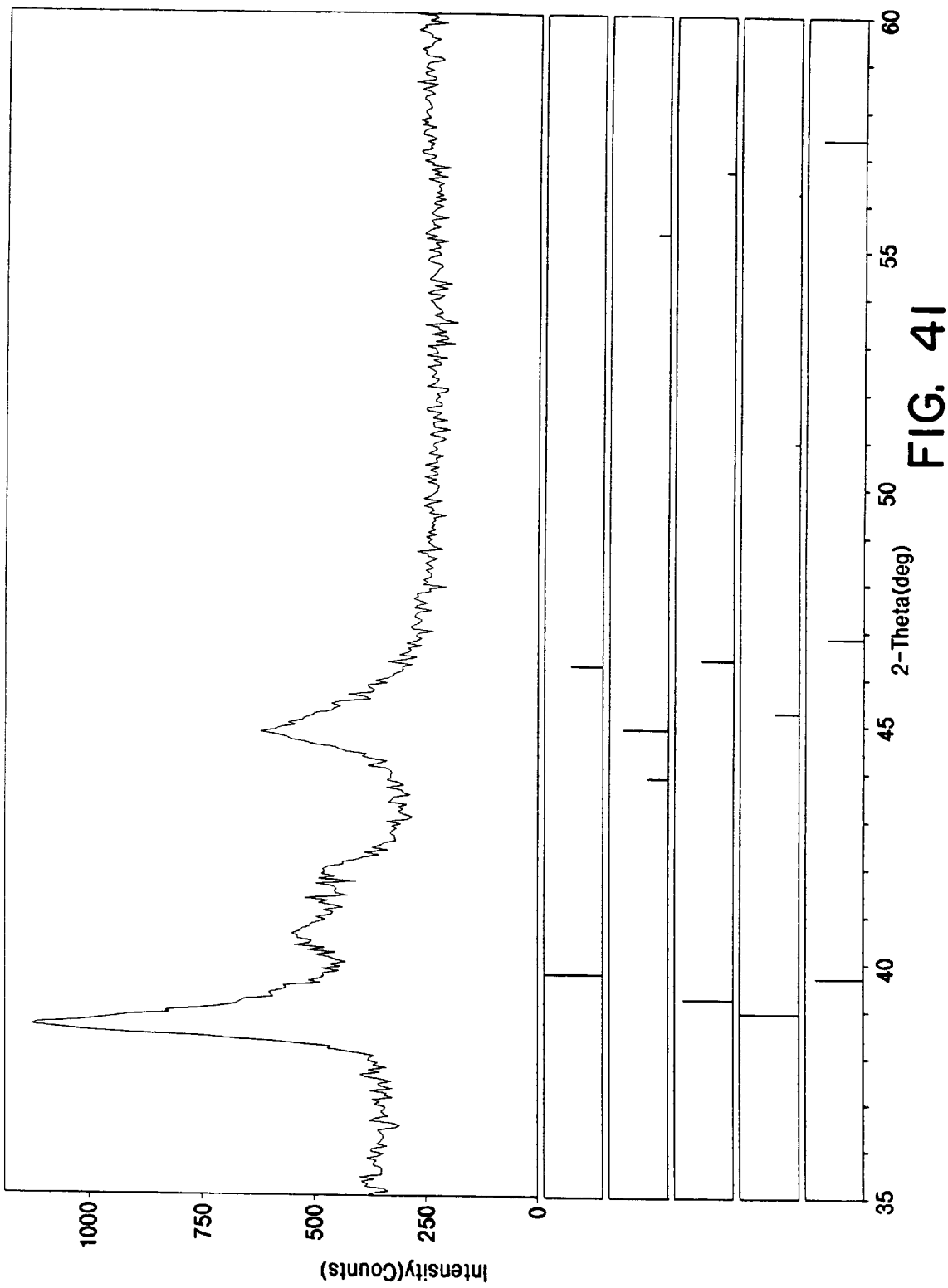
Figure 42:
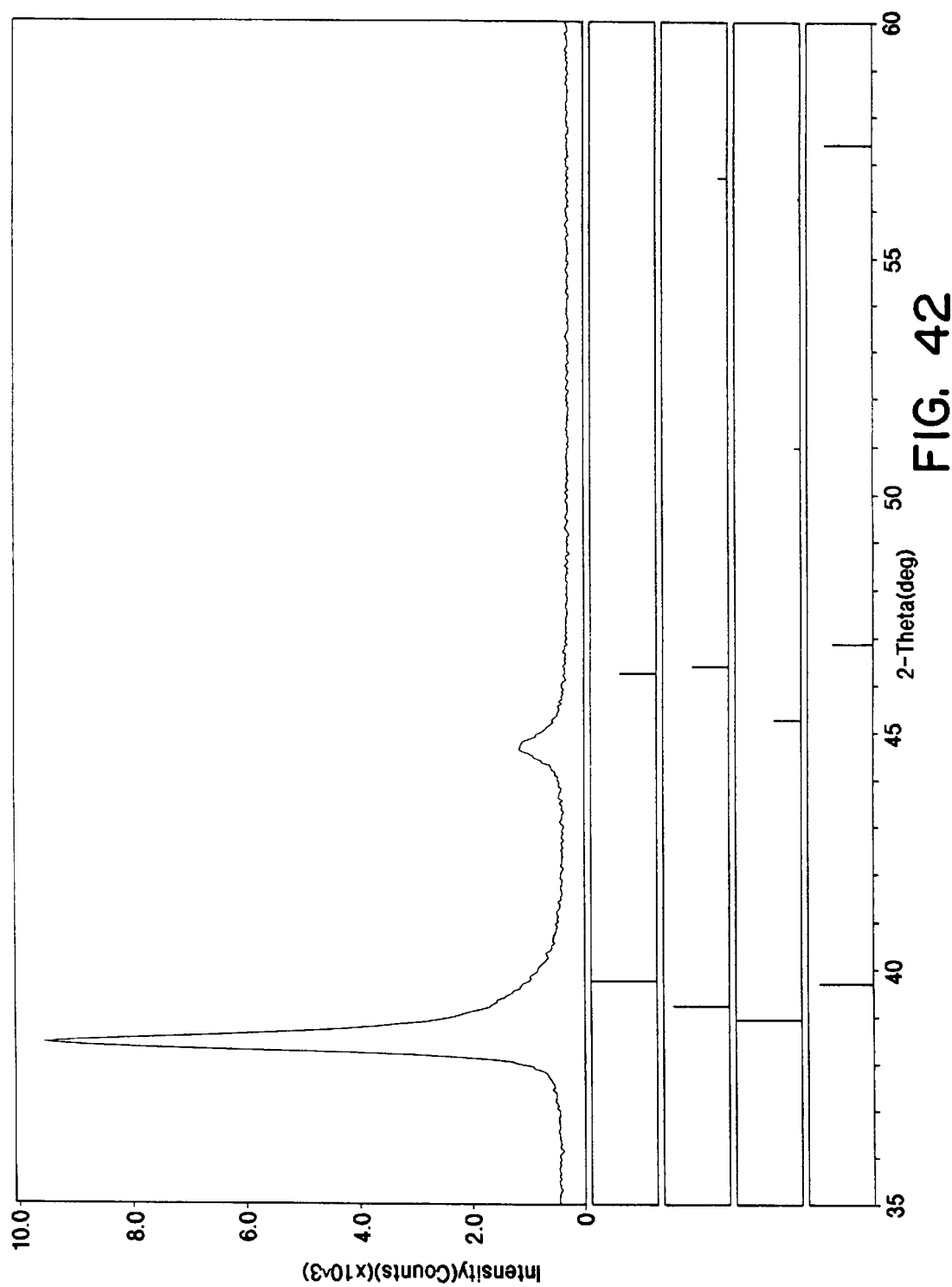

FIGS. 40, 41, and 42 show the X-ray diffraction (XRD) signatures for, respectively, the 40, 20, and 15% Sn targeted atomic ratio electrodes. Analysis of the diffractograms indicated that in all the cases phase change shifts from the (pure) Pt fcc diffraction lines were observed. These changes are consistent with the presence of alloy phases.

Matching analysis with diffraction pattern databases also were consistent with the presence of multiple alloy phases. For example, the 40% composition had diffraction peaks that may indicate the presence of PtSn and PtSn$_3$ phases. The 20% system, for example, showed the presence of convoluted diffraction bands of SnPt$_3$, Sn, and PtSn. The 15% Sn system showed a diffraction pattern that suggested the presence of SnPt$_3$ and Sn phases.

Example 10
Electrode Element Preparation

Electrode elements including ELAT gas diffusion media and 6 mil skived PTFE sheets were placed into a vacuum chamber (1.5 m diameter, 2 m long) which were pumped down to ca. <10$^{-4}$ torr using a diffusion pump. The 6"x6" gas diffusion media substrates were mounted in a 4 point-holder carrousel. Each of the mountings and the carousel rotated. DC magnetron sputtering was used. A bimetallic PtCr zone was deposited using dual target sputtering.

The sputtering unit consisted of a 6" diameter magnetron, which was loaded with two catalyst-material targets. The specifications of the targets were Pt foil (50 mm×50 mm 0.127 mm thickness, 99.95 pure, from Alfa) and Cr sputtering target (50.8 mm×31.8 mm, 99.98% pure). Calibration runs were carried out as noted above.

Electrodes with 25% atomic percent Cr at a nominal loading of ca. 0.3 mg PtCr/cm$^2$ were prepared. Typical conditions were base pressure=8×10$^{-4}$ torr, and deposition rate=1–10 A/sec. Glass witness slides were used in all runs. Pt and Cr were sputtered deposited on the active side of the ELAT substrate as well as onto one side of skived PTFE. Double rotation of the substrate was used. The electrocatalyst zone was coated at a deposition rate averaging 6 Å/sec as measured with a vibrating crystal microbalance to the specified target loading, with a magnetron power ranging of 250–500 W, 490–570 V dc bias, and 450–900 mA Ar$^+$ flux.

Electrode Element Characterization
EDAX Analysis

Figure 43:
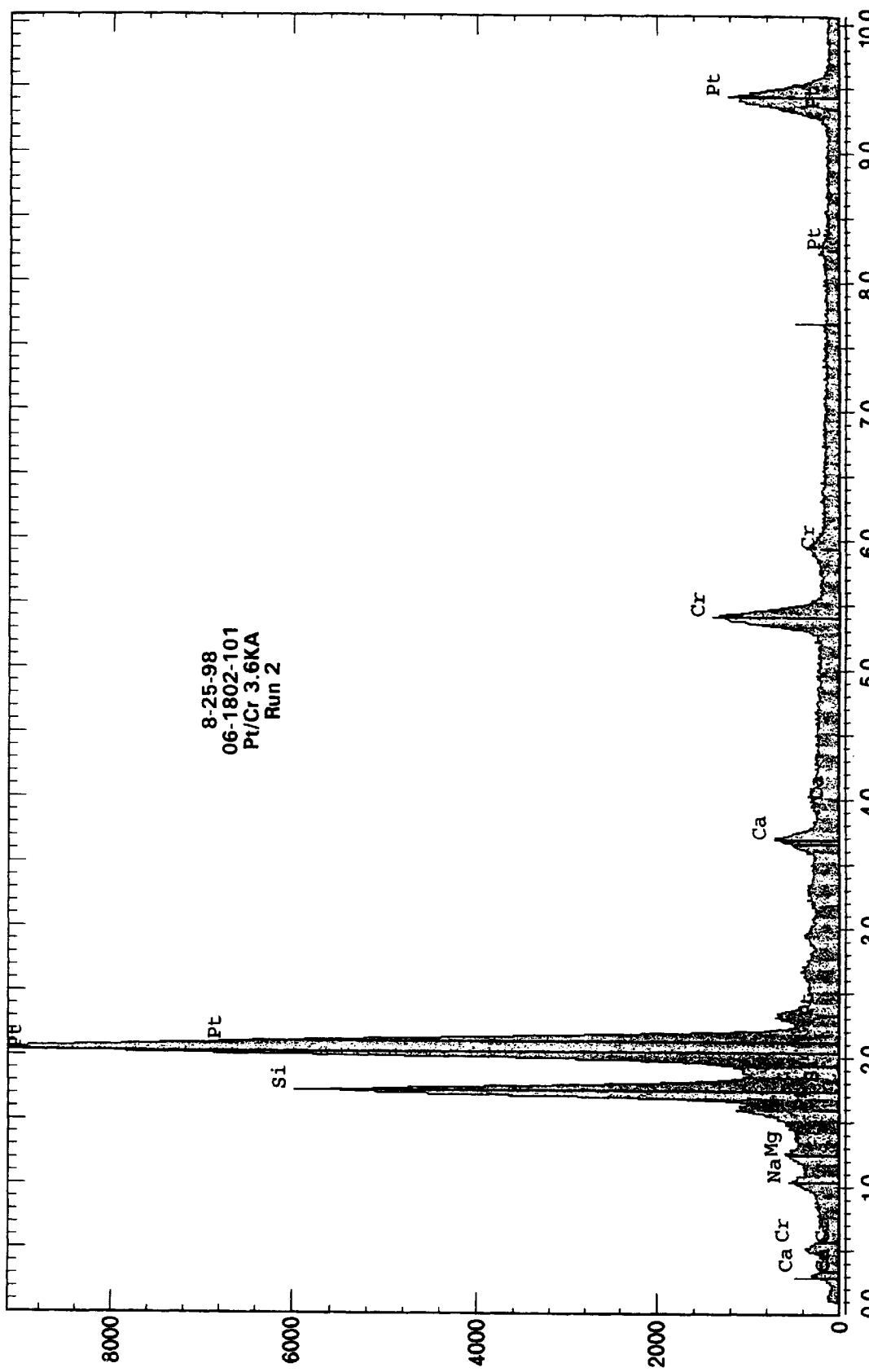
FIG. 43 is EDAX analysis for a sample according to the invention prepared by sputtering (Example 10).

The PtCr electrocatalysts prepared by dual target sputtering were analyzed to determine composition and structure of the deposition. FIG. 43 shows an EDAX spectrum of the 0.3 mg/cm$^2$ loading PtCr deposition for the desired (targeted) 25% Cr (atomic percent). The scans showed that mainly these two elements (Pt and Cr) were present (within the resolution of the spectrometer) and that the elements were present at an atomic ratio of Pt/Cr=74%/26%.

XRD Analysis

Figure 44:
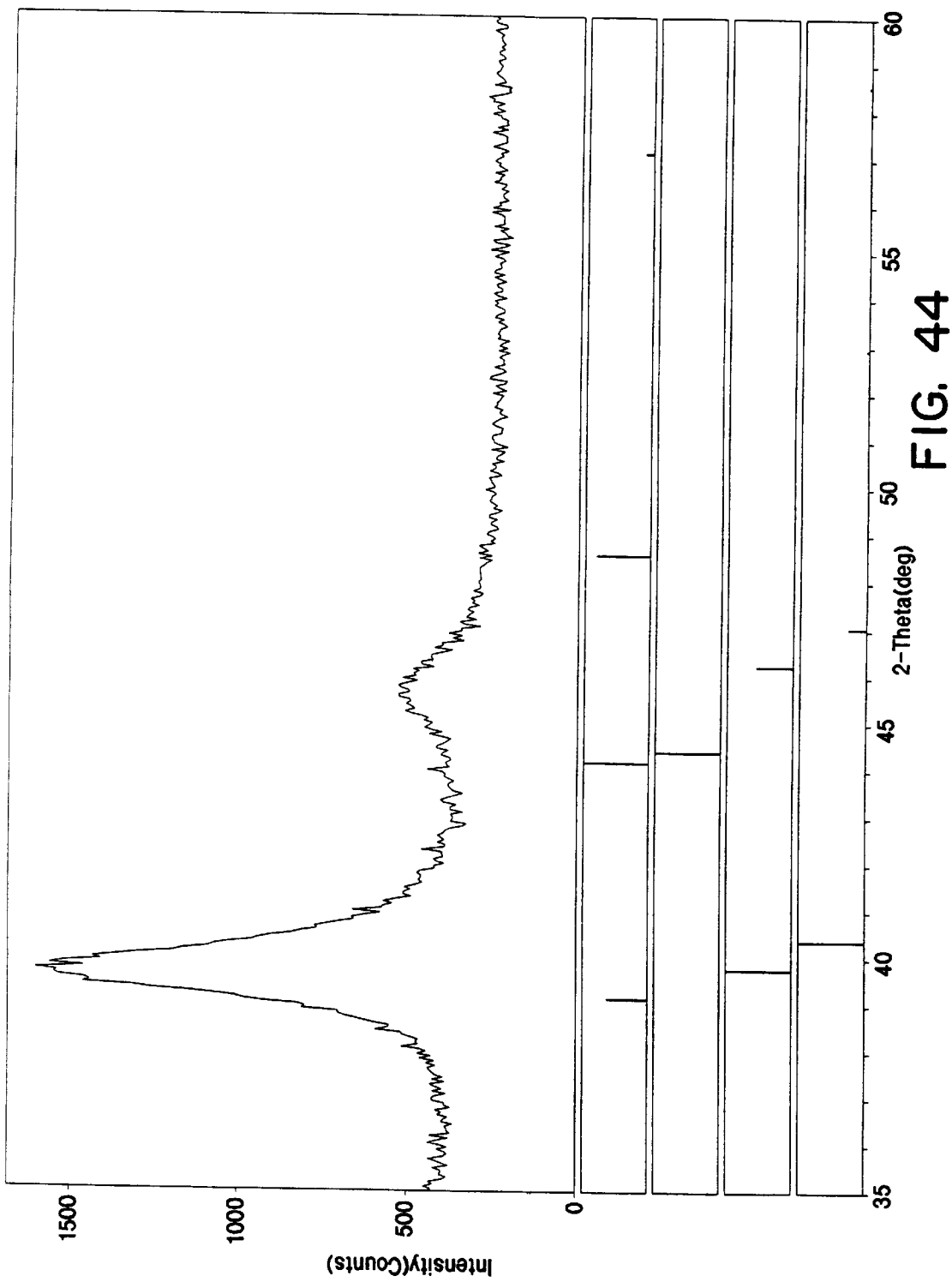
FIG. 44 is XRD analysis for a sample according to the invention prepared by sputtering (Example 10).

FIG. 44 shows the XRD spectrum of the sputtered sample. Matching analysis with diffraction pattern databases were consistent with the presence of a Pt$_3$Cr phase in addition to an unalloyed Pt phase.

Example 11
Electrode Element Preparation

Electrode elements such as ELAT gas diffusion media and 6 mil skived PTFE sheets were placed into a vacuum chamber (1.5 m diameter, 2 m long) which was pumped down to ca. <10$^{-4}$ torr using a diffusion pump. The 6"×6" gas diffusion media substrates were mounted in a 4 point-holder carrousel. Each of the mountings and the carousel rotated. DC magnetron sputtering was used. In this example, a bimetallic PtMo deposited zone was prepared using dual target sputtering.

The unit consists of a 6" diameter magnetron, which is loaded with two catalyst-material targets. The specifications of the targets were: Pt foil (50 mm×50 mm 0.127 mm thickness, 99.9% pure, from Alfa) and Mo foil (150 mm×300 mm, 0.1 mm thickness 99.95% pure). Calibration runs were carried out in which the relative amount of target material was varied.

Electrodes with 25 atomic percent Mo at a nominal loading of ca. 0.3 mg PtMo/cm$^2$ were prepared. Typical conditions were base pressure=8×10$^{-4}$ torr and deposition rate=1–10 A/sec. Glass witness slides were used. The Pt and Mo were then sputtered on the active side of the ELAT substrate as well as onto one side of the skived PTFE material. Double rotation of the substrates was used while vacuum catalyzation took place. The electrocatalyst zone was then deposited at a rate averaging 6 Å/sec as measured with a vibrating crystal microbalance to the specified target loading, with a magnetron power ranging of 250–500 W, 490–570 V dc bias, and 450–900 mA Ar$^+$ flux.

Electrode Element Characterization
EDAX Analysis

Figure 45:
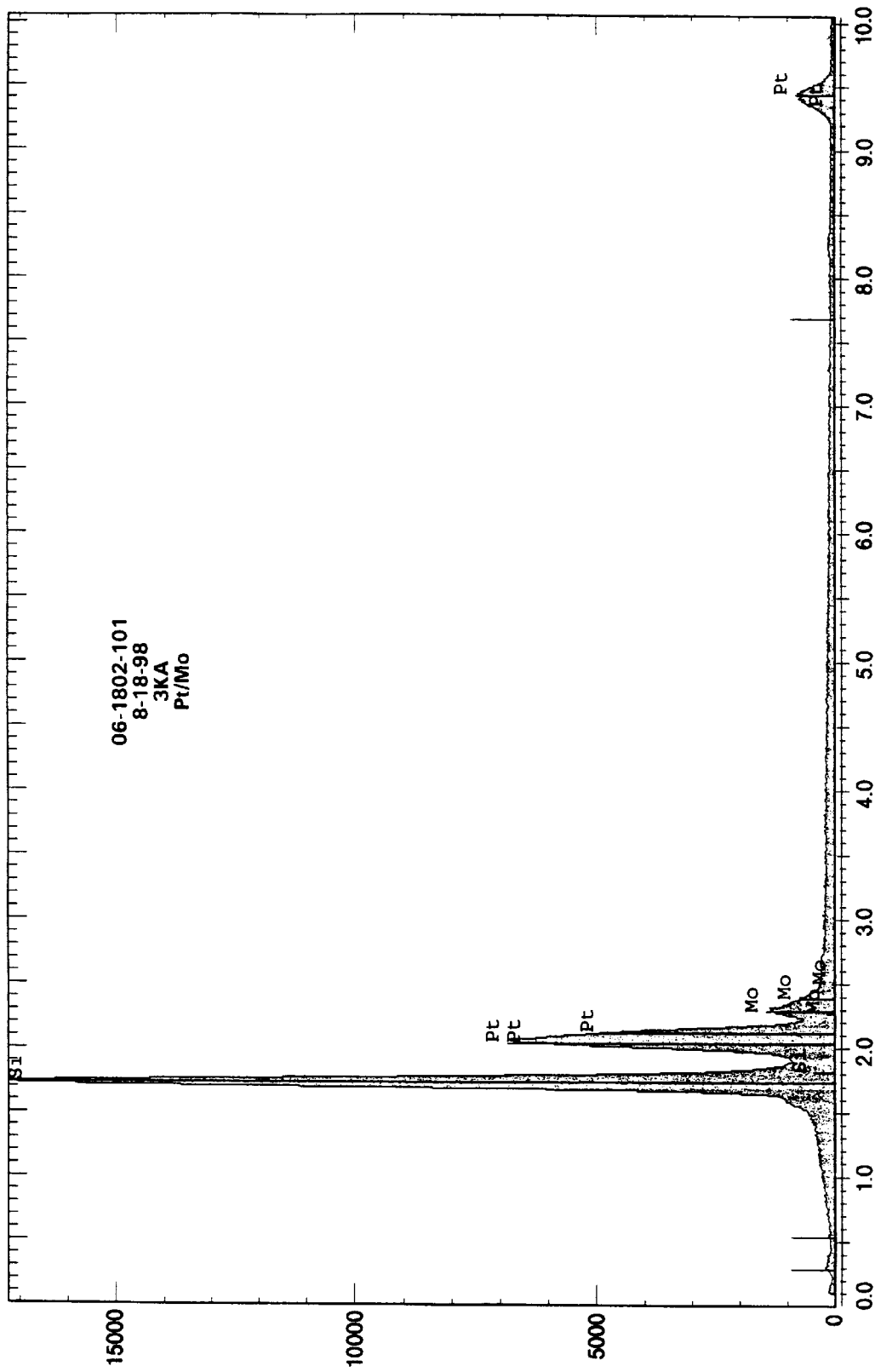
FIG. 45 is EDAX analysis for a sample according to the invention prepared by sputtering (Example 11).

The PtMo electrocatalysts prepared by dual target sputtering were analyzed to determine composition and structure. FIG. 45 shows an EDAX spectrum of the 0.3 mg/cm$^2$ loading PtMo deposition for the desired (targeted) 25% Mo (atomic percent). The scans show that these two elements (Pt and Mo) were the main elements present within the resolution of the spectrometer and that the elements were present at the ratio of Pt/Mo=74%/26%.

XRD Analysis

Figure 46:
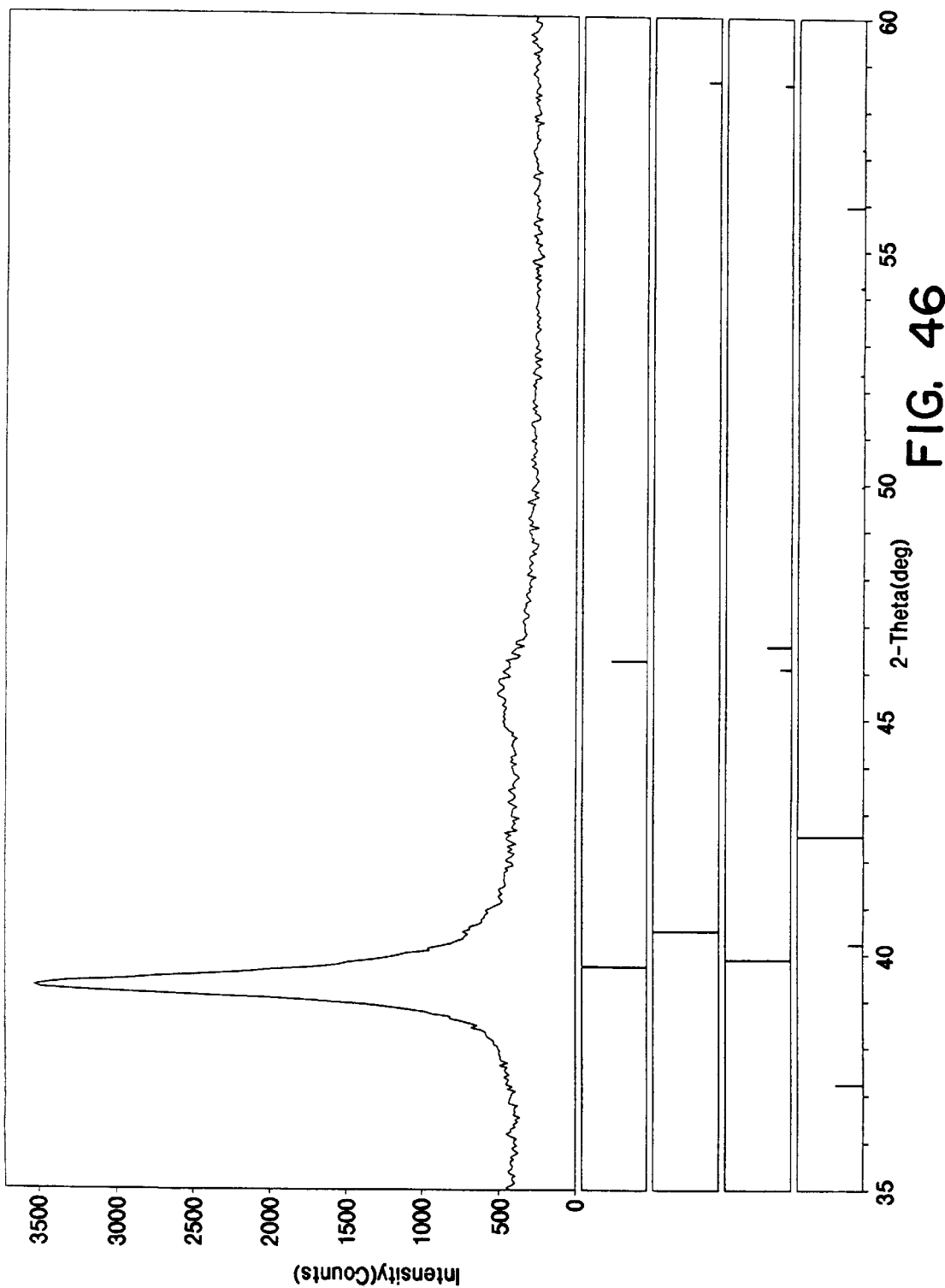
FIG. 46 is XRD analysis for a sample according to the invention prepared by sputtering (Example 11).

FIG. 46 shows the XRD spectrum of the sputtered sample. Matching analysis with diffraction pattern databases were consistent with the presence of a Pt$_3$Mo phase in addition to an unalloyed Pt phase.

Examples 12–14 illustrate bimetallic systems wherein sequential EB-PVD was used to deposit the zone. General methods are first described before the specific examples are described.

General Methods

Electrode elements such as ELAT gas diffusion media and 6 mil skived PTFE sheets were placed in a vacuum chamber. (1.5 m diameter, 2 m long) which was pumped down to ca. <10-4 torr using a diffusion pump. The 6"×6" gas diffusion media substrates were mounted in a 4 point-holder carrousel. Each of the mountings and the carousel rotated, thus helping to assure substantial uniformity during coating. As means to vaporize the catalyst, electron beam-physical vapor deposition (EB-PVD) was used.

The evaporator consisted of two 2"×2" crucibles, each one loaded either with Pt or Ru coins (99.95% purity). The metal source into each crucible was first remelted and then evaporated one source at a time, using a single electron beam source. A switching mechanism allows for placement of the selected crucible (Pt or Ru) under the electron beam, thus allowing for evaporation of different metals using one single electron beam source. This selected crucible loaded with the metal source of choice was then re-melted and evaporated. The alternate switching of each crucible using the same electron beam was then used to evaporate sequentially two different catalyst metals. Typical coating conditions were base pressure=5×10−5 torr and deposition rate=1–0.1 Å/sec. Bimetallic electrocatalyst of the type PtRu were prepared using sequential EB-PVD of two (Pt and Ru) metal evaporation sources. Calibration runs were carried out so that the desired ratio of the elements in the deposited zone could be achieved.

Electrodes with a targeted 50% atomic percent PtRu (ie., one atom of Pt per atom of Ru) and nominal loadings of 0.3 and 0.1 mg PtRu/cm$^2$ were prepared using sequential EB-PVD. During different runs, the individual layer thickness were varied and, in some runs, the Ion Beam Assisted Deposition (IBAD) technique was also carried out to further induce mixing between layers. For all the runs, typical conditions were base pressure=8×10−4 torr, and deposition rate=1–10 Å/sec. Glass witness slides were used for all runs. The Pt and Ru metals were evaporated and deposited on the "active" side of the ELAT substrate as well as onto one side of the skived PTFE material. Double rotation of the substrates while vacuum catalyzation took place helped assure uniformity in the coating.

Example 12

Figure 47:
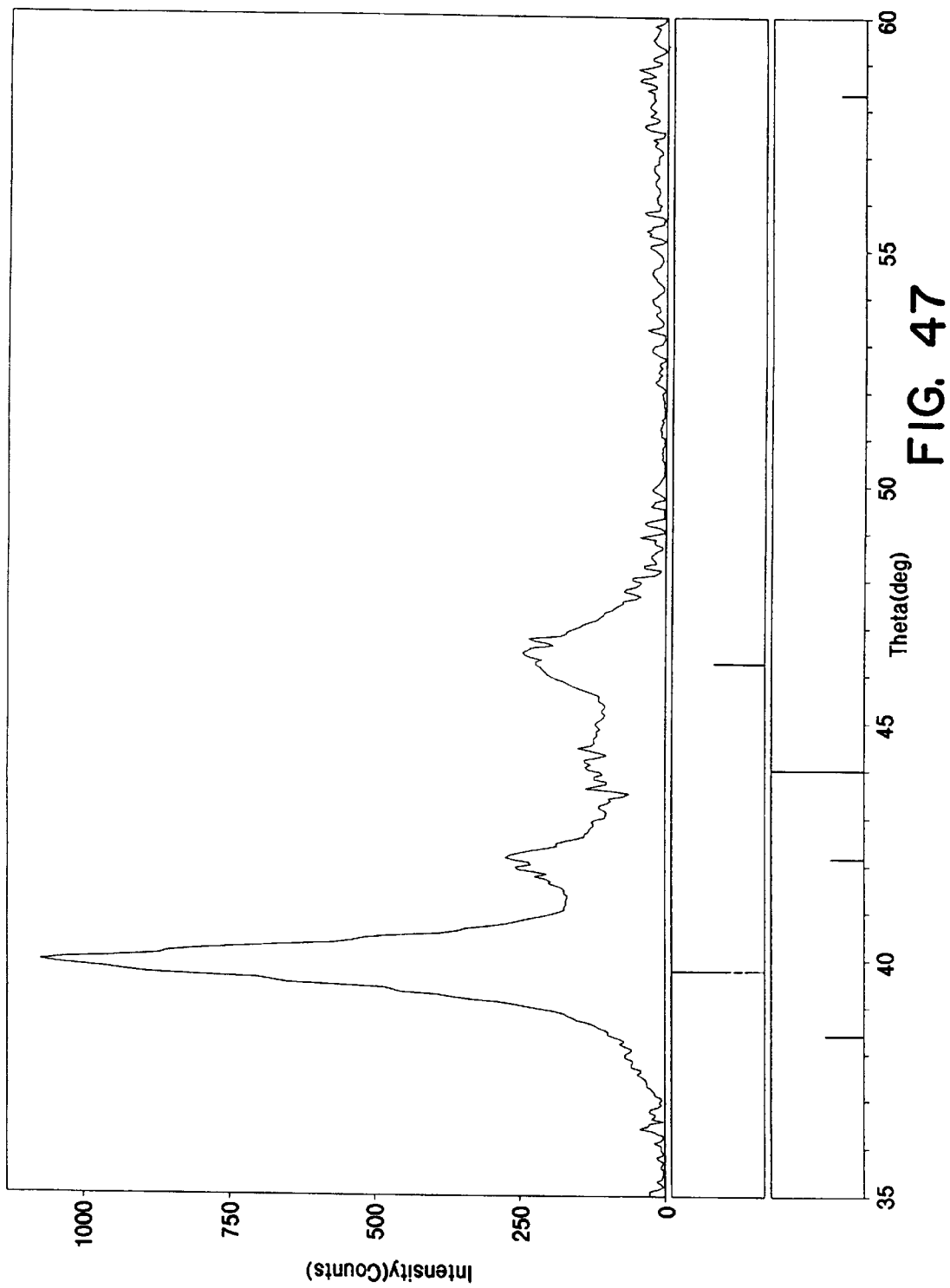
FIG. 47 is XRD analysis for a sample according to the invention prepared by sequential EB-PVD (Example 12).
Figure 48:
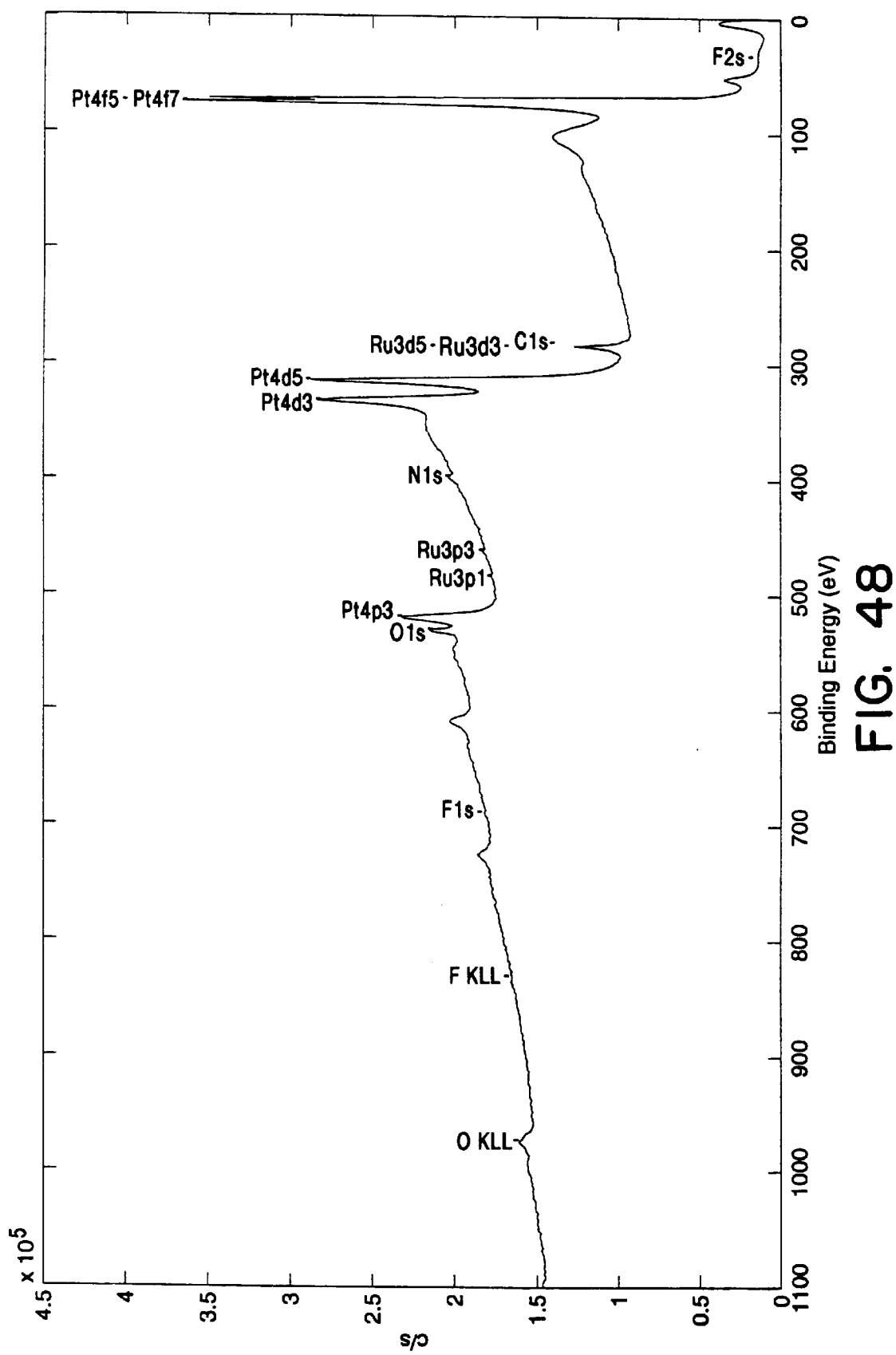
FIG. 48 is wide-scan XPS analysis for a sample according to the invention prepared by sequential EB-PVD (Example 12).

ELAT gas diffusion media and skived PTFE electrode elements were subjected to sequential PtRu EB-PVD. The desired final loading of the electrode was 0.3 mg PtRu/cm$^2$, therefore forming a total electrode effective thickness of 1500 Å (ca. 750 Å total Pt equivalent effective thickness and 750 Å total Ru equivalent effective thickness). In this present embodiment, sequential (Pt—Ru—Pt—Ru etc.) evaporated layers of 250 Å each (equivalent loading per layer 0.05 mg metal/cm$^2$) were deposited to form the electrocatalyst layer. Each layer was deposited at a rate of 1 Å/sec as measured with a vibrating crystal microbalance.
Electrode Element Characterization
XRD Analysis FIG. 47 is the XRD spectrum of the sequentially evaporated sample. Matching analysis with diffraction patent databases were consistent with the presence of unalloyed Pt and Ru phases.
XPS Analysis Samples of the 0.3 mg PtRu/cm$^2$ (50% a/a Pt/Ru nominal target ratio) sequential (250 Å/layer) ELAT gas diffusion media catalyzed electrode were analyzed using XPS. As before, three spots per sample were measured to verify uniformity and composition of the coating. FIG. 48 shows XPS wide-scan spectra for the 250 Å sequentially evaporated electrode. The wide scan confirmed that the main components of the electrocatalyst layer were Pt and Ru, with the presence of minor amounts of N and F. Carbon was also present, and it can be noted that the gas diffusion media support contained carbon. The surface Pt—Ru atomic ratio on the evaporated electrocatalyst layer could be measured by examining the ratio of the areas of the Pt 4f and Ru 3p3 transitions, which (averaged for the three sampling spots) were Pt/Ru approximately equals to Pt4f(area)/Ru3p3 (area)=40.23/0.893 (i.e., 45). The magnitude of this ratio versus the expected value for a perfectly mixed 50% a/a layer (ca. ratio of 1), taking also in consideration that XPS is a surface-sensitive technique, suggested that the sequential evaporated layers (ca. 250 Å/layer) were not well mixed between layers. The XPS-measured ratio, Pt/Ru=45/1, then reflects the surface composition of the last evaporated layer (i.e., Pt). This Pt layer is therefore not well mixed with the Ru evaporated layer immediately underneath.

Analysis of the binding energy (BE) position of Pt and Ru elements was done using high-resolution scans. It was found that the Pt $4f_{7/2}$ transition for the PtRu sequentially EB-PVD phase, presented a binding energy of BE=71.7 eV, while the BE for elemental Pt found in literature is ca. 71.0–71.1 eV, thus presenting a chemical shift of ca. 0.6 eV. This shift in the Pt binding energy is consistent with alloying between Pt and Ru elements.

The XRD (bulk) and XPS (surface sensitive) data are consistent with the electrocatalyst layer comprising bulk unalloyed Pt and Ru phases with a surface Pt/Ru alloyed phase.

The same analysis performed for the Ru $3d_{5/2}$ transition revealed a binding energy of BE=280.8 eV, thus presenting an observable shift from the expected literature value for metallic ruthenium (ca. 279.9–280.0 eV). This result indicates that the electronic state of the surface Ru is not consistent with metallic Ru (ie. Ru$^0$), but more like with RuO$_2$. Both Pt and Ru transitions were referenced to the carbon (reference) transition (C1s) at BE=285.00 eV.

Figure 49:
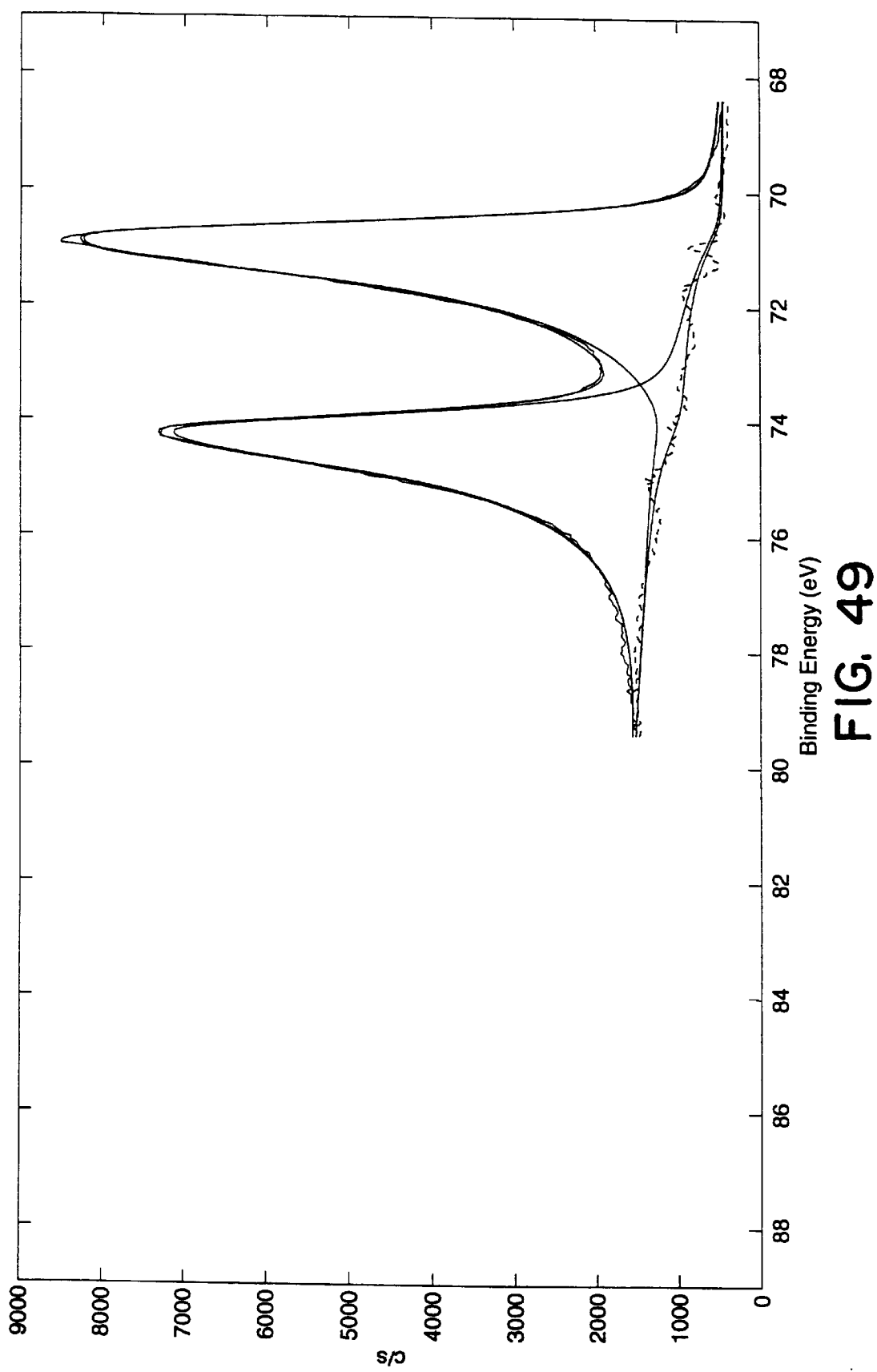
FIG. 49 is XPS analysis (platinum region) for a sample according to the invention prepared by sequential EB-PVD (Example 12).
Figure 50:
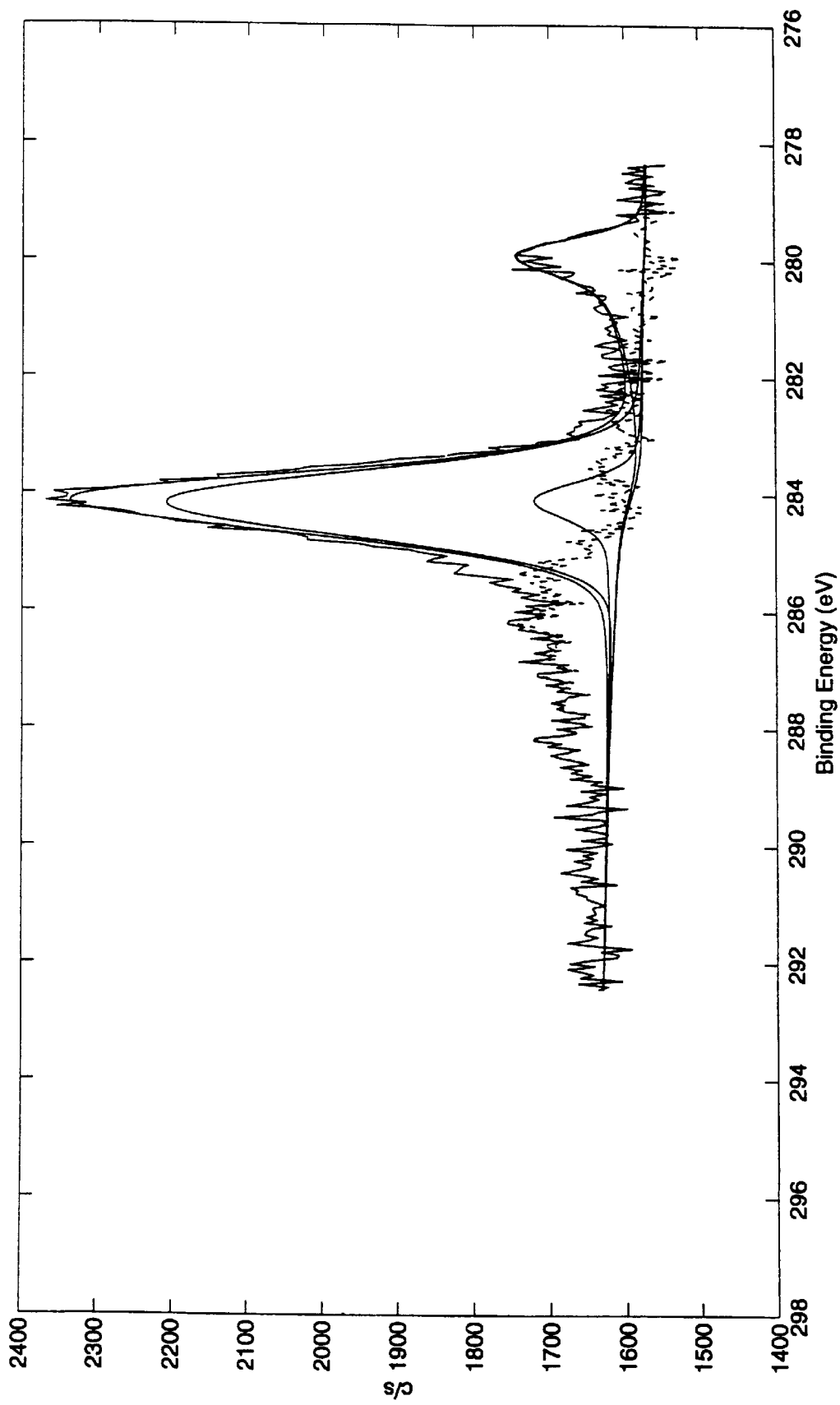
FIG. 50 is XPS analysis (ruthenium region) for a sample according to the invention prepared by sequential EB-PVD (Example 12).

FIG. 49 shows the XPS spectrum for the Pt region (Pt 4f transition) and its deconvoluted spectrum for the sequentially deposited EB-PVD electrode. FIG. 50 shows the spectrum for the Ru region (Ru 3d transition)

Example 13

Figure 51:
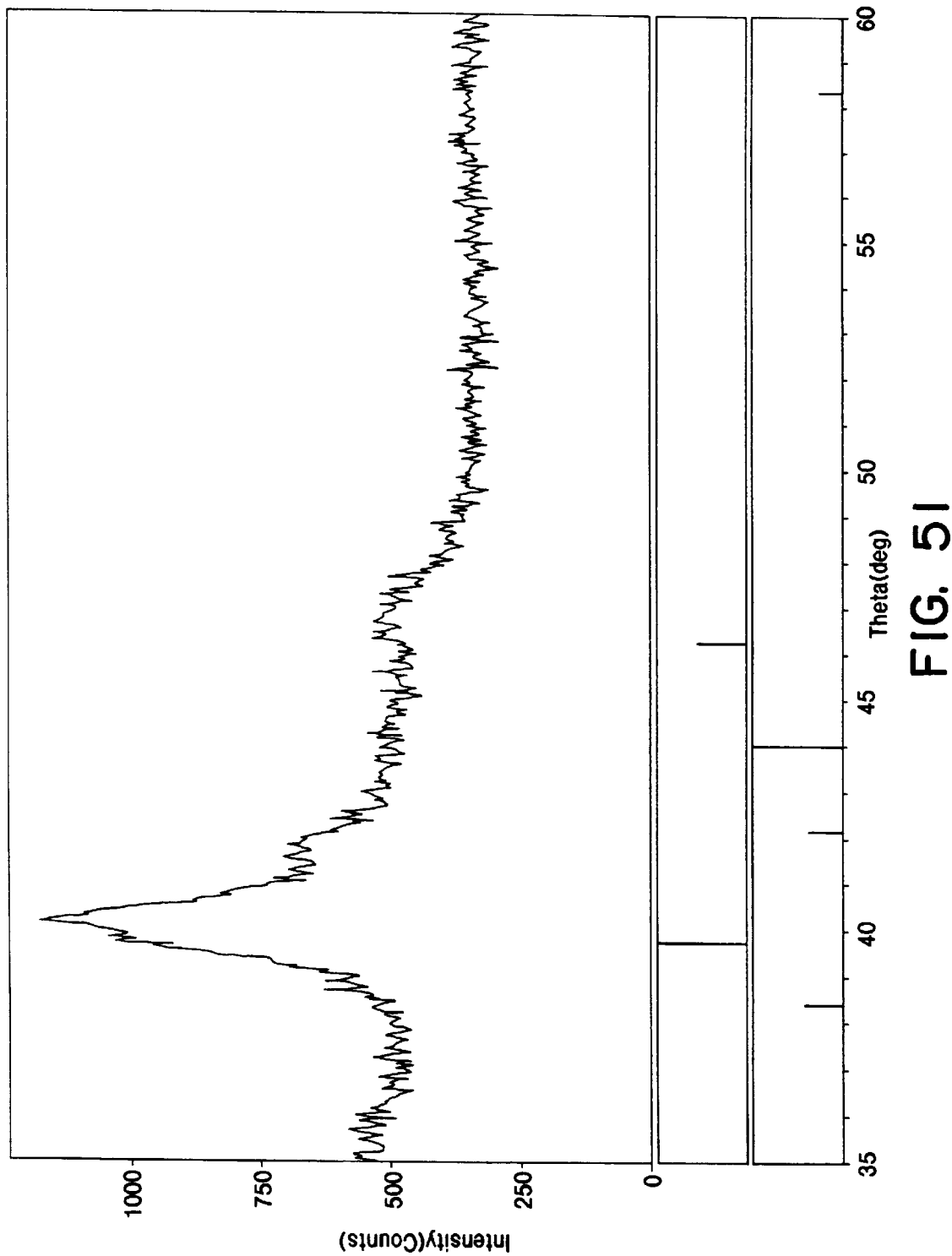
FIG. 51 is XRD analysis for a sample according to the invention prepared by sequential EB-PVD (Example 13).
Figure 52:
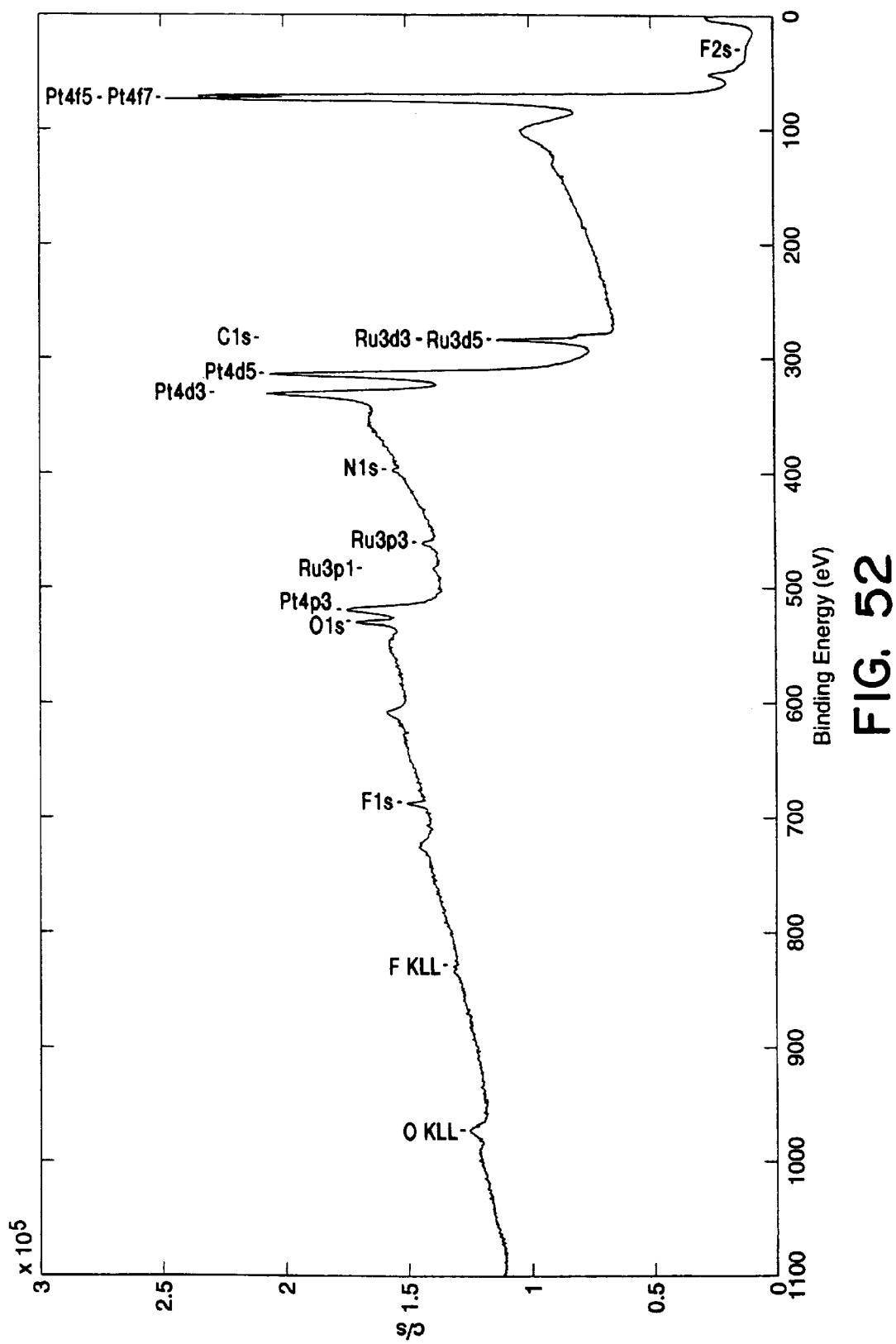
FIG. 52 is wide scan XPS analysis for a sample according to the invention prepared by sequential EB-PVD (Example 13).
Figure 53:
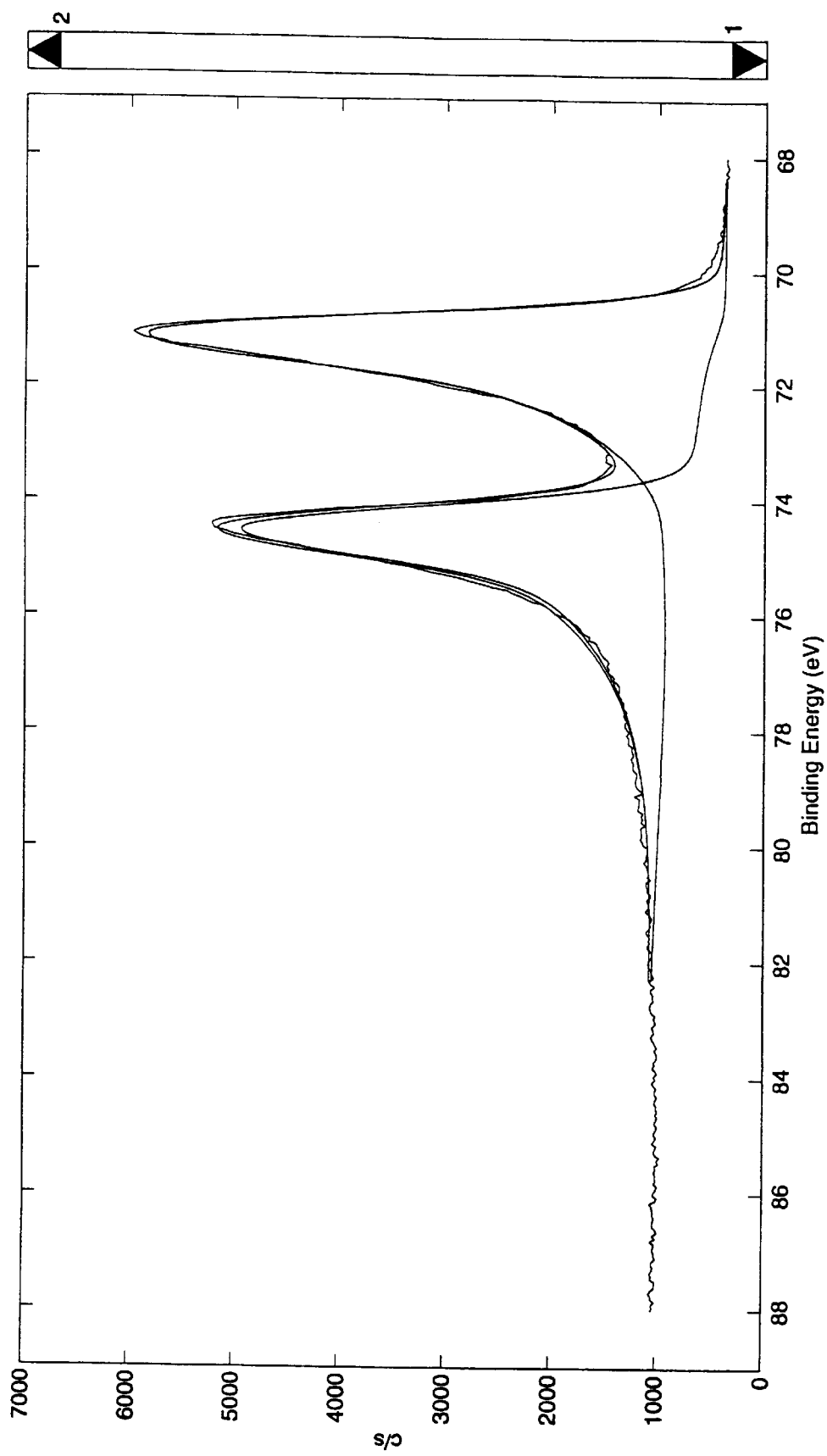
FIG. 53 is XPS analysis (platinum region) for a sample according to the invention prepared by sequential EB-PVD (Example 13).
Figure 54:
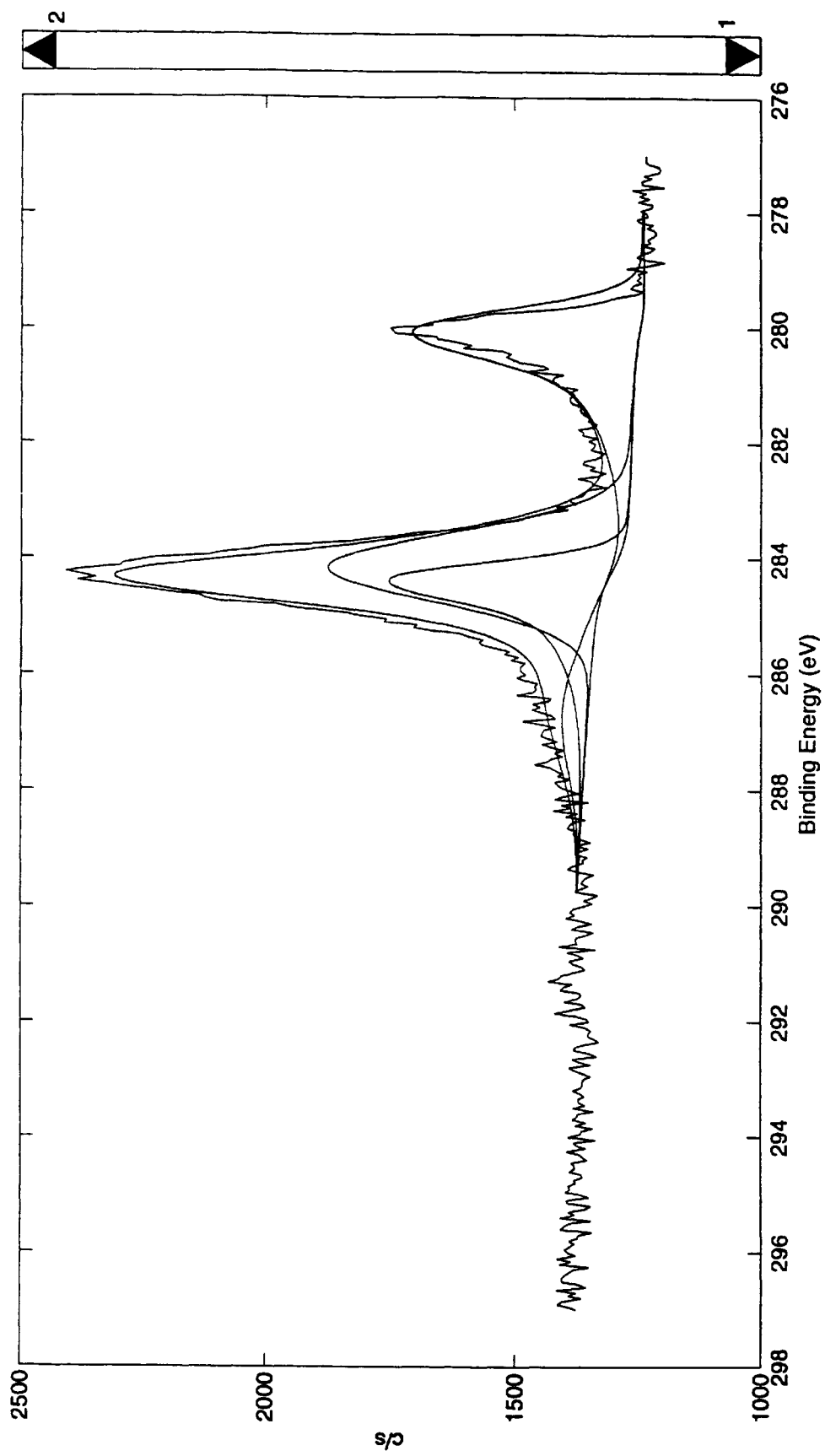
FIG. 54 is XPS analysis (ruthenium region) for a sample according to the invention prepared by sequential EB-PVD (Example 13).

ELAT gas diffusion media and skived PTFE electrode elements were prepared by sequential PtRu EB-PVD. The desired final loading of the electrode was 0.1 mg PtRu/cm2 (50% a/a), therefore forming a total electrode effective thickness of 500 Å (ca. 250 Å total Pt equivalent effective thickness and 250 Å total Ru equivalent effective thickness). In this present embodiment, sequential (Pt—Ru—Pt—Ru etc.) "thinner" evaporated layers (10 layers total, 5 layers of 50 Å each metal at an equivalent loading per layer of 0.01 mg metal/cm$^2$) were deposited to form the electrocatalyst layer. Each layer was deposited at a rate of 1 Å/sec as measured with a vibrating crystal microbalance. Although this strategy was more time consuming, it allowed for the deposition of thinner catalyst layers, thus producing a more homogeneous electrocatalyst layer and favoring mixing between the sequentially evaporated phases.
Electrode Element Characterization
XRD Analysis FIG. 51 shows the XRD spectrum of the sequentially evaporated sample (at 50 Å/layer). Inspection of the spectrum indicates a more complex structure than the one obtained by physical vapor deposition of 250 Å metal layers (Example 12). It can be seen that the phase related to unalloyed Ru is now less pronounced and the Pt fcc (face cube centered) diffraction appears shifted, thus suggesting alloying. In addition, a shoulder diffraction that corresponds to a Pt (unalloyed) phase is also visible. The XRD analysis (which is a bulk characterization technique) then is consistent with the presence of an alloyed PtRu phase in conjunction with unalloyed Pt and Ru phases.
XPS Analysis Samples of the 0.1 mg PtRu/cm$^2$ (50% a/a Pt/Ru nominal target ratio) sequential PtRu EB-PVD (50 Å/layer) ELAT gas diffusion media catalyzed electrode were analyzed using XPS. Two spots per sample were analyzed. Survey scans were run to determine the surface composition of the deposition. FIG. 52 shows the survey scan for the 50 Å sequentially evaporated electrode. XPS (ESCA) scans confirm that the main components of the electrocatalyst layer were Pt and Ru, with additional presence of N, O, and F. Carbon is again also found to be present. As before, the surface Pt—Ru atomic ratio on the evaporated electrocatalyst layer could be measured by examining the ratio of the areas of the Pt 4f and Ru 3p3 transitions, which (averaged for the two sampling spots) are Pt/Ru=Pt4f(area)/Ru3p3(area)=29.6±1.8/2.7±0.3, i.e., ratio of 11.0±1.8. The magnitude of this ratio, compared to the one obtained by physical vapor deposition of relatively thicker 250 Å layers (measured Pt/Ru ratio of ca. 45; Example 12) then indicates that the sequential evaporation of thinner layers is more effective in forming a more homogeneous electrode and allowing interlayer mixing. Analysis of the binding energy (BE) position of Pt and Ru elements was done using high-resolution scans. A piece of sputter-cleaned Pt foil was also analyzed to provide a reference spectrum for Pt. FIG. 53 showed the XPS spectrum for the Pt region (Pt 4f transition) and its deconvoluted spectrum for this sequentially deposited EB-PVD electrode. FIG. 54 shows the spectrum for the Ru region (Ru 3d transition) for the same system.

It was found that the Pt $4f_{7/2}$ transition for this sequentially EB-PVD electrocatalyst structure presented a binding energy of BE=72.0±0.1 eV (value obtained as average of two measurements, referenced to C(1s) binding energy of 285.0 eV). The measured equivalent BE for the sputtered Pt foil (reference material) was 71.0±0.0 eV (referenced to spectrometer Fermi level). This observed shift in the binding energy is consistent with PtRu alloying.

The same analysis was performed for the Ru $3d_{5/2}$ transition which revealed a binding energy of BE=281.0±0.1 eV. This result was consistent with the presence of $RuO_2$.

Polarization Performance
MEA Preparation

The 0.1 mg Pt Ru/$cm^2$ EB-PVD catalyzed ELAT gas diffusion media electrode was first pretreated with a solution of 4.5% (w/w) of Flemion (950 EW) proton conducting polymer in isopropanol. The solution was brushed on the catalyzed side of the gas diffusion electrode and dried out at ca. 80° C. using a heat gun until solvent was evaporated. The pretreated electrode was then hot pressed to a GORE-SELECT® proton conducting membrane (25 microns, 950 EW) as the anode half cell. As cathode, a standard reference electrode (0.3 mg Pt/$cm^2$ loading) was used (PRIMEA 5510 available from W. L. Gore & Associates).

MEA Testing

The MEA, with an electrode active area of 25 $cm^2$ was mounted in a standard Fuel Cell Technologies fuel cell fixture using ELAT as diffusor in the cathode (reference) side. The fixture was then clamped down to ca. 200 lb in/bolt torque using standard gasket material and then connected to a GLOBETECH fuel cell test plant using a Scribner and Assoc. electronic load for conditioning and testing.

Hydrogen/air characterization was done first at 60° C. cell temperature, with anode and cathode saturated at 60/60° C. via sparger bottles at atmospheric pressure. The second evaluation condition was at 80° C. cell temperature, with anode and cathode saturated at 85/75° C., respectively, at a cell backpressure of 30/30 psig for anode and cathode respectively. In both cases, stoichiometric-based flow of 1.2/3.5 was used. Polarization performance was obtained at steady state after proper conditioning of the MEA and after at least one day on stream. Conditioning of the MEA was achieved by cycling the cell potential between 0.6 V and ca. 0.4 V and OCV. The polarization curve was obtained by varying the cell potential in 50 mV steps and recording the steady state current density at load based flow (i.e., reactant flow rate proportional to total cell amperage).

Figure 55:
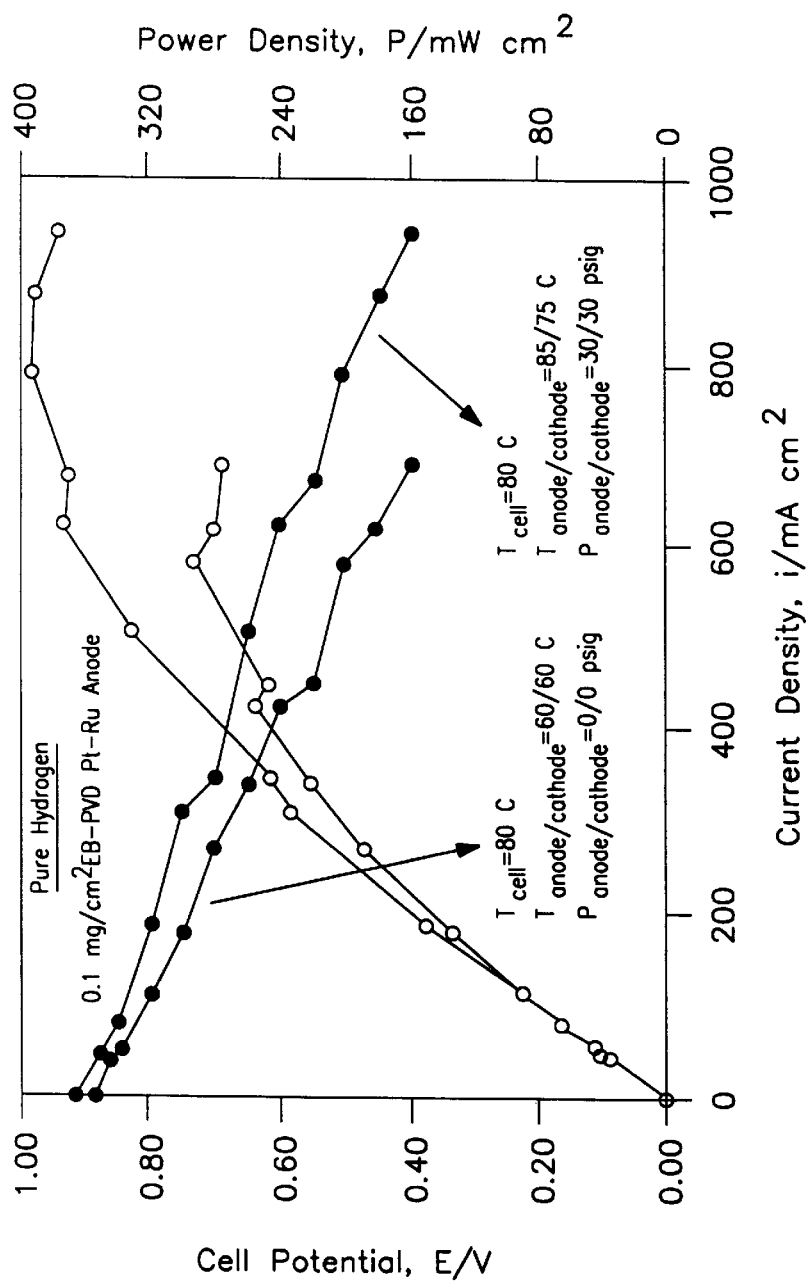
FIGS. 55 and 56 show polarization performances for membrane electrode assemblies with bimetallic deposited layer according to the invention (Example 13).
Figure 56:
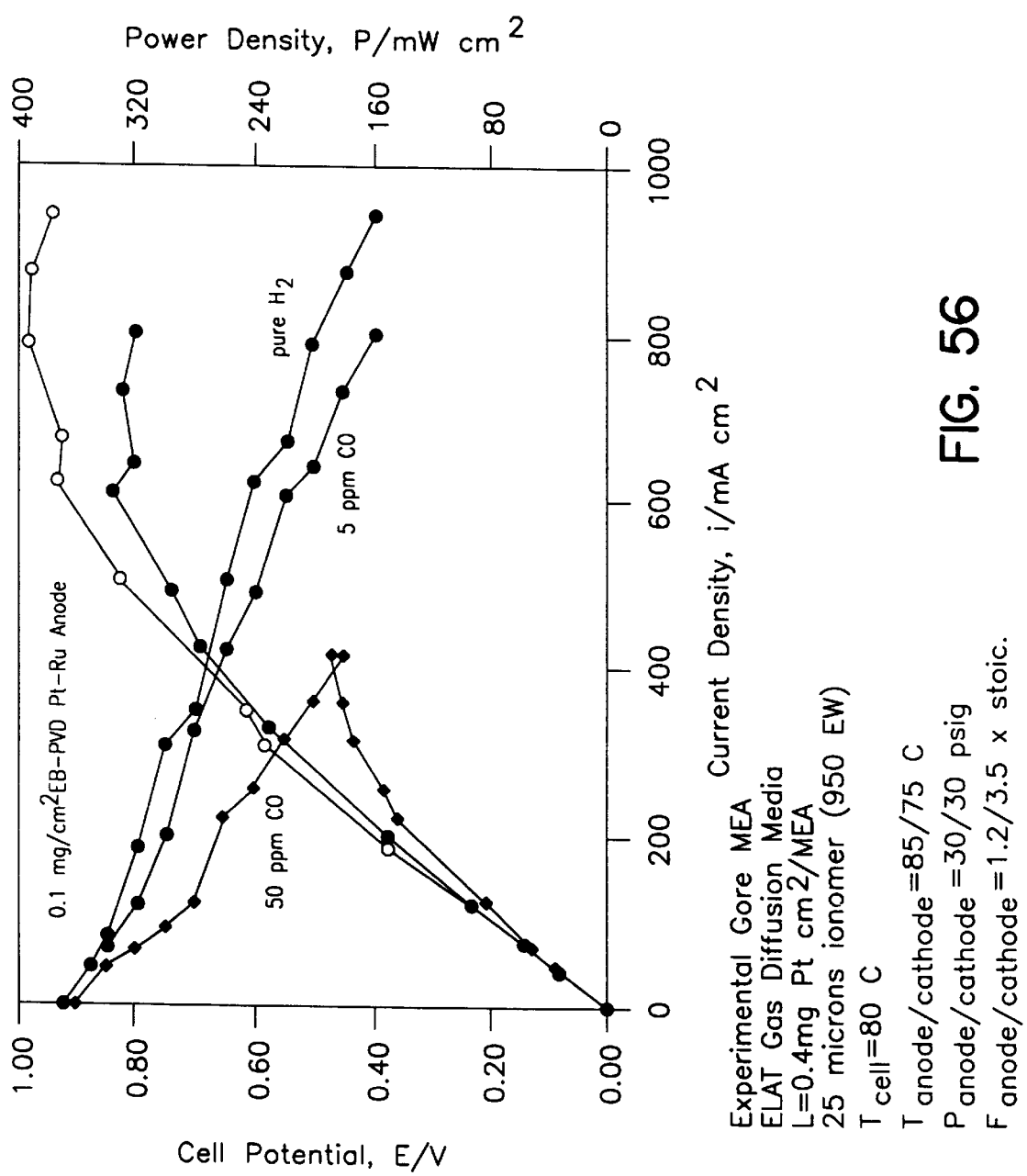

Reformate characterization was done at the higher temperature/pressure testing condition using two types of $CO/H_2$ mixtures: 5 and 50 ppm. The testing strategy involved first the characterization of the MEA in $H_2$/air feeds upon achieving steady state power output. Then the 5 ppm CO fuel was injected, and the MEA was allowed to stabilize overnight (at least 10 hours) at 0.6 V with this anode feed. Then, after a steady state saturation of the anode with the poisoned feed was achieved, the polarization curve was taken. Afterwards, the 50 ppm $CO/H_2$ fuel was injected, and the MEA was again allowed to stabilize overnight at 0.6 V, with a steady-state polarization curve taken after that period of time. FIGS. 55 and 56 show polarization performance for this sequential Pt Ru EB-PVD catalyzed anode, for pure $H_2$ and for reformate feeds, respectively. Table 2 summarizes the performance, expressed as current density at 0.6 V in $H_2$ and $H_2$/CO mixtures (5 and 50 ppm CO concentration). Performance of a Pt sputtered anode (0.1 mg/$cm^2$) is included as reference.

The results indicate that the implimentation of a PtRu EB-PVD anode in the presence of 5 ppm $CO/H_2$ anode feed yields 81% improved power output at 0.6 V, and at 50 ppm level the improvement is ca. 152%, all compared to the sputtered Pt (reference) electrode. When used in $H_2$ feeds, this bimetallic anode shows in some respects less desirable performance compared to a pure Pt system.

To further characterize the poison resistance of the anode taking also in consideration the performance in clean ($H_2$ only) reactant feeds, a poison resistance-related lambda parameter was calculated from the data as described above, and the results are given in Table 2.

The data indicate that the PtRu EB-PVD anode decays only 21% at 5 ppm CO, and only 59% at 50 ppm CO, in relation to its performance in pure hydrogen. This decay is considerably smaller than the one measured for the sputtered bimetallic electrocatalyst (49% and 82% for 5 and 50 ppm CO, respectively). As reference, the Pt sputtered anode suffers a 67% drop in performance at 5 ppm CO level and 88% drop at 50 ppm level CO.

Example 14

ELAT gas diffusion media and skived PTFE electrode elements were prepared by sequential Pt Ru EB-PVD with IBAD as means to encourage mixing of the evaporated layers. The desired final loading of the electrode was 0.1 mg PtRu/$cm^2$ (50% a/a), therefore forming a total electrode effective thickness of 500 angstroms (ca. 250 Å total Pt equivalent effective thickness and 250 Å total Ru equivalent effective thickness). In this present embodiment, sequential (Pt—Ru—Pt—Ru etc.) evaporated layers (10 layers total, 5 layers of 50 Å each metal at an equivalent loading per layer of 0.01 mg metal/$cm^2$) were deposited and mixed using an $Ar^+$ beam to form the electrocatalyst layer. Each layer was deposited at a rate of 1 Å/sec as measured with a vibrating crystal microbalance. This strategy allowed for the deposition and atomic-level mixing of thin catalyst layers while using sequential evaporation, thus producing a more homogeneous and uniform (and mixed) electrocatalyst layer.

Electrode Element Characterization
XRD Analysis

Figure 57:
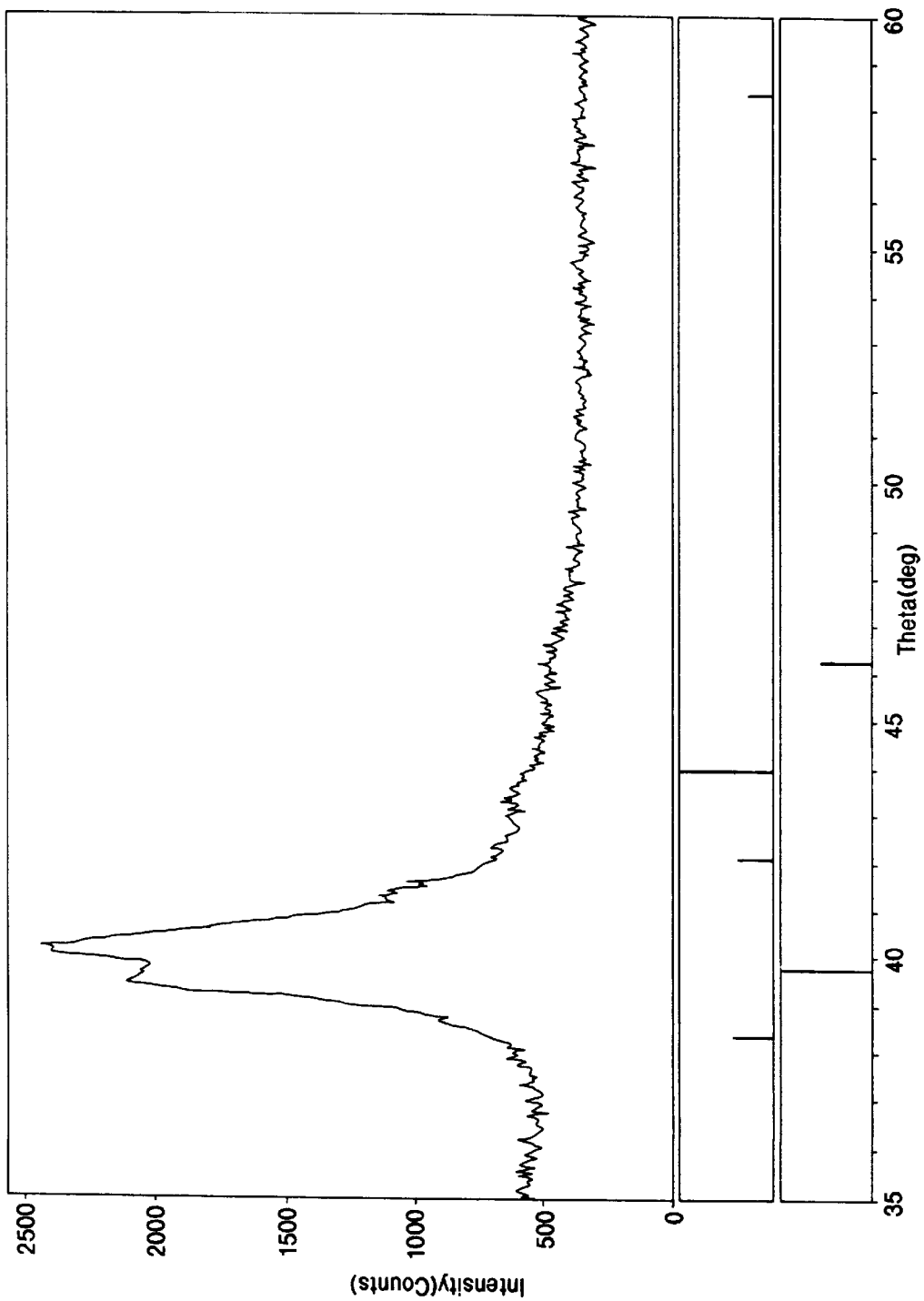
FIG. 57 is XRD analysis for a sample according to the invention prepared by sequential EB-PVD with use of IBAD (Example 14).

FIG. 57 shows the XRD spectrum of the sequentially (50 Å/layer) EB-PVD/IBAD prepared sample. Inspection of the spectrum indicates again a more complex structure than the one obtained by PVD of 250 Å metal layers (Example 12). The spectrum for this system presents similarities with the one obtained by evaporation only (thin layers) (Example 13): the phase related to unalloyed Ru is less pronounced, and the Pt fcc diffraction appears more shifted (more than that for Example 13), which was consistent with alloying. In addition, a shoulder diffraction which corresponds to a Pt (unalloyed) phase was also visible. The XRD analysis of the electrocatalyst phase (which is a bulk characterization technique) then again was consistent with the presence of an alloyed PtRu phase in conjunction with unalloyed Pt and Ru phases.

XPS Analysis

Figure 58:
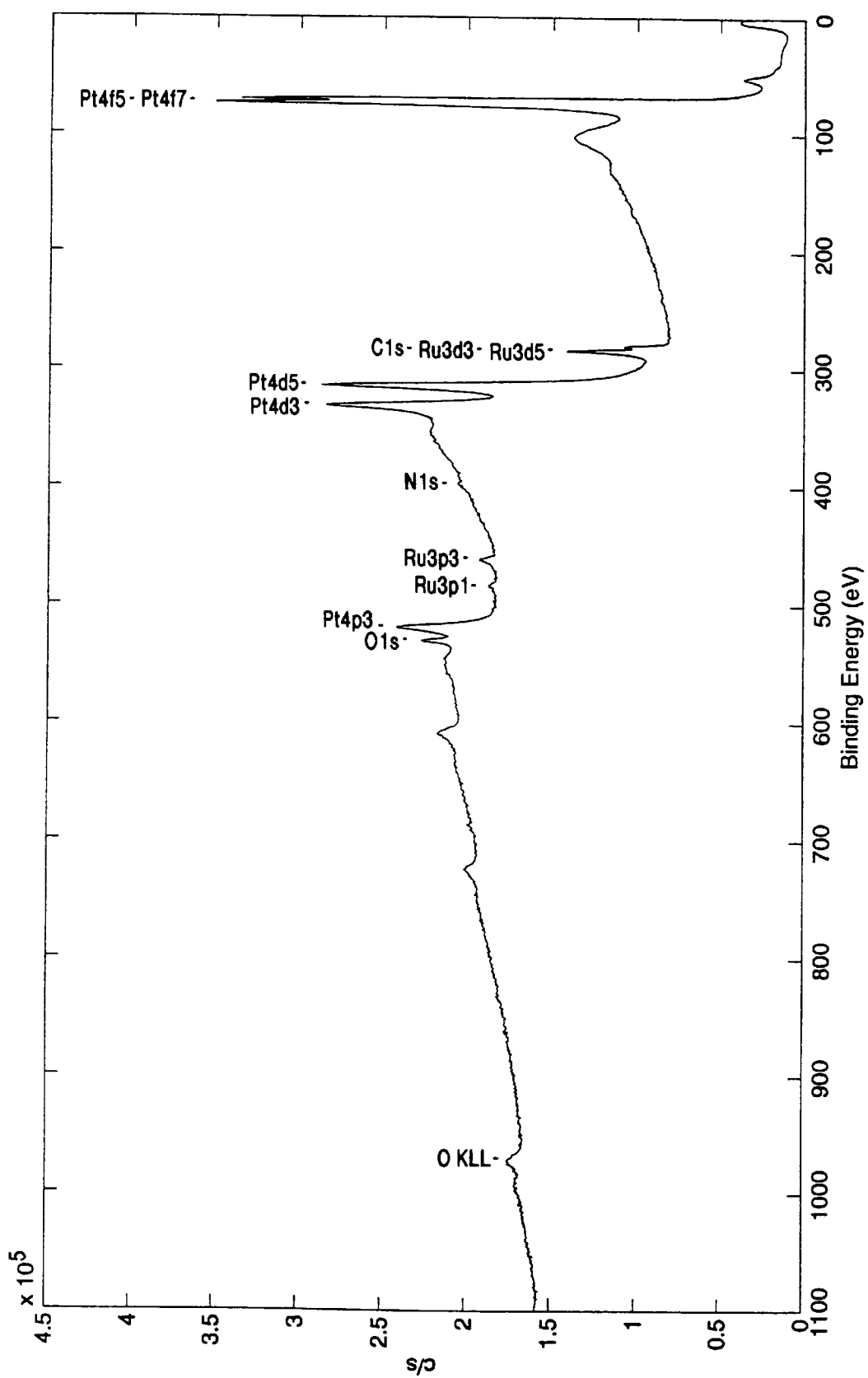
FIG. 58 is wide scan XPS analysis for a sample according to the invention prepared by sequential EB-PVD with use of IBAD (Example 14).

Samples of the 0.1 mg PtRu/cm$^2$ (50% a/a Pt/Ru nominal target ratio) sequential Pt Ru EB-PVD/IBAD (50 Å/layer) ELAT gas diffusion media catalyzed electrode were analyzed using XPS. As before, two spots per sample were analyzed. FIG. 58 shows the survey scan for the 50 Å sequentially evaporated/ion bombarded electrode. The XPS scans confirm that the main components of the electrocatalyst layer were Pt and Ru, with the presence of N, O and C. As before, the surface Pt—Ru atomic ratio on the evaporated electrocatalyst layer could be measured by examining the ratio of the areas of the Pt 4f and Ru 3p3 transitions, which (averaged for the two sampling spots) are Pt/Ru=Pt4f(area)/Ru3p3(area)=34.7±0.4/3.6±0.1, i.e., a ratio of 9.6±0.4. The magnitude of this ratio, compared to the one obtained by PVD alone of "thin" 50 Å layers (measured Pt/Ru ratio of ca. 11) suggested that sequential evaporation of thin layers in conjunction with IBAD allows for improved mixing of the deposited electrocatalyst layer.

High resolution scans were used to provide bonding information. A piece of sputter-cleaned Pt foil was also analyzed to provide a reference spectrum for Pt. It was found that the Pt $4f_{7/2}$ transition for this sequentially EB-PVD/IBAD electrocatalyst structure presented a binding energy of BE=72.0±0.0 eV (value again obtained as average of two measurements, referenced to C(1s) binding energy of 285.0 eV). The measured equivalent BE for the sputtered Pt foil (reference material) was 71.0±0.0 eV (referenced to spectrometer Fermi level). The observed shift in this binding energy then was consistent with PtRu alloying.

The same analysis was performed for the Ru $3d_{5/2}$ transition which showed a binding energy of BE=280.8±0.0 eV. This result was consistent with $RuO_2$.

Figure 59:
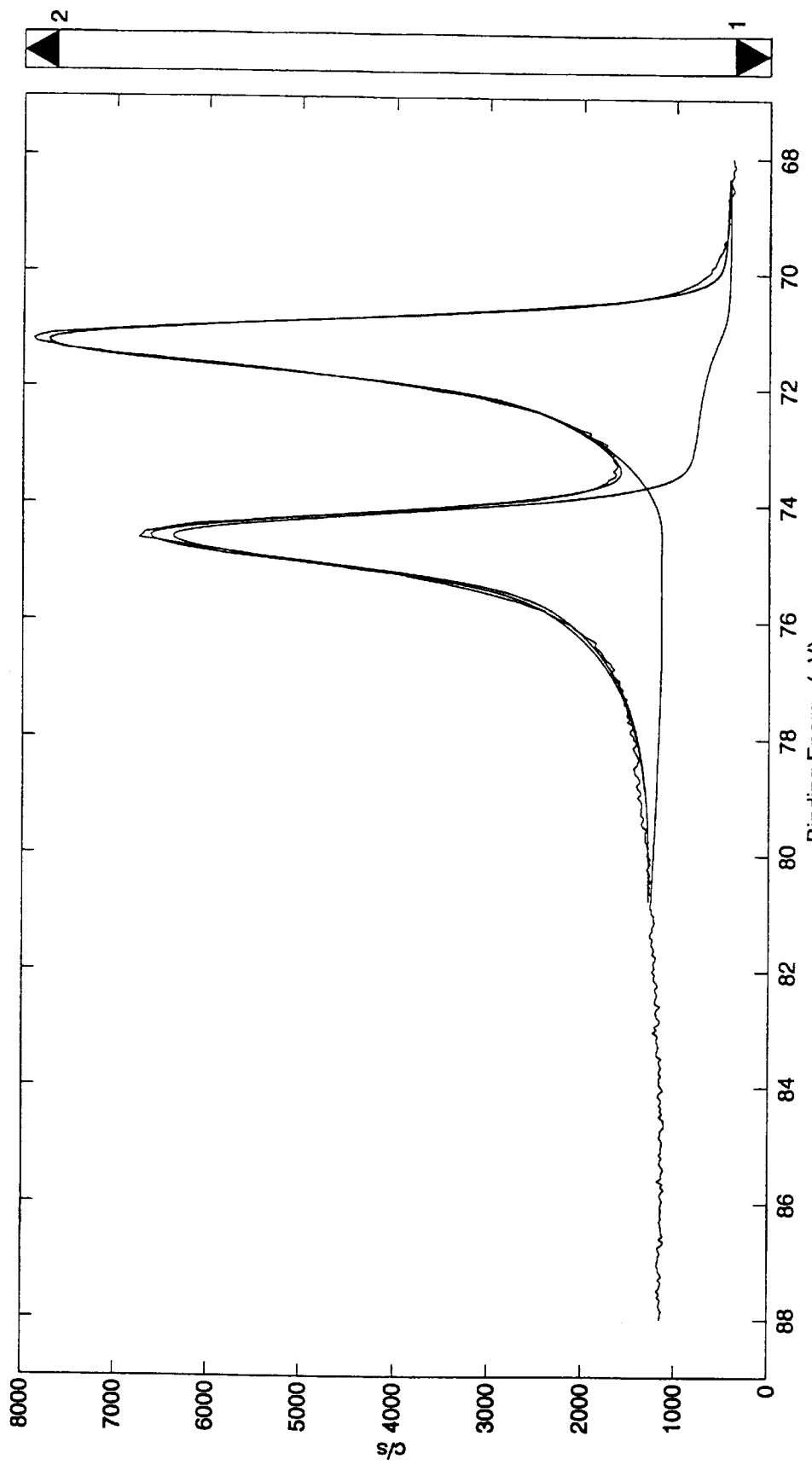
FIG. 59 is XPS analysis (platinum region) for a sample according to the invention prepared by sequential EB-PVD with use of IBAD (Example 14).
Figure 60:
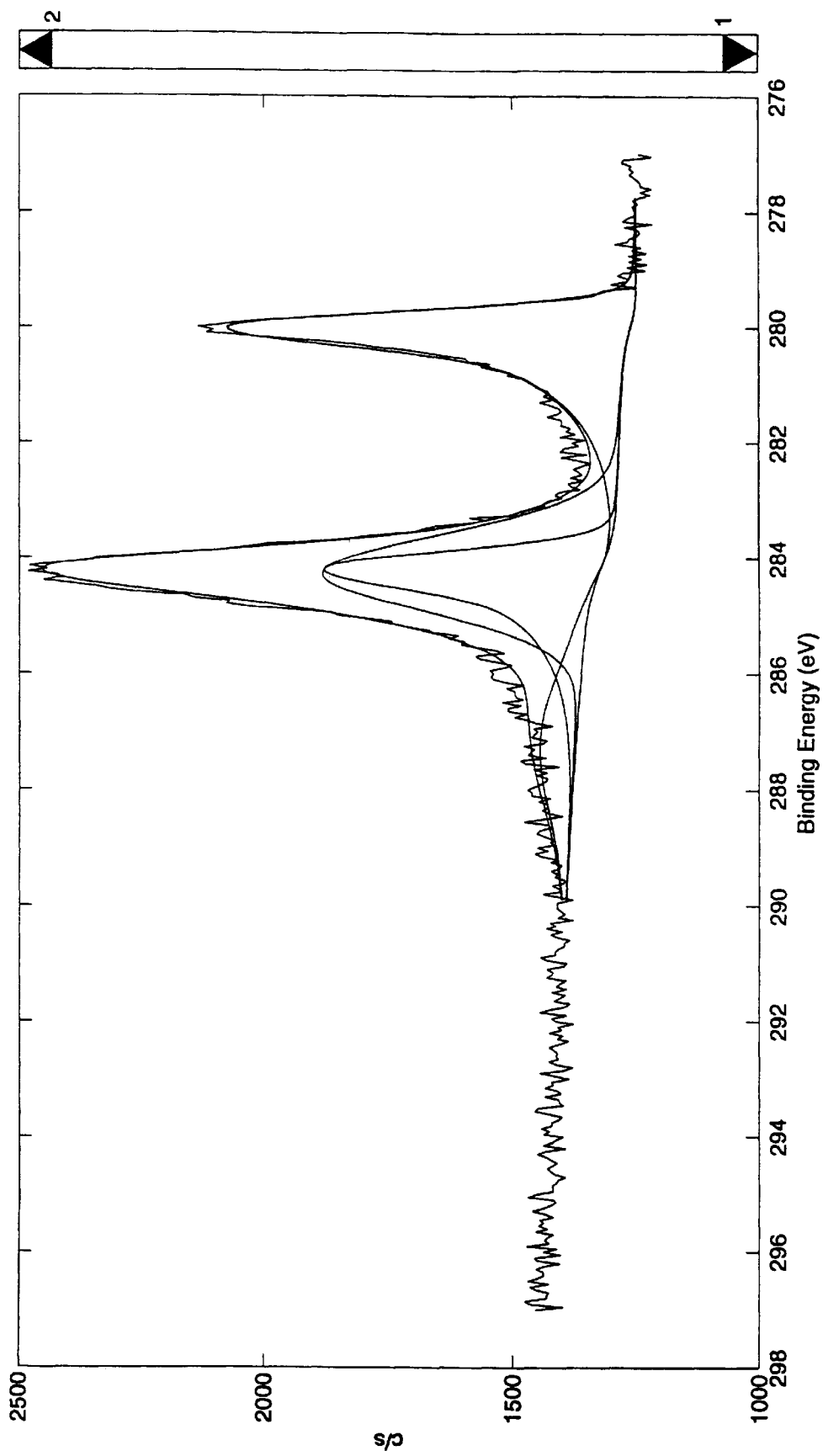
FIG. 60 is XPS analysis (ruthenium region) for a sample according to the invention prepared by sequential EB-PVD with use of IBAD (Example 14).

FIG. 59 show the XPS spectrum for the Pt region (Pt4f transition) and its deconvoluted spectrum for this sequentially deposited EB-PVD electrode. FIG. 60 shows the spectrum for the Ru region (Ru3d transition) for the same system.

Polarization Performance

MEA Preparation

The 0.1 mg Pt Ru/cm$^2$ EB-PVD/IBAD catalyzed ELAT gas diffusion media electrode was first pretreated with the same procedure described in the prior examples. The pretreated electrode was then hot pressed to a GORE-SELECT® proton conducting membrane (25 microns, 950 EW) as the anode half-cell. As cathode, a standard reference electrode (0.3 mg Pt/cm$^2$ loading) was used.

MEA Testing

Figure 61:
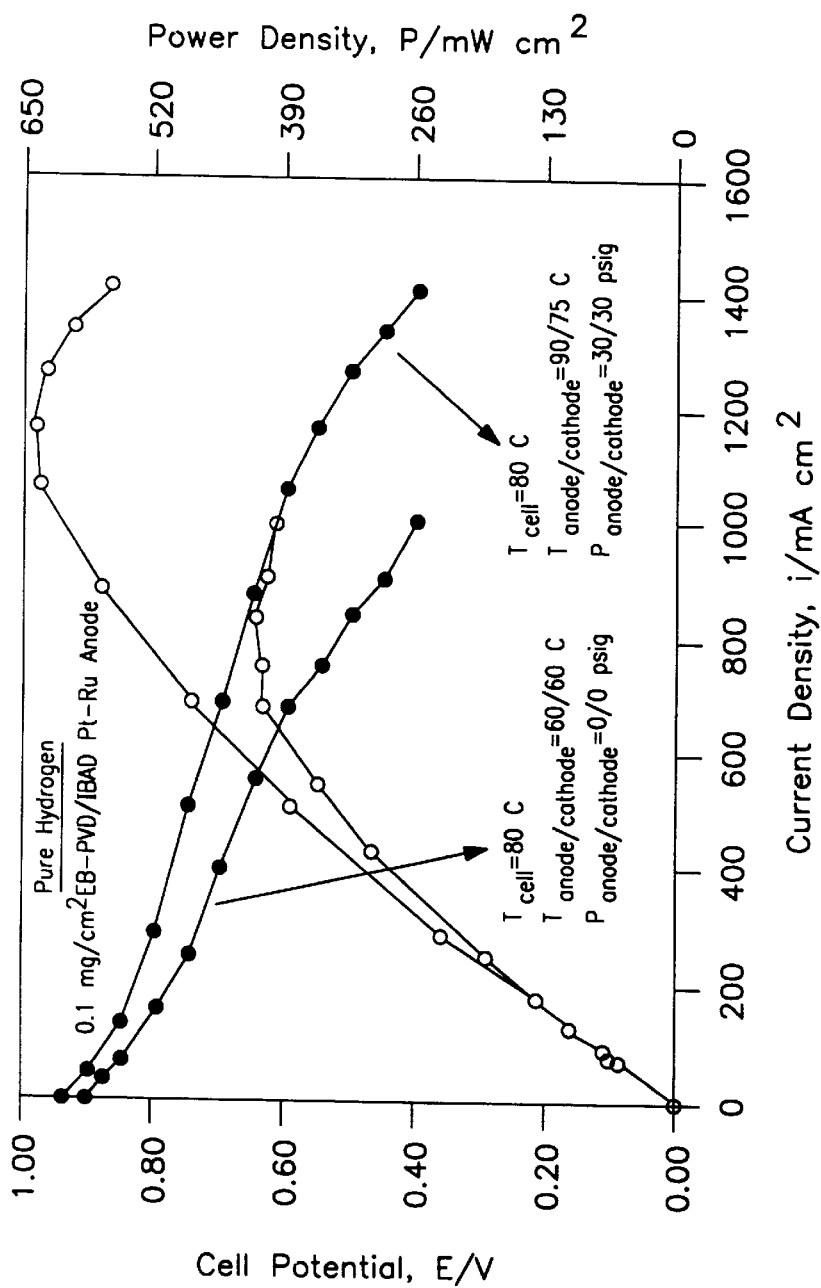
FIGS. 61 and 62 show polarization performances for membrane electrode assemblies with bimetallic deposited layer according to the invention (Example 14).
Figure 62:
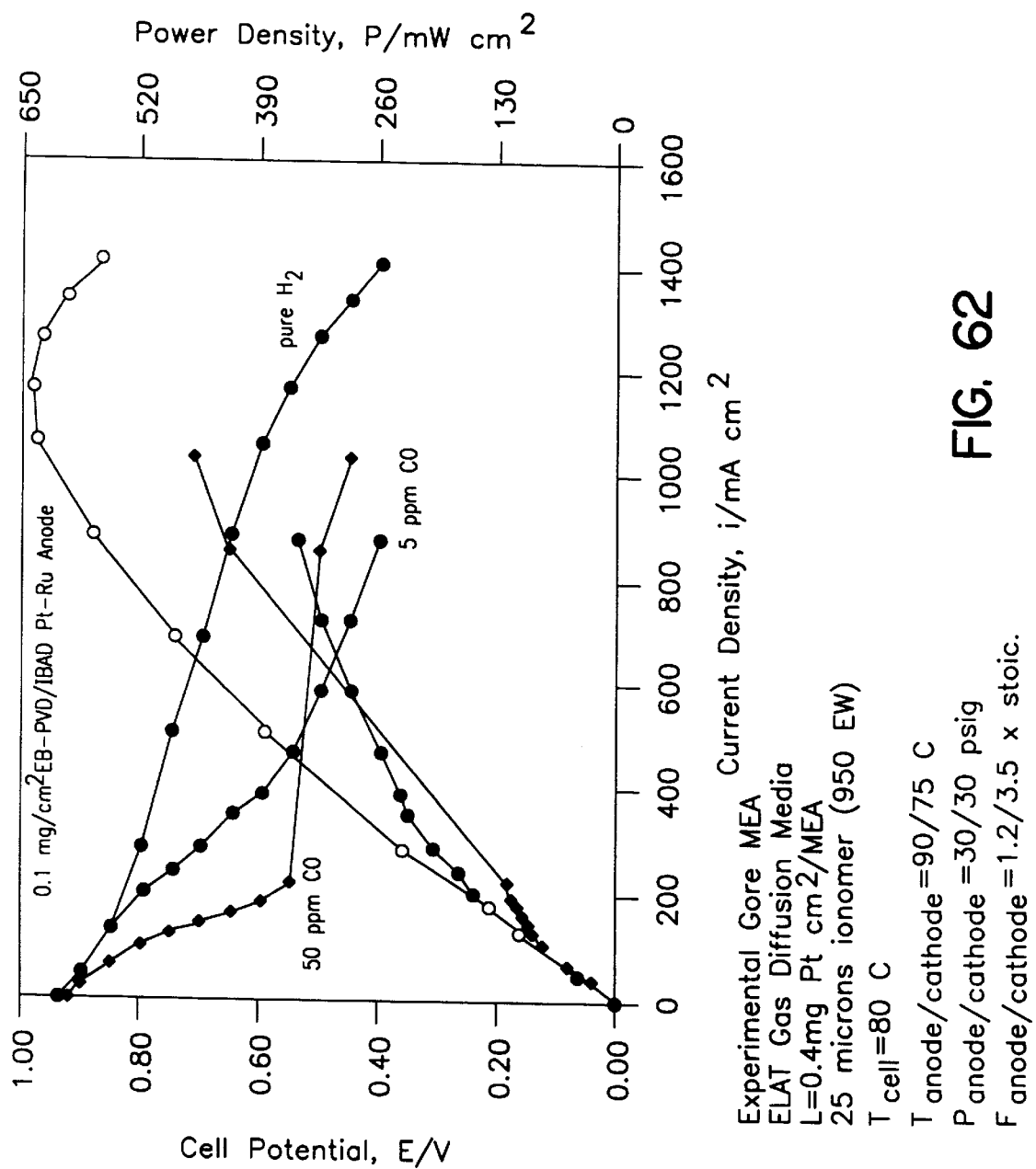

The experimental MEA, with an electrode active area of 25 cm$^2$ was tested at the same conditions and with the same protocols used during fuel cell polarization characterization of experimental MEAs described in the previous examples. FIGS. 61 and 62 show polarization performance for this sequential Pt Ru EB-PVD/IBAD catalyzed anode, for pure $H_2$, and for reformate feeds respectively. Table 3 summarizes the performance, expressed as current density at 0.6 V in hydrogen and $H_2/CO$ mixtures (5 and 50 ppm CO concentration). Performance of a Pt sputtered anode (0.1 mg/cm$^2$) was again included as reference.

The results indicate that this PtRu EB-PVD/IBAD catalyzed anode in pure hydrogen anode feed produced an improvement of ca. 29% in current density/power output when compared to a sputtered Pt (single metal) electrode, an improvement of 7% when compared to a PtRu catalyzed electrode. In the presence of 5 ppm $CO/H_2$ anode feed, this electrode yields 44% improved power output at 0.6 V, and at 50 ppm level the improvement is ca. 84%, all compared to the sputtered Pt (reference) electrode.

Poison resistance-related lambda parameters are also shown in FIG. 3.

The data indicate that the MEA containing the PtRu EB-PVD/IBAD anode decays 63% at 5 ppm CO anode fuel, and 82% at 50 ppm CO, in relation to the power output of the bimetallic anode in pure hydrogen. These lambda values are 4% and 6% smaller than the ones observed with a pure sputtered Pt anode when exposed to 5 and 50 ppm, respectively (i.e., 67% and 88%).

TABLES:

TABLE 1

| MEA Anode | Temperature (° C.) | OCV (V) | current at 0.6 V with $H_2$ feed (no CO) (mA/cm$^2$) | current at 0.6 V with $H_2$/5 ppm CO feed (mA/cm$^2$) | lambda parameter (5 ppm) | current at 0.6 V with $H_2$/50 ppm CO feed (mA/cm$^2$) | lambda parameter (50 ppm) |
|---|---|---|---|---|---|---|---|
| Pt (ref.) | 80 | 0.945 | 822 | 272 | 0.67 | 101 | 0.88 |
|  | 60 | 0.920 | 525 | — | — | — | — |
| PtRu | 80 | 0.940 | 990 | 500 | 0.49 | 183 | 0.82 |
|  | 60 | 0.900 | 622 | — | — | — | — |

TABLE 2

| MEA Anode | Temperature (° C.) | OCV (V) | current at 0.6 V with $H_2$ feed (no CO) (mA/cm$^2$) | current at 0.6 V with $H_2$/5 ppm CO feed (mA/cm$^2$) | lambda parameter (5 ppm) | current at 0.6 V with $H_2$/50 ppm CO feed (mA/cm$^2$) | lambda parameter (50 ppm) |
|---|---|---|---|---|---|---|---|
| Pt (ref.) | 80 | 0.945 | 822 | 272 | 0.67 | 101 | 0.88 |
|  | 60 | 0.920 | 525 | — | — | — | — |
| PtRu | 80 | 0.922 | 625 | 492 | 0.21 | 255 | 0.59 |
|  | 60 | 0.890 | 426 | — | — | — | — |

TABLE 3

| MEA Anode | Temperature (° C.) | OCV (V) | current at 0.6 V with $H_2$ feed (no CO) (mA/cm$^2$) | current at 0.6 V with $H_2$/5 ppm CO feed (mA/cm$^2$) | lambda parameter (5 ppm) | current at 0.6 V with $H_2$/50 ppm CO feed (mA/cm$^2$) | lambda parameter (50 ppm) |
|---|---|---|---|---|---|---|---|
| Pt (ref.) | 80 | 0.945 | 822 | 272 | 0.67 | 101 | 0.88 |
|  | 60 | 0.920 | 525 | — | — | — | — |
| PtRu | 80 | 0.940 | 1060 | 391 | 0.63 | 186 | 0.82 |
|  | 60 | 0.903 | 680 | — | — | — | — |

The foregoing description of preferred embodiments of the invention have been presented for purposes of illustration and description. It is not intended to be exhaustive or to limit the invention to the precise form disclosed. Hence, many modifications and variations are possible in light of the above teaching.

What is claimed is:

1. An electrode-membrane combination comprising:
   at least one reactant diffusive, electronically conductive electrode comprising at least one first catalytically active metal and at least one ionically conductive polymer; and
   at least one ionically conductive membrane contacting the electrode to form an electrode-membrane interfacial region,
   wherein the interfacial region comprises at least one zone comprising at least two different second catalytically active metals and having a zone thickness of about 3 angstroms to about 5,000 angstroms.

2. The combination according to claim 1, wherein the zone thickness is about 50 angstroms to about 1,500 angstroms.

3. The combination according to claim 1, wherein the zone thickness is about 150 angstroms to about 500 angstroms.

4. The combination according to claim 1, wherein the electrode comprises at least one first catalytically active metal and the zone comprises at least one second catalytically active metal, which are the same metals.

5. The combination according to claim 1, wherein the electrode comprises at least one first catalytically active metal and the zone comprises at least one second catalytically active metal, which are not the same metals.

6. The combination according to claim 1, wherein the zone comprises multiple layers of the second catalytically active metals.

7. The combination according to claim 1, wherein the electrode loading of first catalytically active metal is between about 0.02 mg/cm$^2$ and about 0.5 mg/cm$^2$.

8. The combination according to claim 1, wherein the zone comprises at least three different catalytically active metals.

9. The combination according to claim 1, wherein the zone comprises platinum and ruthenium.

10. The combination according to claim 1, wherein the membrane has a thickness of about 3 microns to about 75 microns.

11. The combination according to claim 1, wherein the membrane has a thickness of less than about 30 microns and a Gurley number greater than 10,000 seconds.

12. The combination according to claim 1, wherein the membrane comprises a porous polymer impregnated with a fluoroionomer.

13. The combination according to claim 1, wherein at least two of the second catalytically active metals are at least partially alloyed with each other.

14. The combination according to claim 13, wherein the membrane has a thickness of less than about 30 microns, has a Gurley number greater than 10,000 seconds, and comprises a porous polymer impregnated with a fluoroionomer.

15. A membrane electrode assembly comprising the combination according to claim 1 and at least one additional, different electrode contacting the membrane.

16. A fuel cell comprising at least one membrane electrode assembly according to claim 15.

17. A transportation vehicle comprising at least one fuel cell according to claim 16.

18. An electrode-membrane combination comprising:
   at least one porous, conductive electrode comprising at least one first catalytically active metal and at least one ionically conductive polymer; and
   at least one ionically conductive membrane contacting the electrode to form an electrode-membrane interfacial region,
   wherein the interfacial region comprises at least one zone comprising at least two different second catalytically active metals and having a zone loading of about 0.001 mg metal/cm$^2$ to about 0.7 mg metal/cm$^2$.

19. A fuel cell comprising the combination according to claim 18 and at least one additional, different electrode contacting the membrane, and the zone loading is less than 0.4 mg/cm$^2$.

20. A combination according to claim 18, wherein the zone is a vapor deposited zone.

21. A combination according to claim 20, wherein the zone is vapor deposited by physical vapor deposition.

22. A combination according to claim 20, wherein the zone is vapor deposited by electron beam physical vapor deposition.

23. A combination according to claim 20, wherein the zone is vapor deposited with ion beam assisted deposition.

24. A combination according to claim 20, wherein the zone comprises sequentially deposited zones of catalytic metal.

25. A combination according to claim 20, wherein the zone is deposited by chemical vapor deposition, physical vapor deposition, thermal deposition, cathodic arc deposition, ion sputtering, ion beam assisted deposition, or jet vapor deposition.

26. A combination according to claim 18, wherein the catalytic loading of the combination is about 0.8 mg metal/cm$^2$ or less.

27. A combination according to claim 18, wherein the catalytic loading of the combination is about 0.6 mg metal/cm$^2$ or less.

28. A combination according to claim 18, wherein the thickness of the membrane is about 30 microns or less, and the membrane is air impermeable, and the zone loading is less than 0.4 mg/cm$^2$.

29. A combination according to claim 18, the combination further comprising at least one catalyzed gas diffusion medium.

* * * * *